(12) United States Patent
Choi et al.

(10) Patent No.: US 11,502,891 B2
(45) Date of Patent: Nov. 15, 2022

(54) METHOD AND APPARATUS FOR TRANSMITTING UPLINK CONTROL CHANNEL IN WIRELESS CELLULAR COMMUNICATION SYSTEM

(71) Applicant: Samsung Electronics Co., Ltd., Gyeonggi-do (KR)

(72) Inventors: Seunghoon Choi, Gyeonggi-do (KR); Youngbum Kim, Seoul (KR); Taehyoung Kim, Seoul (KR); Hoondong Noh, Gyeonggi-do (KR); Jeongho Yeo, Gyeonggi-do (KR); Youngwoo Kwak, Gyeonggi-do (KR)

(73) Assignee: Samsung Electronics Co., Ltd

( * ) Notice: Subject to any disclaimer, the term of this patent is extended or adjusted under 35 U.S.C. 154(b) by 1 day.

(21) Appl. No.: 16/496,827

(22) PCT Filed: Mar. 22, 2018

(86) PCT No.: PCT/KR2018/003379
§ 371 (c)(1),
(2) Date: Sep. 23, 2019

(87) PCT Pub. No.: WO2018/174606
PCT Pub. Date: Sep. 27, 2018

(65) Prior Publication Data
US 2020/0153672 A1 May 14, 2020

(30) Foreign Application Priority Data

Mar. 22, 2017 (KR) .................. 10-2017-0036016
Jul. 3, 2017 (KR) .................. 10-2017-0084296

(51) Int. Cl.
*H04L 27/26* (2006.01)
*H04L 5/00* (2006.01)
*H04W 72/04* (2009.01)

(52) U.S. Cl.
CPC ........ *H04L 27/2666* (2013.01); *H04L 5/0048* (2013.01); *H04L 5/0053* (2013.01);
(Continued)

(58) Field of Classification Search
None
See application file for complete search history.

(56) References Cited

U.S. PATENT DOCUMENTS

| 6,144,413 | A | 11/2000 | Zatsman |
|---|---|---|---|
| 2008/0205351 | A1 | 8/2008 | Lindoff et al. |

(Continued)

FOREIGN PATENT DOCUMENTS

| KR | 1020090113893 | 11/2009 |
|---|---|---|
| KR | 1020110058892 | 6/2011 |

(Continued)

OTHER PUBLICATIONS

PCT/ISA/210 Search Report dated Jun. 22, 2018 issued in PCT/KR2018/003379, pp. 7.

(Continued)

*Primary Examiner* — Alpus Hsu
*Assistant Examiner* — Camquyen Thai
(74) *Attorney, Agent, or Firm* — The Farrell Law Firm, P.C.

(57) ABSTRACT

The present disclosure relates to a communication technique and system thereof that fuses a 5G communication system with IoT technology to support a higher data rate than a 4G system. The present disclosure may be applied to an intelligent service (for example, a smart home, a smart building, a smart city, a smart car or a connected car, health care, digital education, retail, a security and safety related service, etc.) on the basis of 5G communication technology and IoT-related technology. According to the present invention, a method of a terminal in a wireless communication system (Continued)

comprises the steps of: detecting a synchronization signal block at a synchronization signal block candidate position which is determined according to a subcarrier interval of the synchronization signal block; and performing synchronization on the basis of the synchronization signal block.

15 Claims, 51 Drawing Sheets

(52) U.S. Cl.
CPC ........ *H04L 5/0094* (2013.01); *H04L 27/2657* (2013.01); *H04W 72/042* (2013.01); *H04W 72/0413* (2013.01); *H04W 72/0453* (2013.01)

(56) References Cited

U.S. PATENT DOCUMENTS

| | | | |
|---|---|---|---|
| 2011/0223951 | A1 | 9/2011 | Myoshi et al. |
| 2016/0135179 | A1* | 5/2016 | Yin ................... H04J 11/0069 370/329 |
| 2016/0338056 | A1 | 11/2016 | Xue et al. |
| 2017/0094547 | A1* | 3/2017 | Yum ................... H04W 56/001 |
| 2018/0098298 | A1* | 4/2018 | Jung ................... H04L 5/0048 |
| 2018/0146439 | A1* | 5/2018 | Kim ................... H04W 52/325 |
| 2018/0167195 | A1* | 6/2018 | Ly ................... H04L 5/001 |
| 2018/0176067 | A1* | 6/2018 | Luo ................... H04L 27/2678 |
| 2018/0184390 | A1* | 6/2018 | Wu ................... H04W 56/0005 |
| 2018/0184391 | A1* | 6/2018 | Ly ................... H04W 74/0841 |
| 2018/0198575 | A1* | 7/2018 | Sheng ................ H04J 11/0069 |
| 2018/0199363 | A1* | 7/2018 | Lee ................... H04L 5/0094 |
| 2018/0220360 | A1* | 8/2018 | Sheng ................ H04W 56/001 |
| 2018/0376440 | A1* | 12/2018 | Ko ................... H04W 72/04 |
| 2019/0200306 | A1* | 6/2019 | Ko ................... H04L 27/2666 |
| 2019/0326934 | A1* | 10/2019 | Kim ................... H04W 72/0446 |
| 2020/0084737 | A1* | 3/2020 | Lee ................... H04L 1/1642 |
| 2021/0337497 | A1* | 10/2021 | Siomina ................ H04J 11/0079 |

FOREIGN PATENT DOCUMENTS

| | | |
|---|---|---|
| KR | 1020180091527 | 8/2018 |
| WO | WO 2007/083762 | 7/2007 |
| WO | WO 2008/101762 | 8/2008 |
| WO | WO 2017/018966 | 2/2017 |

OTHER PUBLICATIONS

PCT/ISA/237 Written Opinion dated Jun. 22, 2018 issued in PCT/KR2018/003379, pp. 6.
Nokia et al., "SS Bandwidth, Numerology and Multiplexing", R1-1703090, 3GPP TSG RAN WG1 Meeting #88, Feb. 13-17, 2017, 6 pages.
European Search Report dated Jan. 30, 2020 issued in counterpart application No. 18770568.6-1205, 8 pages.
Huawei et al., "WF on SS Burst Set Composition and SS-block Index Indication", R1-1703832, 3GPP TSG RAN WG1 Meeting #88, Jan. 13-17, 2017, 7 pages.
Korean Office Action dated Jul. 16, 2021 issued in counterpart application No. 10-2017-0084296, 10 pages.
CATT, "PUCCH Resource Allocation", R1-1702099, 3GPP TSG RAN WG1 Meeting #88, Feb. 13-17, 2017, 3 pages.
NTT Docomo, Inc., "Summary of [87-32]: UL L1/L2 Control Channel Design for NR", R1-1700618, 3GPP TSG RAN WG1 AH_NR Meeting, Jan. 16-20, 2017, 30 pages.
Korean Office Action dated Mar. 8, 2022 issued in counterpart application No. 10-2021-0185050, 8 pages.

* cited by examiner

METHOD AND APPARATUS FOR TRANSMITTING UPLINK CONTROL CHANNEL IN WIRELESS CELLULAR COMMUNICATION SYSTEM

PRIORITY

This application is a National Phase Entry of PCT International Application No. PCT/KR2018/003379 which was filed on Mar. 22, 2018, and claims priority to Korean Patent Application Nos. 10-2017-0036016 and 10-2017-0084296, which were filed on Mar. 22, 2017 and Jul. 3, 2017, respectively, the content of each of which is incorporated herein by reference.

TECHNICAL FIELD

The disclosure relates a method and an apparatus for transmitting an uplink control channel in a wireless cellular communication system.

The disclosure further relates to a method of transmitting and receiving a synchronization signal in a wireless communication system.

The disclosure further relates to a method and an apparatus for sharing resources of a data channel and a control channel in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

According to the recent development of long-term evolution (LTE) and LTE-Advanced, research on a method of transmitting an uplink control channel in a wireless cellular communication system has been actively conducted.

DETAILED DESCRIPTION OF THE INVENTION

Technical Problem

An aspect of the disclosure is to provide a method of indicating a long PUCCH transmission interval (or a start symbol and an end symbol) and an apparatus for the same in order to prevent resource collision and maximize resource use when uplink control channels such as a long PUCCH, a short PUCCH, or a sound reference signal (SRS) coexist in one TTI or one slot.

Another aspect of the disclosure is to provide an efficient synchronization signal transmission/reception method in a mobile communication system.

Another aspect of the disclosure is to provide downlink control signaling to support transmission of downlink and uplink transmission channels in a wireless communication system. Control signals in the conventional 4G LTE system include downlink scheduling allocation including information required by the UE for appropriately receiving, demodulating, and decoding a physical downlink shared channel (PDSCH), uplink scheduling grant which informs of resources and a transmission format used by the UE for a physical uplink shared channel (PUSCH), and information on acknowledgement of hybrid automatic repeat request (HARQ) for a PUSCH.

In LTE, there is a physical downlink control channel (PDCCH) which is a physical layer transport channel for transmitting the downlink scheduling allocation and the uplink scheduling grant, which is transmitted in a front part of each subframe over the entire band. That is, the subframe may be divided into a control region and a data region, and the size of the control region may be designed to occupy 1, 2, or 3 orthogonal frequency division multiplexing (OFDM) symbols. The size of the control region, which is expressed by the number of OFDM symbols, may be dynamically changed according to special conditions such as the size of a system bandwidth and whether a multimedia broadcast single frequency network (MBSFN) subframe for broadcasting is configured, and may be indicated to each UE through a control format indicator (CFI).

Meanwhile, unlike the prior art, a 5G wireless communication system supports not only a service requiring a high transmission rate but also both a service having a very short transmission delay and a service requiring a high connection density. Such scenarios should be able to provide different transmission/reception schemes in one system and various services having transmission/reception parameters in order to meet various requirements of users and services, and it is important to design the scenarios so as to avoid creating limitations by which addition of services is limited by the current system from the aspect of forward compatibility. For example, scalable numerology may be used for spacing between subcarriers and may be simultaneously supported, or various services having different transmission time intervals (TTIs) may be simultaneously provided in one system. 5G should necessarily use time and frequency resources more flexibly than LTE.

The PDCCH used in LTE is not suitable for securing flexibility because the PDCCH is transmitted over the entire band the size of the control region is UE-specifically configured. Accordingly, under consideration for implementation in the 5G wireless communication system is a structure in which the control channel can be flexibly allocated according to various requirements of services. For example, a control region (control resource set) defined as a time and frequency region in which a 5G downlink control channel is transmitted is not configured as the entire band on the frequency axis but may be configured as specific subbands and may be configured to be the number of different OFDM symbols on the time axis. The number of control regions within one system may be plural, and a plurality of control regions may be configured to one UE. Accordingly, the control region may be efficiently managed according to whether a downlink control signal is transmitted, and accordingly, various services may be flexibly supported.

Particularly, in order to increase the efficiency of use of resources in 5G, data channels may be multiplexed through the remaining resources which are not actually used for downlink control information (DCI) transmission within the control region. At this time, a symbol at the location at which the data channel starts may differ according to whether there is a control region at the frequency location at which the data channel is transmitted or whether the control region is reused. Accordingly, the UE may receive an indication of a data start point to decode the data channel. Further, an indicator of the data start point may have different overheads depending on the method of in which resources are shared between the control channel and the data channel. Accordingly, efficient BS and UE operations to minimize signaling overhead and maximize resource efficiency are required. Therefore, the disclosure provides a method of efficiently sharing resources between the data channel and the control channel in 5G and a method and an apparatus for additional signaling to support the same.

Solution to Problem

In accordance with an aspect of the disclosure, a method of a user equipment (UE) in a wireless communication system includes: detecting a synchronization signal block at a synchronization signal block candidate location determined according to subcarrier spacing of synchronization signal blocks; and performing synchronization based on the synchronization signal block.

In accordance with another aspect of the disclosure, a method of a base station (BS) in a wireless communication system includes: transmitting a synchronization signal block at a synchronization signal block candidate location determined according to subcarrier spacing of the synchronization signal block, wherein synchronization is performed based on the synchronization signal block.

In accordance with another aspect of the disclosure, a user equipment (UE) in a wireless communication system includes: a transceiver; and a controller configured to detect a synchronization signal block at a synchronization signal block candidate location determined according to subcarrier spacing of the synchronization signal block and perform synchronization, based on the synchronization signal block.

In accordance with another aspect of the disclosure, a base station (BS) in a wireless communication system includes: a transceiver; and a controller configured to transmit a synchronization signal block at a synchronization signal block candidate location determined according to subcarrier spacing of the synchronization signal block, wherein synchronization is performed based on the synchronization signal block.

Advantageous Effects of Invention

According to an embodiment of the disclosure, the disclosure proposes a method of indicating a long PUCCH transmission interval (or a start symbol and an end symbol) if uplink control channels such as a long PUCCH, a short PUCCH, or an SRS should be transmitted within one TTI or one slot. When UEs transmit uplink control channels such as a long PUCCH, a short PUCCH, or an SRS, it is possible to prevent resource collision between UEs and maximize the resource use of the BS through the method proposed by the disclosure.

According to another embodiment of the disclosure, the disclosure defines a synchronization signal transmission/reception method in a mobile communication system, and thus improves system efficiency and reduces synchronization signal detection complexity of the UE.

According to another embodiment of the disclosure, the disclosure may provide a method and an apparatus for sharing resources between a downlink control channel and a downlink data channel in a 5G communication system, thereby more efficiently operating the 5G system.

MODE FOR THE INVENTION

Figure 1:
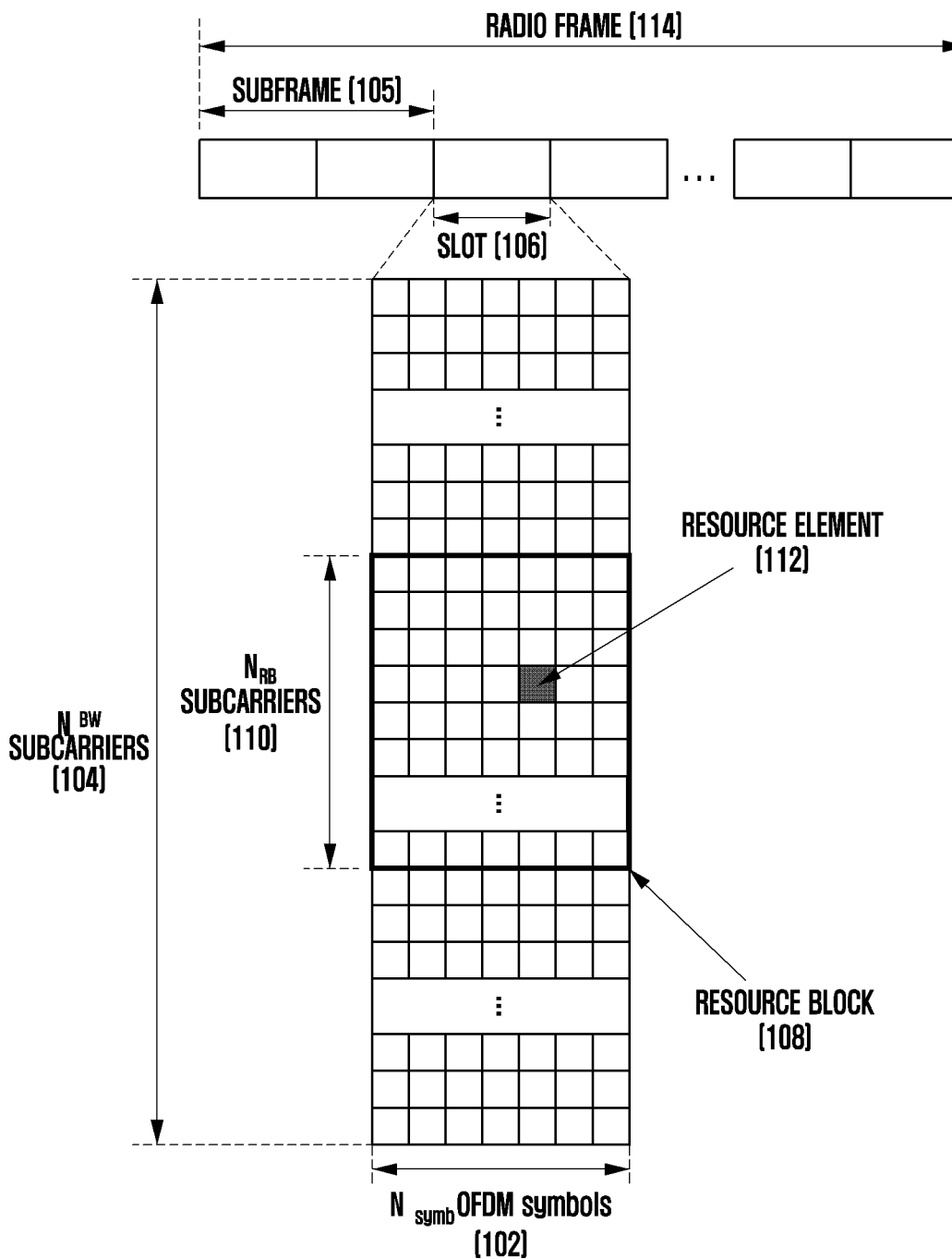
FIG. 1 illustrates the basic structure of a time/frequency region in an LTE system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

First Embodiment

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Hereinafter, an embodiment of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Further, the detailed description of embodiments of the disclosure is made mainly based on a wireless communication system based on OFDM, particularly 3GPP EUTRA standard, but the subject matter of the disclosure can be applied to other communication systems having a similar technical background and channel form after a little modification without departing from the scope of the disclosure and the above can be determined by those skilled in the art.

In order to meet wireless data traffic demands, which have increased since the commercialization of a 4G communication system, efforts to develop an improved 5G communication system or a pre-5G communication system have been made. For this reason, the 5G communication system or the pre-5G communication system is called a beyond-4G-network communication system or a post-LTE system. In order to achieve a high data transmission rate, implementation of the 5G communication system in an mmWave band (for example, 60 GHz band) is under consideration. In the 5G communication system, technologies such as beamforming, massive MIMO, full-dimensional MIMO (FD-MIMO), array antenna, analog beamforming, and large-scale antenna technologies are being discussed as means to mitigate propagation path loss in the ultrahigh-frequency band and increase a propagation transmission distance.

Further, technologies such as an evolved small cell, an advanced small cell, a cloud Radio Access Network (cloud RAN), an ultra-dense network, device-to-device communication (D2D), a wireless backhaul, a moving network, cooperative communication, coordinated multi-points (CoMP), and interference cancellation have been developed to improve the system network in the 5G communication system.

In addition, the 5G system has developed advanced coding modulation (ACM) schemes such as Hybrid FSK and QAM Modulation (FQAM) and sliding window superposition coding (SWSC), and advanced access technologies such as filter bank multi-carrier (FBMC), non-orthogonal multiple access (NOMA), and sparse code multiple access (SCMA).

Meanwhile, the Internet has evolved from a human-oriented connection network, in which humans generate and consume information, to the Internet of things (IoT), in which distributed components such as objects exchange and process information. Internet-of-Everything (IoE) technology, in which big-data processing technology is combined with the IoT technology through a connection with a cloud server or the like, has emerged. In order to implement IoT, technical factors such as a sensing technique, wired, wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an Internet technology (IT) service to create new value in people's lives may be provided. The IoT may be applied to fields such as those of a smart home, smart building, smart city, smart car, connected car, smart grid, health care, smart home appliance, or high-tech medical service, through the convergence of conventional information technology (IT) and various industries.

Accordingly, various attempts to apply the 5G communication to the IoT network are made. For example, 5G communication technologies such as sensor network, M2M communication, and MTC technologies are implemented by beamforming, MIMO, and an array antenna scheme. The application of a cloud RAN as the big-data processing technology may be an example of convergence of the 5G technology and the IoT technology.

Meanwhile, research on the coexistence of new 5G communication (or called NR communication in the disclosure) and LTE communication in the same spectrum is being conducted for implementation in a mobile communication system.

The disclosure relates to a wireless communication system, and more particularly to a method and an apparatus by which different wireless communication systems coexist in one carrier frequency or a plurality of carrier frequencies and a terminal that can transmit and receive data in at least one of the different communication systems transmits and receives data to and from each communication system.

In general, a mobile communication system is developed to provide voice services while guaranteeing the mobility of users. However, mobile communication systems have expanded from voice service to encompass data service. In recent years, wireless communication systems have been developed to provide a high-speed data service. However, since resources are lacking and users demand higher-speed services in the mobile communication system currently providing service, a further improved mobile communication system is needed.

To meet these demands, standardization of LTE is underway by the 3$^{rd}$-generation partnership project (3GPP) as one of the next-generation mobile communication systems that are being developed. LTE is a technology of implementing high-speed packet-based communication with a transmission rate of up to about 100 Mbps. To this end, several methods are under discussion, including a method of reducing the number of nodes located on a communication channel by simplifying a network architecture, a method of making wireless protocols closest to a wireless channel, and the like.

The LTE system adopts an HARQ scheme of retransmitting corresponding data on a physical layer when decoding failure occurs upon initial transmission. In the HARQ scheme, when a receiver does not accurately decode data, the receiver transmits information (negative acknowledgement: NACK) informing the transmitter of decoding failure, and thus the transmitter may re-transmit the corresponding data on the physical layer.

The receiver combines the data re-transmitted by the transmitter with the data decoding of which failed, thereby increasing data reception performance. When the receiver accurately decodes data, the receiver transmits information (acknowledgement: ACK) informing the transmitter of decoding success and thus the transmitter may transmit new data.

FIG. 1 illustrates the basic structure of a time-frequency region, which is a radio resource region in which the data or a control channel is transmitted in the downlink of the LTE system.

In FIG. 1, the horizontal axis indicates a time region and the vertical axis indicates a frequency region. In the time region, the minimum transmission unit is an OFDM symbol. One slot 106 includes $N_{symb}$ OFDM symbols 102, and one subframe 105 includes two slots. The length of one slot is 0.5 ms, and the length of one subframe is 1 ms. A radio frame 114 is a time region unit including 10 subframes. The minimum transmission unit in the frequency region is a subcarrier, and the entire system transmission bandwidth consists of a total of $N_{BW}$ subcarriers 104.

In the time-frequency region, the basic resource unit is a resource element (RE) 112, and an RE is expressed by an OFDM symbol index and a subcarrier index. A resource block (RB) (or physical resource block (PRB)) 108 is defined by $N_{symb}$ contiguous OFDM symbols 102 in the time region and $N_{RB}$ contiguous subcarriers 110 in the frequency region. Therefore, one RB 108 includes $N_{symb} \times N_{RB}$ REs 112. Generally, the minimum transmission unit of data is the RB.

In the LTE system, generally, $N_{symb}=7$ and $N_{RB}=12$. $N_{BW}$ is proportional to the bandwidth of the system transmission band. The data rate increases in proportion to the number of RBs scheduled to the UE. The LTE system defines and operates 6 transmission bandwidths. In the case of an FDD system, in which the downlink and the uplink are divided according to frequency, a downlink transmission bandwidth and an uplink transmission bandwidth may be different from each other. The channel bandwidth may be an RF bandwidth, that is, a system transmission bandwidth.

[Table 1] indicates the relationship between a system transmission bandwidth and a channel bandwidth defined in the LTE system. For example, when LTE system has a channel bandwidth of 10 MHz, the transmission bandwidth may include 50 RBs.

TABLE 1

| Channel bandwidth $BW_{channel}$[MHz] | 1.4 | 3 | 5 | 10 | 15 | 20 |
|---|---|---|---|---|---|---|
| Transmission bandwidth configuration | 6 | 15 | 25 | 50 | 75 | 100 |

Downlink control information is transmitted within initial N OFDM symbols in the subframe, Generally, N={1, 2, 3}. Accordingly, N is changed in every subframe depending 21) on the amount of control information to be transmitted through the current subframe. A control channel transmission interval indicator indicating how many OFDM symbols are used to transmit the control information, scheduling information of downlink data or uplink data, and an HARQ ACK/NACK signal may be included in the control information.

In the LTE system, scheduling information of downlink data or uplink data is transmitted from the base station to the UE through DCI. The uplink (UL) is a radio link through which the UE transmits data or control signals to the BS, and the downlink (DL) is a radio link through which the BS transmits data or control signals to the UE.

The DCI are defined in various formats. A DCI format may be determined and applied for operation based on whether scheduling information is for uplink data (UP grant) or for downlink data (DL grant), whether it is compact DCI of which the control information is small, whether spatial multiplexing using multiple antennas is applied, whether it is used for controlling power, and the like.

For example, DCI format 1, corresponding to scheduling control information for downlink data (DL grant), may be configured to include at least the following control information Resource allocation type 0/1 flag: indicates whether a resource allocation type is type 0 or type 1. Type 0 is a type of allocating resources in units of a resource block group (RBG) by applying a bitmap scheme. In the LTE system, the basic scheduling unit is a resource block (RB), expressed by time and frequency region resources, and an RBG includes a plurality of RBs and is used as a basic scheduling unit in type 0. Type 1 is a type of allocating a particular RB within the RBG Resource block assignment: indicates RBs allocated to data transmission. The expressed resources are determined according to the system bandwidth and resource allocation scheme Modulation and coding scheme (MCS): indicates the modulation scheme used for data transmission and the size of the transport block, that is, the data to be transmitted HARQ process number: indicates the process number of HARQ New data indicator (NDI): indicates initial HARQ transmission or HARQ retransmission.

Redundancy version (RV): indicates the redundancy version of HARQ.

Transmit power control (TPC) command for PUCCH: indicates a transmission power control command for a PUCCH, which is an uplink control channel.

The DCI is transmitted through a PDCCH or an enhanced PDCCH (EPDCCH), which is a downlink physical control channel, via a channel-coding and modulation process.

In general, the DCI is channel-coded independently for each UE, and is then configured and transmitted as an independent PDCCH. In the time region, the PDCCH is mapped and transmitted during the control channel transmission interval. The frequency region mapping position of a PDCCH is determined by the identifier (ID) of each UE, and is propagated to the entire system transmission band.

Downlink data is transmitted through a PDSCH, which is a physical channel for downlink data transmission. The PDSCH is transmitted after the control channel transmission interval, and the detailed mapping location in the frequency region and scheduling information such as the modulation scheme are indicated through DCI transmitted through the PDCCH.

Via an MCS formed of 5 bits in the control information included in the DCI, the BS may report the modulation scheme applied to a PDSCH to be transmitted to the UE and the size (transport block size (TBS)) of data to be transmitted. The TBS corresponds to the size before channel coding for error correction is applied to the data (TB) to be transmitted by the BS.

The modulation schemes supported by the LTE system include quadrature phase shift keying (QPSK), 16 quadrature amplitude modulation (16QAM), and 64QAM. Modulation orders (Qm) thereof correspond to 2, 4, and 6, respectively. That is, in the case of QPSK modulation, 2 bits may be transmitted per symbol. In the case of 16QAM modulation, 4 bits may be transmitted per symbol. In the case of 64QAM modulation, 6 bits may be transmitted per symbol.

Unlike LTE Rel-8, 3GPP LTE Rel-10 has adopted a bandwidth extension technology in order to support a larger amount of data transmission. The technology called bandwidth extension or carrier aggregation (CA) may expand the bandwidth and thus increase the amount of data capable of being transmitted using the expanded band compared to the LTE Rel-8 UE, which transmits data in one band.

Each of the bands is called a component carrier (CC), and LTE Rel-8 UE is defined to have one component carrier for each of the downlink and the uplink. Further, a group of uplink component carriers connected to downlink component carriers through SIB-2 is called a cell. The SIB-2 connection relation between the downlink component carriers and the uplink component carriers is transmitted through a system signal or a higher signal. The UE supporting CA may receive downlink data through a plurality of serving cells and transmit uplink data.

When the BS has difficulty in transmitting the PDCCH to a specific UE in a specific serving cell in Rel-10, the BS may transmit the PDCCH in another serving cell and configure a carrier indication field (CIF) as a field indicating that the corresponding PDCCH indicates a PDSCH or a PUSCH of the other serving cell.

The CIF may be configured in the UE supporting CA. The CIF is determined to indicate another serving cell by adding 3 bits to the PDCCH in a particular serving cell, and the CIF is included only when cross-carrier scheduling is performed, and if CIF is not included, cross-carrier scheduling is not performed. When the CIF is included in downlink allocation information (DL assignment), the CIF is defined to indicate a serving cell to which a PDSCH scheduled by the DL assignment is transmitted. When the CIF is included in uplink resource allocation information (UL grant), the CIF is defined to indicate a serving cell to which a PUSCH scheduled by the UL grant is transmitted.

As described above, in LTE-10, carrier aggregation (CA), which is technology for bandwidth expansion, may be defined, and a plurality of serving cells may be configured in the UE. The UE periodically or aperiodically transmits channel information of the plurality of serving cells to the BS for data scheduling of the BS. The BS schedules and transmits data for each carrier, and the UE transmits AN feedback of data transmitted for each carrier.

LTE Rel-10 is designed to transmit AN feedback, which is a maximum of 21 bits, and is further designed to transmit the AN feedback and discard the channel information when transmission of AN feedback and transmission of channel information overlap each other in one subframe.

LTE Rel-11 is designed to multiplex AN feedback and channel information of one cell and transmit the AN feedback corresponding to a maximum of 22 bits and the channel information of one cell in transmission resources of PUCCH format 3 through PUCCH format 3.

A scenario in which a maximum of 32 serving cells are configured is assumed in LTE-13, and the concept of expanding the number of serving cells up to a maximum of 32 serving cells has been constructed using not only a licensed band but also an unlicensed band. Further, in LTE-13, LTE service has been provided in an unlicensed band, such as a band of 5 GHz due to the limitation on the number of licensed bands, such as the LTE frequency, which is called licensed assisted access (LAA).

Carrier aggregation technology of LTE is applied to LAA, and an LTE cell, which is a licensed band supports operation of an LAA cell corresponding to an unlicensed band as an S cell. Accordingly, as in LTE, feedback generated in the LAA cell corresponding to the S cell should be transmitted only in a P cell, and the LAA cell may freely apply a downlink subframe and an uplink subframe. Unless specially mentioned in this specification, "LTE" refers to all technologies evolved from LTE, such as LTE-A and LAA.

Meanwhile, as a post-LTE communication system, a $5^{th}$-generation wireless cellular communication system (hereinafter, referred to as "5G" or "NR" in the specification) should freely reflect the various requirements of users and service providers, so that services that meet various requirements may be supported.

Accordingly, 5G may define various 5G services such as enhanced mobile broadband communication (hereinafter, referred to as eMBB in this specification), massive machine-type communication (hereinafter, referred to as mMTC in this specification), and ultra-reliable and low-latency communications (hereinafter, referred to as URLLC in this specification) by the technology for satisfying requirements selected for 5G services, among requirements of a maximum UE transmission rate of 20 Gbps, a maximum UE speed of 500 km/h, a maximum delay time of 0.5 ms, and a UE access density of 1,000,000 UEs/km².

For example, in order to provide eMBB in 5G, a maximum downlink UE transmission rate of 20 Gbps and a maximum uplink UE transmission rate of 10 Gbps should be provided from the viewpoint of one BS. Also, the average transmission rate that the UE actually experiences should be increased. In order to satisfy these requirements, improvement of transmission/reception technologies, including a further improved multi-input multi-output transmission technology, is needed.

Also, in order to support an application service such as IoT, the implementation of mMTC is under consideration in 5G. The mMTC has requirements of supporting access of massive numbers of terminals within a cell, improving coverage of the terminal, increasing effective battery lifetime, and reducing the costs of the terminal in order to efficiently support IoT. IoT connects various sensors and devices to provide a communication function, and thus should support a large number of terminals within the cell (for example, 1,000,000 UEs/km²). Further, in the mMTC, the UE is highly likely to be located in a shade area such as the basement of a building or an area that cannot be covered by the cell due to characteristics of the service, and thus mMTC requires wider coverage than the coverage provided by eMBB. The mMTC is highly likely to be configured by cheap UEs, and it is difficult to frequently change a battery of such a UE, so a long battery life time is needed.

Last, the URLLC is cellular-based wireless communication used for a particular purpose and corresponds to a service used for remote control of a robot or a machine device, industrial automation, unmanned aerial vehicles, remote health control, and emergency notification, and thus should provide ultra-low-latency and ultra-reliable communication. For example, the URLLC should have a maximum delay time shorter than 0.5 ms and is also required to provide a packet error rate equal to or lower than $10^{-5}$. Therefore, for the URLLC, a transmission time interval (TTI) smaller than that of the 5G service such as the eMBB should be provided, and additionally, it is required to design allocation of wide resources in a frequency band.

The services under consideration in the $5^{th}$-generation wireless cellular communication system should be provided as a single framework. That is, in order to efficiently manage and control resources, it is preferable to perform control and transmission such that the services are integrated into one system rather than to independently operate the services.

Figure 2:
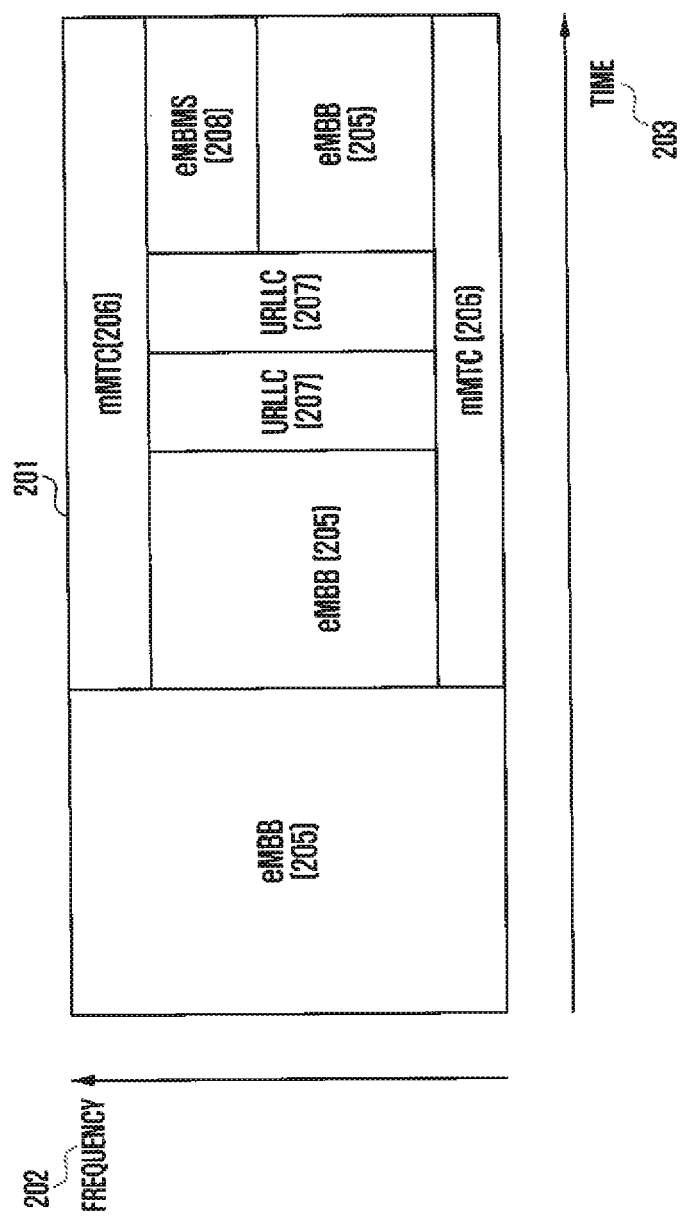
FIG. 2 illustrates an example in which 5G services are multiplexed in one system.

FIG. 2 illustrates an example in which services under consideration by 5G are transmitted to one system.

Referring to FIG. 2, frequency-time resources 201 used by 5G may include a frequency axis 202 and a time axis 1b-03. FIG. 2 illustrates an example in which eMBB 205, mMTC 206, and URLLC 207 are operated within one framework. Further, as a service that can be additionally considered for implementation in 5G, an enhanced mobile broadcast/multicast service (eMBMS) 1b-08 for providing a cellular-based broadcast service may be considered.

The services under consideration for 5G, such as the eMBB 205, the mMTC 206, the URLLC 207, and the eMBMS 208, may be multiplexed through time-division multiplexing (TDM) or frequency-division multiplexing (FDM) within one system frequency bandwidth used by 5G, and spatial-division multiplexing may also be considered.

In the case of the eMBB 205, it is preferable to occupy and transmit frequency bandwidths as many as possible for a particular time in order to provide the increased data transmission rate. Accordingly, it is preferable that the service of the eMBB 2-05 be time-division-multiplexed with another service within the system transmission bandwidth 201, but it is also preferable that the service of the eMBB be frequency-division-multiplexed with other services within the system transmission bandwidth depending on the need of the other services.

Unlike other services, the mMTC 206 requires an increased transmission interval in order to secure wider coverage, and may secure the coverage by repeatedly transmitting the same packet within the transmission interval. In order to simultaneously reduce terminal complexity and terminal price, the transmission bandwidth within which the terminal can perform reception is limited. As described above, when the requirements are considered, it is preferable that the mMTC 206 be frequency-division multiplexed with other services within the transmission system bandwidth 201.

It is preferable that the URLLC 207 have a shorter transmission time interval (TTI) compared to other services in order to meet the ultra-low-latency requirement of the service. Also, in order to meet the ultra-reliable requirement, a low coding rate is needed, so that it is preferable to have a wide bandwidth from the aspect of frequency. When the requirements of the URLLC 207 are considered, it is preferable that the URLLC 207 be time-division multiplexed with other services within the transmission system bandwidth 201 of 5G.

The aforementioned services may have different transmission/reception schemes and transmission/reception parameters in order to meet the requirements of the services. For example, the services may have different numerologies depending on the requirements thereof. The numerology includes a cyclic prefix (CP) length, subcarrier spacing, an OFDM symbol length, and a transmission time interval (TTI) in an orthogonal frequency-division multiplexing (OFDM) or an orthogonal frequency division multiple access (OFDMA)-based communication system. In an example in which the services have different numerologies, the eMBMS 208 may have a longer CP than other services. Since the eMBMS transmits higher traffic based on broadcasting, the same data may be transmitted in all cells. At this time, if the signals received by a plurality of cells reach the CP length, the UE may receive and decode all of the signals and thus obtain a single frequency network (SFN) diversity gain, and accordingly, even a UE located at a cell boundary can receive broadcasting information without any coverage restriction.

However, when the CP length is relatively longer than other services, waste occurs due to CP overhead in order to support the eMBMS, and thus a longer OFDM symbol is required compared to other services, which results in narrower subcarrier spacing compared to other services.

Further, as an example in which different numerologies are used for services in 5G, a shorter OFDM symbol may be required as a shorter TTI is needed compared to other services, and moreover, wider subcarrier spacing may be required in the case of URLLC.

Meanwhile, one TTI may be defined as one slot and may consist of 14 OFDM symbols or 7 OFDM symbols in 5G. Accordingly, in the case of subcarrier spacing of 15 kHz, one slot has a length of 1 ins or 0.5 ms.

In 5G, one TTI may be defined as one mini-slot or sub-slot for emergency transmission and transmission in an unlicensed band, and one mini-slot may have OFDM symbols ranging from 1 to the number of OFDM symbols of the slot—1. If the length of one slot corresponds to 14 OFDM symbols, the length of the mini-slot may be determined as one of 1 to 13 OFDM symbols. The length of the slot or the mini-slot may be defined according to a standard, or may be transmitted by a higher signal or system information and received by the UE.

The slot or the mini-slot may be defined to have various transmission formats, and may be classified into the following formats.

DL-only slot or full-DL slot: includes only a downlink period and supports only downlink transmission.

DL-centric slot: includes a downlink period, a guard period (GP), and an uplink period, wherein the number of OFDM symbols in the downlink period is larger than the number of OFDM symbols in the uplink period.

UL-centric slot: includes a downlink period, a guard period (GP), and an uplink period, wherein the number of OFDM symbols in the downlink period is smaller than the number of OFDM symbols in the uplink period.

UL-only slot or full-UL slot: includes only an uplink period and supports only uplink transmission.

Only the slot formats have been classified, but the mini-slot may also be classified through the same classification scheme. That is, the mini-slot may be classified into a DL-only mini-slot, a DL-centric mini-slot, a UL-centric mini-slot, and a UL-only mini-slot.

The transmission interval (or a transmission start symbol and end symbol) of the uplink control channel may vary depending on the format of the slot or the mini-slot. Further, the case in which an uplink control channel having a short transmission interval (hereinafter, referred to as a short PUCCH in the disclosure) to minimize a transmission delay and an uplink control channel having a long transmission interval (hereinafter, referred to as a long PUCCH in the disclosure) to obtain sufficient cell coverage coexist in one slot or a plurality of slots and the case in which the uplink control channel is multiplexed in one slot or a plurality of slots while an uplink sounding signal such as an SRS is transmitted should be considered. Accordingly, when the UE is configured to transmit the uplink control channel, a scheme for maximizing the use of time-frequency resources of the BS and preventing a collision of transmission resources of the uplink control channel is needed. The disclosure provides a method by which an interval of the uplink control channel (or a start symbol and an end symbol) is indicated to the UE for transmission and reception of the uplink control channel in the slot or the mini-slot by the BS and the UE and the UE receives the values and transmits the uplink control channel in the slot or the mini-slot.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

In addition, although the following detailed description of embodiments of the disclosure will be directed to LTE and 5G, it can be understood by those skilled in the art that the main gist of the disclosure may also be applied to other communication systems having similar technical backgrounds and channel formats, with slight modification, without substantially departing from the scope of the disclosure.

Hereinafter, a 5G system for transmitting and receiving data in the 5G cell will be described.

Figure 3:
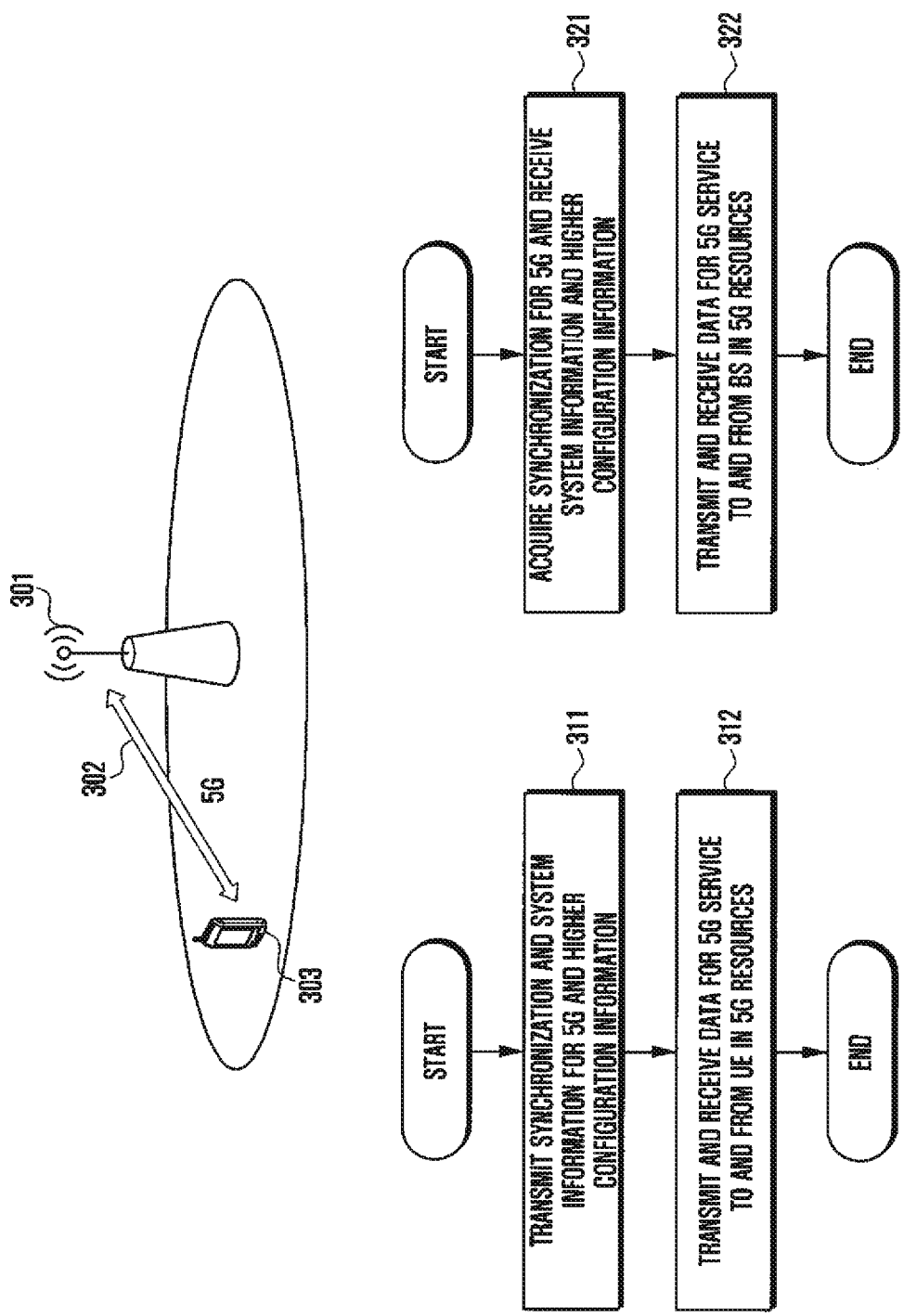
FIG. 3 illustrates an embodiment of a communication system to which the disclosure is applied.

FIG. 3 illustrates an embodiment of a communication system to which the disclosure is applied.

The drawings illustrate the form in which the 5G system is operated, and the schemes proposed by the disclosure can be applied to the system of FIG. 3.

Referring to FIG. 3, the case in which a 5G cell 302 is operated by one BS 301 in a network is shown. A UE 303 is a 5G-capable UE having a 5G transmission/reception module. The UE 303 obtains synchronization through a synchronization signal transmitted in the 5G cell 302, receives system information, and then transmits and receives data to and from the BS 301 through the 5G cell 302. In this case, there is no limitation as to the duplexing method of the 5G cell 302. If the 5G cell is a P cell, uplink control transmission is performed through the 5G cell 302. In the 50 system, the 5G cell may have a plurality of serving cells and support a total of 32 serving cells. It is assumed that the BS 301 includes a 5G transmission/reception module (system) in the network and can manage and operate the 50 system in real time.

Subsequently, a procedure in which the BS configures 5G resources and transmits and receives data to and from the 5G-capable UE 303 in resources for 5G will be described.

In step 311, the BS 301 transmits synchronization for 50, system information, and higher configuration information to the 5G-capable UE 1c-03. With respect to the synchronization signal for 5G, separate synchronization signals may be transmitted for eMBB, mMTC, and URCCL using different numerologies, and a common synchronization signal may be transmitted through specific 5G resources using one numerology. With respect to the system information, common system information may be transmitted through specific 50 resources using one numerology, and separate system information may be transmitted for eMBB, mMTC, and URLLC using different numerologies. The system information and the higher configuration information may include configuration information indicating whether to use the slot or the mini-slot for data transmission and reception, the number of OFDM symbols of the slot or the mini-slot, and the numerology therefor. Further, when reception of a downlink common control channel is configured in the UE, the system information and the higher configuration information may include configuration information related to reception of the downlink common control channel.

In step 312, the BS 301 transmits and receives data for the 5G service to and from the 5G-capable UE 303 through 5G resources.

Subsequently, the procedure in which the 5G-capable UE 303 receives the configuration of 50 resources from the BS 301 and transmits and receives data through the 50 resources will be described.

In step 321, the 5G-capable UE 303 obtains synchronization from the synchronization signal for 5G transmitted by the BS 301 and receives the system information and the higher configuration information transmitted by the BS 301. With respect to the synchronization signal for 5G, separate synchronization signals may be transmitted for eMBB, mMTC, and URCCL using different numerologies, and a common synchronization signal may be transmitted through specific 5G resources using one numerology. With respect to the system information, common system information may be transmitted through specific 50 resources using one numerology, and separate system information may be transmitted for eMBB, mMTC, and URLLC using different numerologies. The system information and the higher configuration information may include configuration information indicating whether to use the slot or the mini-slot for data transmission and reception, the number of OFDM symbols of the slot or the mini-slot, and the numerology therefor. Further, when reception of a downlink common control channel is configured in the UE, the system information and the higher configuration information may include configuration information related to the reception of the downlink common control channel.

In step 322, the 5G-capable UE 303 transmits and receives data for the 5G service to and from the BS 301 through 5G resources.

Described below is a method of transmitting a long PUCCH on the basis of a scheme for indicating a transmission interval (or a start system and an end symbol) of the long PUCCH in order to prevent resource collisions and maximize the use of resources if uplink control channels such as the long PUCCH, a short PUCCH, and an SRS coexist within one TTI or one slot in the situation in which the 5G system of FIG. 3 is operated by the slot or the mini-slot.

Figure 4:
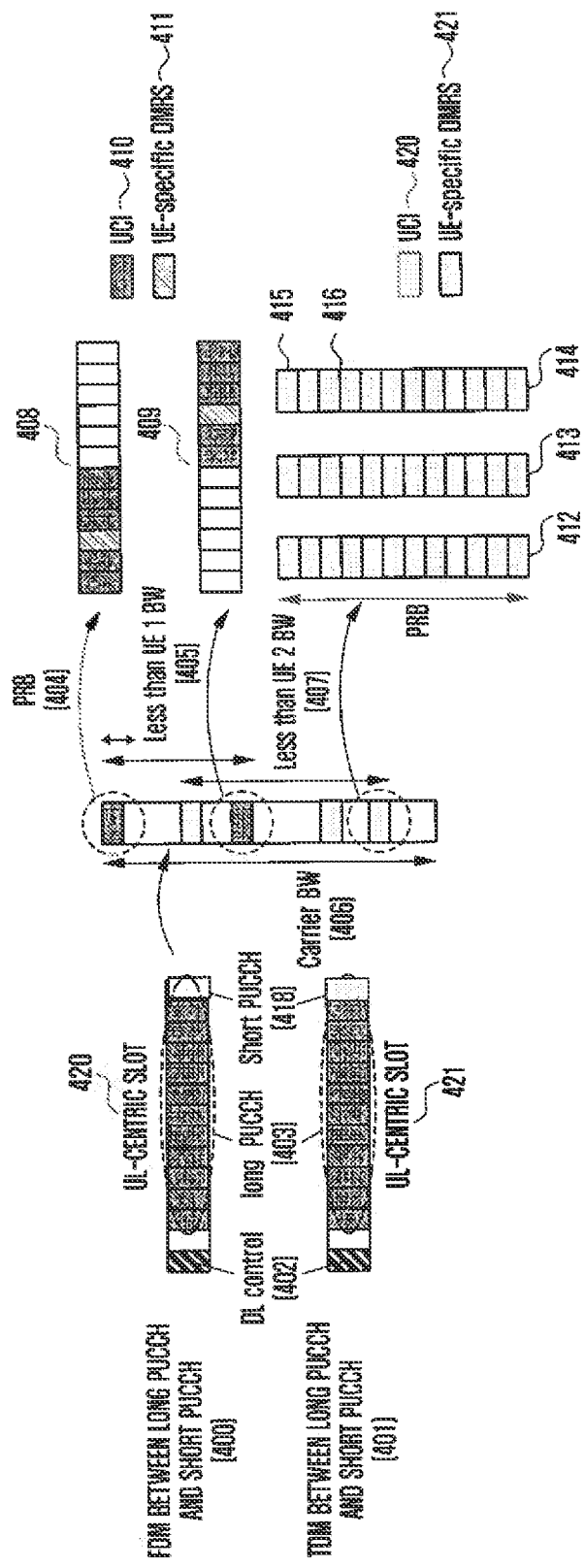
FIG. 4 illustrates embodiment 1-1 according to the disclosure.

First, FIG. 4 illustrates embodiment 1-1 of the disclosure.

FIG. 4 illustrates a method by which the UE determines the transmission interval (or the start symbol and the end symbol) of the long PUCCH on the basis of the slot and transmits an uplink control channel, but it should be noted that FIG. 4 may be applied to the case in which the UE determines the transmission interval (or the start symbol and the end symbol) of the long PUCCH on the basis of the mini-slot and transmits the uplink control channel.

FIG. 4 shows FDM 400 in the frequency region and TDM 401 in the time region of the long PUCCH and the short PUCCH. First, the structure of the slot in which the long PUCCH and the short PUCCH are multiplexed will be described with reference to FIG. 4.

Reference numerals 420 and 421 indicate UL-centric slots in which uplink is mainly used in the slot (various names such as subframe or transmission time interval (TTI) may be used, but a slot which is a basic transmission unit is used in the disclosure) which is a basic transmission unit of 5G.

In the UL-centric slot, most OFDM symbols are used for uplink, and all OFDM symbols may be used for uplink transmission, or some front OFDM symbols may be used for downlink transmission. If both the downlink and the uplink exist in one slot, there may be a transmission gap therebetween.

In FIG. 4, a first OFDM symbol may be used for downlink transmission, for example, downlink control channel transmission 402, and symbols from a third OFDM symbol may be used for uplink transmission. A second OFDM symbol is used for the transmission gap. In uplink transmission, uplink data channel transmission and uplink control channel transmission can be performed.

Subsequently, a long PUCCH 403 will be described. A control channel of a long transmission interval is used to increase cell coverage, and thus may be transmitted through a DFT-S-OFDM scheme for short carrier transmission rather than OFDM transmission.

Accordingly, the transmission should be performed using only successive subcarriers, and uplink control channels of a long transmission interval are configured so as to be spaced apart from each other, as indicated by reference numerals 408 and 409, in order to obtain a frequency diversity effect. A separation distance on the frequency side should be smaller than the bandwidth supported by the UE, and the long PUCCH may be transmitted using PRB-1 408 in the front part of the slot and using PRB-2 409 in the back part of the slot. The PRB is a physical resource block, which is a minimum transmission unit on the frequency side, and may be defined as 12 subcarriers. Accordingly, a frequency distance between PRB-1 and PRB-2 should be smaller than a maximum support bandwidth of the UE, and the maximum support bandwidth of the UE may be equal to or smaller than the bandwidth 406 supported by the system. Frequency resources PRB-1 and PRB-2 may be configured for the UE through a higher signal, frequency resources may be mapped to a bit field by a higher signal, and information indicating which frequency resources are used may be indicated to the UE through a bit field included in a downlink control channel.

Each of the control channel transmitted in the front part of the slot 408 and the control channel transmitted in the back part of the slot 409 may include uplink control information (UCI) 410 and a UE reference signal 411, and it is assumed that the two signals are transmitted in different OFDM symbols in a time-division manner.

Subsequently, a short PUCCH 418 will be described. The short PUCCH may be transmitted through both the DL-centric slot and the UL-centric slot and may generally be transmitted through the last symbol of the slot or an OFDM symbol in the back (for example, the last OFDM symbol, the second-to-last OFDM symbol, or the last two OFDM symbols). Of course, the short PUCCH can be transmitted at a random location within the slot. The short PUCCH may be transmitted using one OFDM symbol or a plurality of OFDM symbols.

In FIG. 4, the short PUCCH is transmitted in the last symbol 418 of the slot. Radio resources for the short PUCCH may be allocated in units of OPRBs from the aspect of frequency, and a plurality of successive PRBs may be allocated, or a plurality of PRBs separated from each other in the frequency band may be allocated. The allocated PRBs should be included in a band equal to or smaller than the frequency band 407 supported by the UE. The plurality of PRBs which are the allocated frequency resources may be configured in the UE by a higher signal, the frequency resources may be mapped to a bit field by the higher signal, and the frequency resources to be used may be indicated to the UE by the bit field included in the downlink control channel. Uplink control information 420 and a demodulation reference signal 421 should be multiplexed within one PRB in the frequency band, and there may be a method of transmitting a demodulation reference signal to one subcarrier for every two symbols, as indicated by reference numeral 412, a method of transmitting a demodulation reference signal to one subcarrier for every three symbols, as indicated by reference numeral 413, or a method of transmitting a demodulation reference signal to one subcarrier for every four symbols, as indicated by reference numeral 414.

Next, multiplexing of the long PUCCH and the short PUCCH will be described below. In one slot 420, long PDCCHs and short PDCCHs of different UEs may be multiplexed in the frequency region, as indicated by reference numeral 400. At this time, the BS may configure frequency resources of the short PUCCH and the long PUCCH of different UEs so as to avoid overlapping each other, like the PRBs of FIG. 4. However, configuring transmission resources of the uplink control channel of all UEs differently wastes frequency resources regardless of whether scheduling is performed, and is inappropriate when it is considered that the limited frequency resources should be used for uplink data channel transmission rather than uplink control channel transmission. Accordingly, frequency resources of the short PUCCHs and the long PUCCHs of different UEs may overlap each other, in which case the BS is required to perform scheduling and use transmission resources of different UEs so as to avoid collisions in one slot.

However, if collisions between short PUCCH transmission resources and long PUCCH transmission resources of different UDs in a specific slot cannot be avoided, the BS needs a method of preventing collisions between short PUCCH transmission resources and long PUCCH transmission resources, and the UE needs a method of controlling long PUCCH transmission resources according to the indication of the BS. The short PUCCH and long PUCCH transmission resources may be multiplexed in the time region within one slot 421 through the method indicated by reference numeral 401.

The disclosure provides a method of avoiding the transmission resource collision between transmission of the uplink control channel in the short time region such as the short PUCCH or the SRS and transmission of the uplink control channel in the long time region such as the long PUCCH.

The method of the disclosure may broadly include two methods. In the first method, in order to avoid a collision between transmission resources of the long PUCCH and transmission resources of the uplink control channel in the short time region in one slot, the BS may directly indicate the transmission resources of the long PUCCH in one slot to the UE through a first signal, and the UE may perform transmission of the long PUCCH in the transmission resources indicated in one slot through the reception of the first signal.

The first signal may contain a higher signal, a physical signal, or a combination of a higher signal and a physical signal, and may include an OFDM symbol interval (or a start OFDM symbol and an end OFDM symbol) in the time region for transmission of the long PUCCH and PRBs in the frequency region.

In the second method, the BS direct/indirectly indicates transmission resources of the long PUCCH in one slot to the UE in advance through a first signal or definition in the standard for correlating transmission resources of the long PUCCH from the number of uplink/downlink OFDM symbols and the number of GP OFDM symbols of the slot, and reduces or controls the transmission resources of the long PUCCH, indicated in advance through a second signal, in order to avoid a collision with transmission resources of the uplink control channel in a short time region. The UE determines in advance a transmission interval of the long PUCCH from the reception of the first signal or the number of uplink/downlink OFDM symbols and the number of GP OFDM symbols of the slot and controls transmission resources of the long PUCCH in one slot through reception of the second signal to perform transmission of the long PUCCH in one slot.

The first signal and the second signal may contain a higher signal, a physical signal, or a combination of a higher signal and a physical signal. The first signal includes an OFDM symbol interval (or a start OFDM symbol and an end OFDM symbol) in the time region for transmission of the long PUCCH and PRBs in the frequency region, and the second signal includes an OFDM symbol interval (or a start OFDM symbol and an end OFDM symbol) in the time region in which transmission of the long PUCCH cannot be performed in one slot and PRBs in the frequency region.

The first method is suitable for uplink control channel transmission, such as periodic channel information transmission configured to the UE for period transmission without a scheduling grant, and the second method is suitable for uplink control channel transmission such as HARQ-ACK transmission configured to the UE for aperiodic transmission with a scheduling grant. Accordingly, it is determined whether to apply the first method or the second method depending on whether the uplink control channel transmitted by the UE is triggered by the scheduling grant or the transmitted uplink control information is periodic channel information or HARQ-ACK. That is, the first method may be applied to transmission of the uplink control channel configured to be transmitted by the UE without a scheduling grant, and the second method may be applied to the uplink control channel if transmission of the uplink control channel is triggered by the scheduling grant by the UE.

Alternatively, the UE may apply the first method to uplink control channel transmission corresponding to period channel information transmission and apply the second method to the uplink control channel for transmitting HARQ-ACK information.

Alternatively, the BS may configure the UE to always apply the first method or the second method through a higher signal. If the UE receives configuration information that indicates that the first method is always applied to the uplink control channel through a higher signal, the UE always applies the first method to transmit the uplink control channel. If the UE receives configuration information that indicates that the second method is always applied to the uplink control channel through a higher signal, the UE always applies the second method to transmit the uplink control channel.

A detailed description of the first method and the second method will be given below.

In the first method, the BS indicates an OFDM symbol interval (or a start OFDM symbol and an end OFDM symbol or OFDM symbols in which transmission of the long PUCCH should be avoided) for transmission of the long PUCCH in the downlink control channel to the UE. The downlink control channel may be common information to group UEs or all UEs within the cell, or may be dedicated information transmitted only to a specific UE. If long PUCCH transmission frequency resources of the UE overlap short PUCCH transmission frequency resources of another UE in the last OFDM symbol of the slot, the BS may prevent the long PUCCH transmission interval from being the last OFDM symbol.

For example, if the long PUCCH transmission interval supports OFDM symbols ranging from 4 OFDM symbols to 12 OFDM symbols (the uplink interval of the UL-centric slot 420 is 12 OFDM symbols), the BS indicates long PUCCH transmission in 11 OFDM symbols instead of long PUCCH transmission in 12 OFDM symbol through a bit field of the downlink control channel, and the UE transmits the long PUCCH in the 11 OFDM symbols. In another example, the long PUCCH transmission interval is configured as a set including at least one value of the limited symbol interval through a higher signal or defined according to a standard, for example, if transmission is performed only in 4, 6, 8, 10, and 12 OFDM symbols through a higher signal or defined according to the standard, the BS indicates long PUCCH transmission in 10 OFDM symbols through a bit field of the downlink control channel, and the UE transmits the long PUCCH in 10 OFDM symbols in order to avoid a collision with short PUCCH transmission resources in the last OFDM symbol.

Alternatively, the BS may indicate the interval for short PUCCH transmission (or whether the interval is the last OFDM symbol, the second-last OFDM symbol, or the last two OFDM symbols), thereby avoiding a resource collision with the long PUCCH.

In the second method, the BS configures an OFDM symbol interval (or a start OFDM symbol and an end OFDM symbol or OFDM symbols in which transmission of the long PUCCH should be avoided) for long PUCCH transmission to the UE through a higher signal. Short PUCCH transmission frequency resources may be configured to have distributed PRBs or localized PRBs. If short PUCCH transmission frequency resources have distributed PRBs, there is a high probability of a collision with short PUCCH transmission frequency resources, so the BS may prevent the long PUCCH transmission OFDM symbol interval from being OFDM symbols in which the short PUCCH is transmitted through a higher signal, that is, the last OFDM symbol. For example, the BS configures the long PUCCH transmission interval as 10 OFDM symbols to the UE through a higher signal, and the UE performs long PUCCH transmission in 10 OFDM symbols.

In the third method, the BS configures whether to perform long PUCCH transmission or short PUCCH transmission to the UE through a higher signal or a physical downlink control signal and correlates the OFDM symbol interval for long POUCCH transmission with the number of uplink OFDM symbols according to a slot format. However, information on whether long PUCCH transmission can be performed in the last one or two OFDM symbols is indicated to the UE. The UE may receive the configuration information and determine whether to transmit the long PUCCH or the short PUCCH. If the UE receives indication information and performs long PUCCH transmission, the UE determines whether long PUCCH transmission can be performed in the last one or two OFDM symbols. That is, if it is assumed that the uplink OFDM symbol interval is 11 OFDM symbols, the UE may determine that long PUCCH transmission is performed in 11 OFDM symbols on the basis of the uplink OFDM symbol interval of the slot, and may receive the indication information to determine whether to perform long PUCCH transmission in 11 OFDM symbols, 10 OFDM symbols, or 9 OFDM symbols. If the long PUCCH is transmitted in 10 OFDM symbol or 9 OFDM symbols, the long PUCCH symbols may be punctured or rate-matched from the back on the basis of the long PUCCH transmission in 11 OFDM symbols. Information on the uplink OFDM symbol interval of the slot may be received by the UE from the downlink control channel, and the downlink control channel may be common information to group UEs or all UEs in the cell, or may be dedicated information transmitted to specific UEs.

Figure 5A:
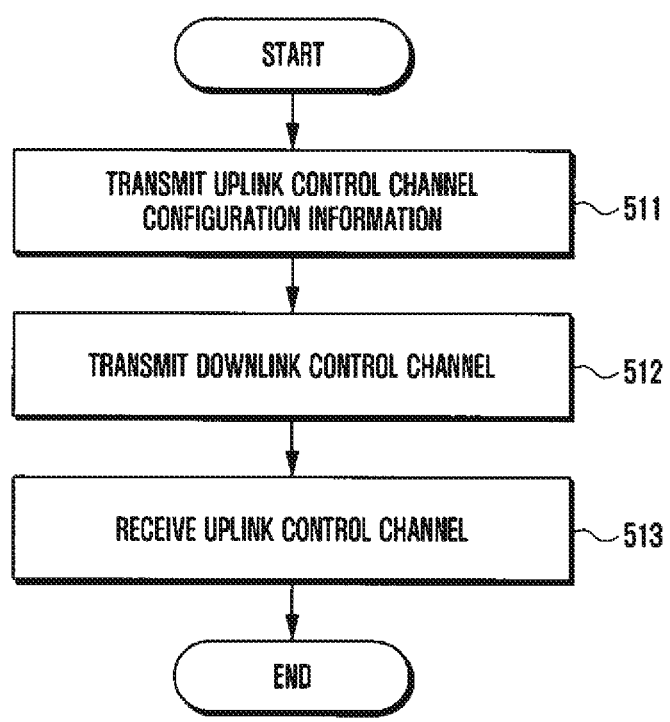
FIGS. 5A and 5B illustrate BS and UE procedures according to embodiment 1-1 of the disclosure.
Figure 5B:
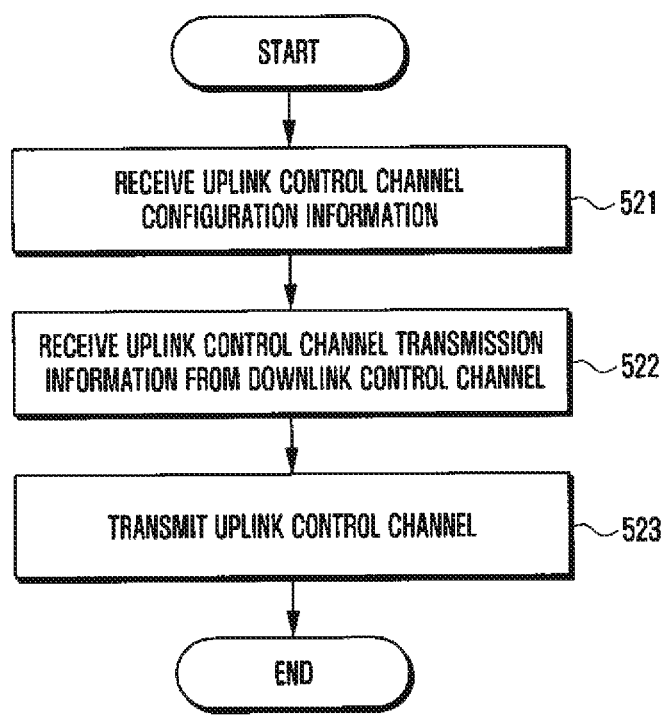

FIGS. 5A and 5B illustrate BS and UE procedures according to embodiment 1-1 of the disclosure.

First, the BS procedure will be described.

In step 511, the BS transmits uplink control channel configuration information to the UE. The uplink control channel configuration information may include frequency PRB resources of the long PUCCH or the short PUCCH or an available set including at least one value of the time OFDM symbol interval, as described in connection with FIG. 4, and the BS may transmit the information to the UE through a higher signal in order to avoid a short PUCCH or long PUCCH transmission resource collision between UEs.

In step 512, the BS transmits a downlink control channel to the UE. The downlink control channel may include a bit field indicating frequency PRBs of the short PUCCH or the long PUCCH, the time OFDM symbol interval, the start OFDM symbol and the end OFDM symbol, or an OFDM symbol through which the long PUCCH transmission should be avoided, as described in connection with FIG. 4, and the BS may transmit the information to the UE in order to avoid a short PUCCH or long PUCCH transmission resource collision between UEs. The downlink control channel may be common information to group UEs or all UEs within the cell, or may be dedicated information transmitted only to a specific UE.

In step 513, the BS receives an uplink control channel from the UE at the short PUCCH or long PUCCH transmission time through frequency resources indicated in step 511 or 512.

Next, the UE procedure will be described.

In step 521, the UE receives uplink control channel configuration information from the BS. The uplink control channel configuration information may include frequency PRB resources of the long PUCCH or the short PUCCH or an available set including at least one value of the time OFDM symbol interval, and the UE may receive the information from the BS through a higher signal in order to avoid a short PUCCH or long PUCCH transmission resource collision between UEs.

In step 522, the UE receives a downlink control channel from the BS. The downlink control channel may include a bit field indicating frequency PRBs of the short PUCCH or the long PUCCH, the time OFDM symbol interval, the start OFDM symbol and the end OFDM symbol, or an OFDM symbol through which the long PUCCH transmission should be avoided, as described in connection with FIG. 4, and the UE may receive the information from the BS in order to avoid short PUCCH or long PUCCH transmission resource collision between UEs. The downlink control channel may be common information to group UEs or all UEs within the cell, or may be dedicated information transmitted only to a specific UE.

In step 523, the UE transmits an uplink control channel to the BS at a short PUCCH or long PUCCH transmission time through the frequency resources indicated in step 521 or 522.

Figure 6:
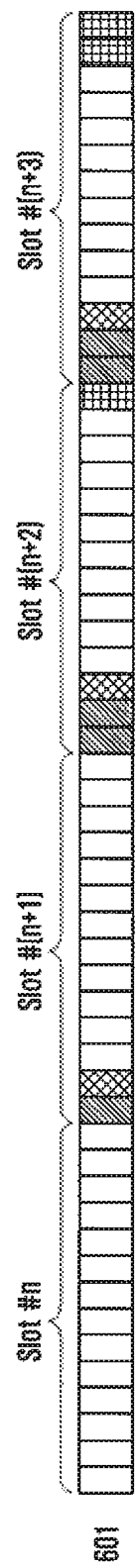
FIG. 6 illustrates embodiment 1-2 according to the disclosure.

FIG. 6 illustrates embodiment 1-2 according to the disclosure.

FIG. 6 illustrates a method by which the UE receives an OFDM symbol interval (or a start OFDM symbol location and an end OFDM symbol location or an OFDM symbol through iii which the long PUCCH is not transmitted) of the long PUCCH of the uplink control channel on the basis of the slot and transmits an uplink control channel, but may be applied to the case in which the UE receives an OFDM symbol interval (or a start OFDM symbol location and an end OFDM symbol location or an OFDM symbol through which the long PUCCH is not transmitted) of the long PUCCH of the uplink control channel on the basis of the mini-slot and transmits an uplink control channel.

There is a difference between FIG. 4 and FIG. 6 in that FIG. 4 considers the case in which uplink control channels, such as the long PUCCH and the short PUCCH or SRSs, collide within one slot, but FIG. 6 provides a method of avoiding a collision between transmission resources of the long PUCCH and transmission resources of the short PUCCH or the SRS transmitted through a plurality of slots when the long PUCCH is transmitted through the plurality of slots, that is, when slot aggregation is configured in the UE by a higher signal or indicated to the UE through an L1 signal.

As described above, 5G supports various slot formats, that is, a DL-dedicated slot, a DL-centric slot, a UL-dedicated slot, and a UL-centric slot. In each slot format, a downlink period, a GP, and an uplink period may be configured by various OFDM symbols. The slot format and the format structure (the number of OFDM symbols of the downlink period, the GP, and the uplink period) may be received by the UE through a higher signal or an L1 signal.

In order to improve coverage of the UE, slot aggregation may be configured in the UE through a higher signal, or may be indicated by an L2 signal. The UE in which slot aggregation is configured or for which slot aggregation is indicated and which is configured or indicated to transmit the long PUCCH transmits the long PUCCH through a plurality of slots. The number of slots for which slot aggregation is performed may be configured in or indicated to the UE by a higher signal or an L1 signal.

Like the slot format illustrated in FIG. 6, the plurality of slots may have various slot formats. If the UE is configured or indicated to perform slot aggregation through four slots, the number of uplink OFDM symbols through which the long PUCCH can be transmitted may vary depending on the slot format or the slot structure. It is assumed that slot #n is a UL-dedicated slot in which the long PUCCH can be transmitted through 14 OFDM symbols, slot #(n+1) is a UL-centric slot in which the long PUCCH can be transmitted through 12 OFDM symbols, and slot #(n+2) is a UL-centric slot in which the long PUCCH can be transmitted through 11 OFDM symbols, but transmission resources of the short PUCCH collide with transmission resources of the long PUCCH in the last symbol, and thus the long PUCCH can be actually transmitted through 10 OFDM symbols in FIG. 6. It is assumed that slot #(n+3) is a UL-centric slot in which the long PUCCH can be transmitted through 11 OFDM symbols but transmission resources of the short PUCCH and the SRS collide with transmission resources of the long PUCCH in the last two OFDM symbols, and thus the long PUCCH can be transmitted through 9 OFDM symbols. At this time, in order to avoid a collision with transmission resources of an uplink control channel in a short time region, such as the short PUCCH or the SRS, a method by which the BS indicates transmission resources of the long PUCCH to the UE is provided.

The method according to embodiment 1-2 of the disclosure may be broadly divided into two methods. In the first method, in order to avoid a collision between transmission resources of the long PUCCH and transmission resources of the uplink control channel in the short time region in a plurality of slots for which slot aggregation is configured by a third signal, the BS directly indicates the transmission resources of the long PUCCH to the UE through a first signal. Accordingly, the UE determines the plurality of slots to which slot aggregation is applied through the third signal and transmits the long PUCCH in the transmission resources indicated by the plurality of slots through reception of the first signal.

The first signal or the third signal may be configured by a higher signal, a physical signal, or a combination of the higher signal and the physical signal. The first signal may include an OFDM symbol interval (or a start OFDM symbol and an end OFDM symbol) in the time region and PRBs in the frequency region for transmission of the long PUCCH corresponding to the number of slots applied to slot aggregation in order to apply the same to each slot of a plurality of slots to which the slot aggregation is applied. Alternatively, the first signal may include an OFDM symbol interval (or a start OFDM symbol and an end OFDM symbol) in the time region and PRBs in the frequency region for transmission of the long PUCCH to be applied to a plurality of slots to which the slot aggregation is applied in common. The third signal includes relevant information for performing slot aggregation, such as information on the number of slots to which slot aggregation is applied and information on the index of the slot to which slot aggregation is applied.

In the second method, the BS directly/indirectly indicates transmission resources of the long PUCCH in one slot to the UE in advance through a first signal or definition according to a standard for correlating transmission resources of the long PUCCH from the number of uplink/downlink OFDM symbols and the number of GP OFDM symbols of the slot and reduces or controls the indicated transmission resources of the long PUCCH in a plurality of slots for which slot aggregation is configured through a second signal in order to avoid a collision with transmission resources of an uplink control channel in a short time region in the plurality of slots for which slot aggregation is configured through a third signal. The UE determines a transmission interval of the long PUCCH in advance from reception of the first signal or the number of uplink/downlink OFDM symbols and the number of GP OFDM symbols, determines a plurality of slots to which slot aggregation is to be applied through the third signal, controls transmission resources of the long PUCCH in the plurality of slots through reception of the second signal, and transmits the long PUCCH. The first signal, the second signal, and the third signal may be configured by a higher signal, a physical signal, or a combination of the higher signal and the physical signal.

The first signal includes the OFDM symbol interval (or the start OFDM symbol and the end OFDM symbol) in the time region and PRBs in the frequency region for transmission of the long PUCCH.

The second signal may include an OFDM symbol interval (or a start OFDM symbol and an end OFDM symbol) in the time region and PRBs in the frequency region, in which the long PUCCH cannot be transmitted, corresponding to the number of slots to which slot aggregation is applied in order to apply the same to each slot of a plurality of slots to which the slot aggregation is applied. Alternatively, the second signal may include an OFDM symbol interval (or a start OFDM symbol and an end OFDM symbol) in the time region and PRBs in the frequency region, in which the long PUCCH cannot be transmitted, in order to apply the same to a plurality of slots to which the slot aggregation is applied in common.

The third signal includes relevant information for performing slot aggregation, such as information on the number of slots to which slot aggregation is applied and information on the index of the slot to which slot aggregation is applied.

The first method is suitable for uplink control channel transmission such as periodic channel information transmission configured in the UE for period transmission without a scheduling grant, and the second method is suitable for uplink control channel transmission such as HARQ-ACK transmission configured in the UE for aperiodic transmission with a scheduling grant. Accordingly, whether to apply the first method or the second method is determined according to whether the uplink control channel transmitted by the UE is triggered by the scheduling grant or transmitted uplink control information is periodic channel information or HARQ-ACK. That is, the first method may be applied to transmission of the uplink control channel configured to be transmitted by the UE without a scheduling grant, and the second method may be applied to the uplink control channel if transmission of the uplink control channel is triggered by the scheduling grant by the UE.

Alternatively, the UE may apply the first method to uplink control channel transmission corresponding to period channel information transmission and apply the second method to the uplink control channel for transmitting HARQ-ACK information.

Alternatively, the BS may configure the UE to always apply the first method or the second method through a higher signal. If the UE receives configuration information for always applying the first method to the uplink control channel through a higher signal, the UE always applies the first method to transmit the uplink control channel. If the UE receives configuration information for always applying the second method to the uplink control channel through a higher signal, the UE always applies the second method to transmit the uplink control channel.

A detailed description of the first method and the second method will be provided below.

In the first method, if slot aggregation is configured by a set higher signal or if slot aggregation is indicated by a downlink control channel, the BS indicates an OFDM symbol interval (for example, a max. OFDM symbol interval) (or a start OFDM symbol and an end OFDM symbol or whether the OFDM symbol in which long PUCCH transmission should be avoided is the last symbol or the last two OFDM symbols) for long PUCCH transmission to the UE through the higher signal or the downlink control channel. The downlink control channel may be common information to group UEs or all UEs within the cell, or may be dedicated information transmitted only to specific UEs.

In the above example, the BS may configure the long PUCCH transmission interval as OFDM symbols in which long PUCCH transmission can be performed among 14 OFDM symbols available in slot #n, 12 OFDM symbols available in slot #(n+1), 10 OFDM symbols available in slot #(n+2), and 9 OFDM symbols available in slot #(n+3). For example, if the long PUCCH transmission interval supports a number of OFDM symbols ranging from 4 OFDM symbols to 12 OFDM symbols, the BS indicates long PUCCH transmission in 9 OFDM symbols through a bit field of the downlink control channel and the UE transmits the long PUCCH in 9 OFDM symbols in each of the four slots including slot #n to slot #(n+3). In another example, if the long PUCCH transmission interval is configured as a set of the limited symbol interval through a higher signal or defined according to a standard, for example, if transmission is performed only in 4, 6, 8, 10, and 12 OFDM symbols through a higher signal or defined according to a standard, the BS indicates long PUCCH transmission in 8 OFDM symbols through a bit field of the downlink control channel and the UE transmits the long PUCCH in 8 OFDM symbols in order to avoid a collision with short PUCCH or SRS transmission resources in all slots belonging to slot aggregation.

In the second method, if slot aggregation is configured through a higher signal or slot aggregation is indicated by a downlink control channel, the BS indicates in advance an OFDM symbol interval (or a start OFDM symbol and an end OFDM symbol, or whether the OFDM symbol in which long PUCCH transmission should be avoided is the last OFDM symbol or the last two OFDM symbols) for all slots belonging to slot aggregation to the UE.

The downlink control channel may be common information to group UEs or all UEs within the cell, or may be dedicated information transmitted only to specific UEs. In the above example, the BS configures the long PUCCH transmission interval as 11 symbols to the UE through a higher signal, and indicates 14 OFDM symbols available in slot #n, 12 OFDM symbols available in slot #(n+1), 10 OFDM symbols available in slot #(n+2), and 9 OFDM symbols available in slot #(n+3) through the downlink control channel. For example, if the long PUCCH transmission interval supports OFDM symbols ranging from 4 OFDM symbols to 12 OFDM symbols, the BS configures long PUCCH transmission in 11 OFDM symbols through a higher signal and indicates whether long PUCCH transmission can be transmitted in the last OFDM symbol or the last two OFDM symbols in the four slots from slot #n to slot #(n+3) through the downlink control channel. The UE receives the configuration information and indication information and transmits the long PUCCH in 11, 11, 10, and 9 OFDM symbols in the four slots from slot #n to slot #(n+3), respectively. In another example, if the long PUCCH transmission interval is configured as a set of the limited symbol interval through a higher signal or defined according to a standard, for example, if transmission is performed only in 4, 6, 8, 10, 1.0 and 12 OFDM symbols through a higher signal or defined according to a standard, the BS indicates long PUCCH transmission in 10 OFDM symbols through the higher signal and indicates whether long PUCCH transmission can be performed in the last OFDM symbol or the last two OFDM symbols in the four slots from slot #n to slot #(n+3) through the downlink control channel in order to avoid a collision with short PUCCH or SRS transmission resources in all slots belonging to slot aggregation. The UE receives the configuration information and indication information and transmits the long PUCCH in 10, 10, 10, and 8 OFDM symbols in the four slots from slot #n to slot #(n+3), respectively.

In the third method, the BS configures an OFDM symbol interval (or a start OFDM symbol and an end OFDM symbol or OFDM symbols in which transmission of the long PUCCH should be avoided) for long PUCCH transmission to the UE through a higher signal. Short PUCCH transmission frequency resources may be configured to have distributed PRBs or localized PRBs.

If short PUCCH transmission frequency resources have distributed PRBs, there is a high probability of a collision with short PUCCH transmission frequency resources, so that the BS may prevent the long PUCCH transmission OFDM symbol interval from being OFDM symbols (for example, the last OFDM symbol) in which the short PUCCH is transmitted through a higher signal. For example, if the BS configures the long PUCCH transmission interval as 8 OFDM symbols to the UE through a higher signal and is further configured to perform slot aggregation, the UE performs long PUCCH transmission in 8 OFDM symbols in all slots belonging to slot aggregation.

In the fourth method, the BS configures whether to perform long PUCCH transmission or short PUCCH transmission to the UE through a higher signal or a physical downlink control signal and correlates the OFDM symbol interval for long POUCCH transmission with the number of uplink OFDM symbols according to a slot format. At this time, the BS indicates information on whether long PUCCH transmission can be performed in the last one or two OFDM symbols in each or all of the slots belonging to slot aggregation to the UE through the higher signal or the physical signal. The UE may receive the configuration information and determine whether to transmit the long PUCCH or the short PUCCH. If the UE receives the indication information and performs long PUCCH transmission, the UE determines whether long PUCCH transmission can be performed in the last one or two OFDM symbols in all slots belonging to slot aggregation. In the indication information, one bit field may be applied to all slots belonging to slot aggregation, or each bit field may be applied to each slot. If one bit field is applied to all slots belonging to slot aggregation, it is assumed that long PUCCH transmission cannot be performed in the last OFDM symbol. If it is assumed that uplink OFDM symbol intervals are 14, 12, 11, and 9 OFDM symbols in all slots belonging to slot aggregation, the UE determines that long PUCCH transmission is performed in 14, 12, 11, and 9 OFDM symbols from the uplink OFDM symbol intervals in the slots, receive the indication information, and performs long PUCCH transmission in 13, 11, 10, and 8 OFDM symbols in the slots. If the long PUCCH transmission is performed in 13, 11, 10, and 8 OFDM symbols, the long PUCCH symbols may be punctured or rate-matched from the back on the basis of the long PUCCH transmission in 14 OFDM symbols. Information on the uplink OFDM symbol interval of the slot may be received by the UE from the downlink control channel, and the downlink control channel may be common information to group UEs or all UEs in the cell, or may be dedicated information transmitted to specific UEs.

Figure 7A:
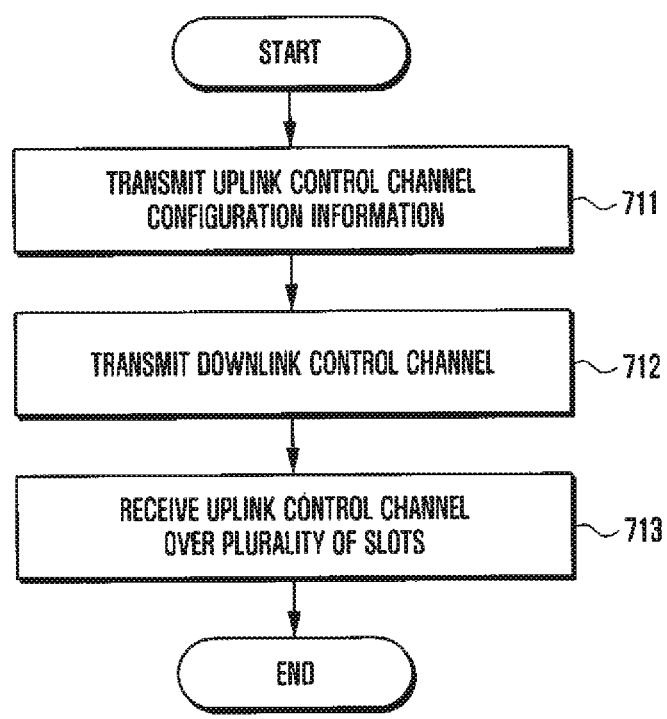
FIGS. 7A and 7B illustrate BS and UE procedures according to embodiment 1-2 of the disclosure.
Figure 7B:
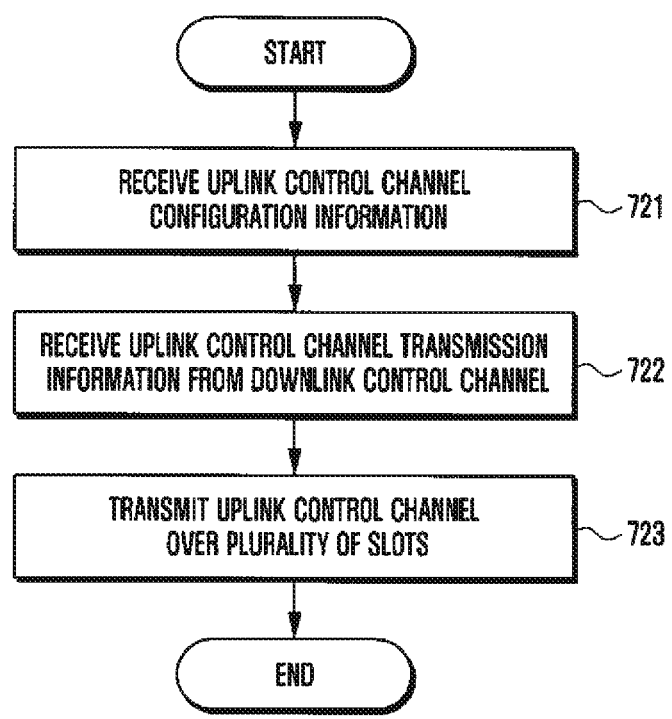

FIGS. 7A and 7B illustrate BS and UE procedures according to embodiment 1-2 of the disclosure.

First, the BS procedure will be described.

In step 711, the BS transmits uplink control channel configuration information to the UE. The uplink Control channel configuration information may include frequency FRB resources of the long PUCCH or the short PUCCH, an available set including at least one value of the time OFDM symbol interval, information required for slot aggregation (the number of slots belonging to slot aggregation), or an available OFDM symbol interval in which the long PUCCH can be transmitted in a plurality of slots belonging to slot aggregation, as described in connection with FIG. 4 or FIG. 6, and the BS may transmit the uplink control channel configuration information to the UE through a higher signal in order to avoid a short PUCCH or long PUCCH transmission resource collision between UEs.

In step 712, the BS transmits a downlink control channel to the UE. The downlink control channel may include the frequency PRBs of the short PUCCH or the long PUCCH, the time OFDM symbol interval, the start OFDM symbol and the end OFDM symbol, the bit field indicating the OFDM symbol in which transmission of the long PUCCH is avoided, information required for slot aggregation (the number of slots belonging to slot aggregation), and the available OFDM symbol interval in which the long PUCCH can be transmitted in a plurality of slots belonging to slot aggregation, and the BS may transmit the downlink control channel to the UE in order to avoid a short PUCCH or long PUCCH transmission resource collision between UEs. The downlink control channel may be common information to group UEs or all UEs within the cell or may be dedicated information transmitted only to a specific UE.

In step 713, the BS receives an uplink control channel from the UE at the short PUCCH or long PUCCH transmission time through frequency resources indicated in step 711 or 712 over a plurality of slots.

Next, the UE procedure will be described.

In step 721, the UE receives uplink control channel configuration information from the BS, The uplink control channel configuration information may include frequency PRB resources of the long PUCCH or the short PUCCH, an available set including at least one value of the time OFDM symbol interval, information required for slot aggregation (the number of slots belonging to slot aggregation), or an available OFDM symbol interval in which the long PUCCH can be transmitted in a plurality of slots belonging to slot aggregation, as described in connection with FIG. 4 or FIG. 6, and the UE may receive the uplink control channel configuration information from the BS through a higher signal in order to avoid a short PUCCH or long PUCCH transmission resource collision between UEs.

In step 722, the UE receives a downlink control channel from the BS. The downlink control channel may include the frequency PRBs of the short PUCCH or the long PUCCH, the time OFDM symbol interval, the start OFDM symbol and the end OFDM symbol, the bit field indicating the OFDM symbol in which transmission of the long PUCCH is avoided, information required for slot aggregation (the number of slots belonging to slot aggregation), and the available OFDM symbol interval in which the long PUCCH can be transmitted in a plurality of slots belonging to slot aggregation, and the UE may receive the downlink control channel in order to avoid a short PUCCH or long PUCCH transmission resource collision between UEs. The downlink control channel may be common information to group UEs or all UEs within the cell, or may be dedicated information transmitted only to a specific UE.

In step 723, the UE transmits an uplink control channel to the BS at the short PUCCH or long PUCCH transmission time through frequency resources indicated in step 721 or 722 over a plurality of slots.

Figure 8:
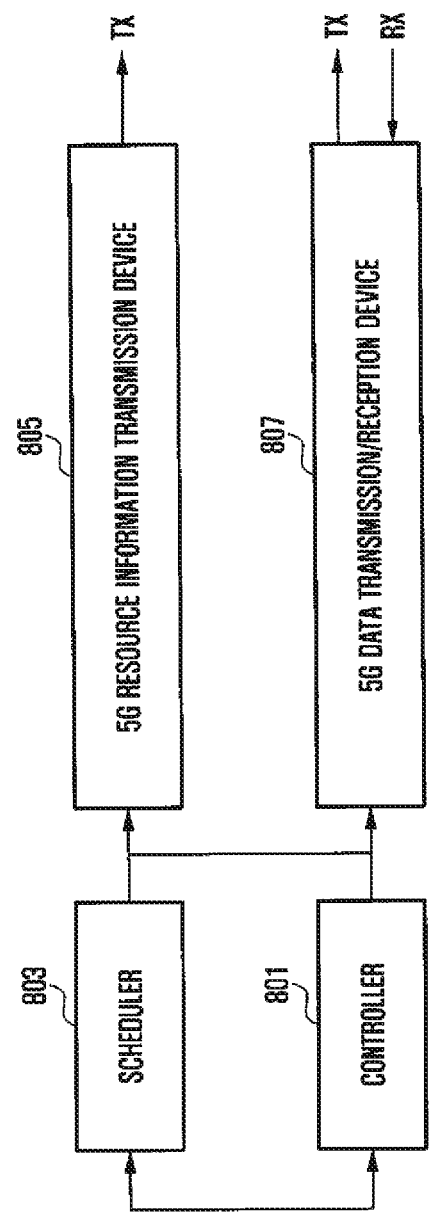
FIG. 8 illustrates a BS apparatus according to the disclosure.

Next, FIG. 8 illustrates a BS apparatus according to the disclosure.

A controller 801 transmits the BS procedure according to FIG. 5 and FIGS. 7A and 7B of the disclosure and the uplink control channel configuration and the uplink control channel according to FIGS. 4 and 6 of the disclosure to the UE through a 5G control information transmission device 805 and a 5G data transmission/reception device 807 by controlling uplink control channel transmission resources according to a frequency transmission resource configuration method and transmits and receives 5G data to and from the 5G UE through the 5G data transmission/reception device 807 after a scheduler 803 schedules the 5G data.

Figure 9:
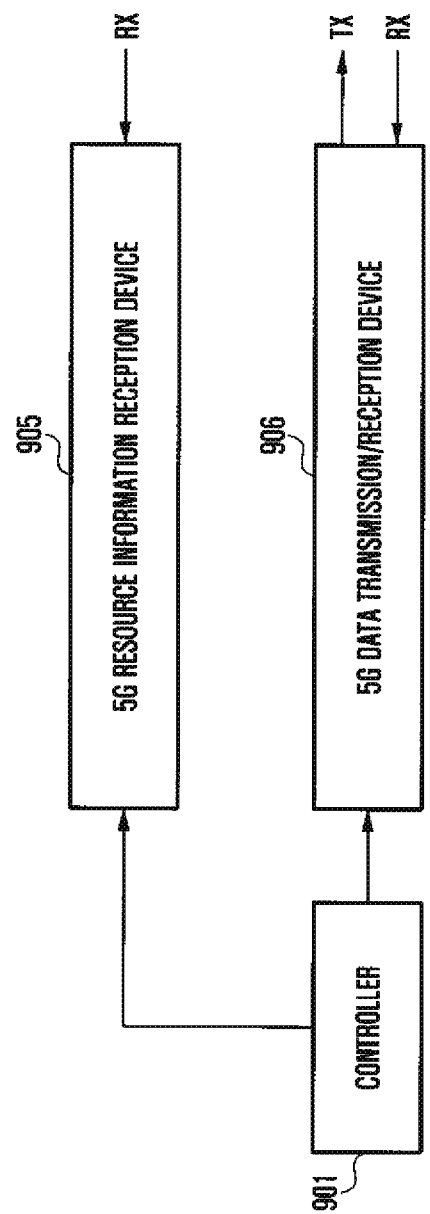
FIG. 9 illustrates a UE apparatus according to the disclosure.

Next, FIG. 9 illustrates a UE apparatus according to the disclosure.

The UE receives an uplink control channel transmission resource location from the BS through a 5G control information reception device 905 and a 5G data transmission/reception device 906 by receiving the UE procedure of FIGS. 5A and 5B and FIGS. 7A and 7B and the uplink control channel configuration and the uplink control channel of FIGS. 4 and 6 through the time and frequency transmission resource configuration method.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

Second Embodiment

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

In order to process the recent explosive increase in mobile data traffic, discussion on a $5^{th}$-generation (5G) system or new radio (NR) access technology to replace long-term evolution (LTE) (or evolved universal terrestrial radio access (E-UTRA)) and LTE-advanced (LTE-A or E-UTRA Evolution) has been actively conducted. While the conventional mobile communication system generally focuses on voice/data communication, the 5G system aims to meet various services and requirements such as eMBB service, ultra-reliable low-latency communication service, and massive machine-type communication (MTC) supporting massive machine-to-machine communication.

While the bandwidth of a system transport band (transmission bandwidth) for a single carrier in the conventional LTE and LTE-A systems is limited to a maximum of 20 MHz, the 5G system mainly aims to support a super-high-speed data service reaching several Gbps using an ultra-wide bandwidth which is significantly wider than the LTE and LTE-A systems. Accordingly, the 5G system considers, as a candidate frequency, an ultra-high-frequency band from several GHz in which guaranteeing an ultra-wide bandwidth frequency is relatively easy to a maximum of 100 GHz. In addition, securing a wide bandwidth frequency for the 5G system by rearranging or allocating frequencies among the frequency bands included in hundreds of MHz to several GHz used by the conventional mobile communication system is under consideration.

The radio wave of the ultra-high-frequency band is also called a millimeter wave (mmWave), having a wavelength of several mm. However, since a propagation path loss increases in proportion to frequency band in an ultra-high-frequency band, coverage of the mobile communication system becomes smaller.

In order to remove the disadvantage of the decreased coverage of the ultra-high-frequency band, a beam forming technology for increasing an arrival distance of the radio wave by concentrating the radiation energy of the radio wave on a predetermined target point through a plurality of antennas is an important issue. That is, signals to which the beamforming technology is applied have a relatively narrower beam width, and the arrival distance of the radio wave increases since radiation energy is concentrated within the narrowed beam width. The beamforming technology may be applied to each of a transmission end and a reception end.

The beamforming technology has not only a coverage increase effect but also an effect of reducing interference in areas out of the beamforming direction. In order to operate the beamforming technology, an accurate method of measuring and feeding back transmitted/received beams is needed. The beamforming technology may be applied to a control or data channel arranged between a predetermined UE and a predetermined BS in one-to-one correspondence. Further, in order to increase coverage, the beamforming technology may be applied to a common signal that the BS transmits to a plurality of UEs within the system, for example, a synchronization signal, a physical broadcast channel (PBCH), and a control channel and a data channel for transmitting system information.

If the beamforming technology is applied to the common signal, a beam-sweeping technology for changing a beam direction and transmitting a signal may be additionally applied, and thus the common signal may reach UEs positioned at a predetermined location within the cell.

Another requirement of the 5G system is an ultra-low-latency service having a transmission delay between transmission and reception ends of about 1 ms. In order to reduce the transmission delay, it is required to design a frame structure based on a shorter TTI compared to LTE and LTE-A. The TTI is a basic time unit for scheduling, and the TTI in the conventional LTE and LTE-A systems is 1 ms, corresponding to one subframe length. For example, the short TTI to meet requirements of the ultra-low-latency service of the 5G system may include TTIs of 0.5 ms, 0.2 ms, and 0.1 ms, shorter than that of the conventional LTE and LTE-A systems. Hereinafter, the frame structure of the LTE and LTE-A systems will be described with reference to the accompanying drawings and the design direction of the 5G system will be described.

Figure 10:
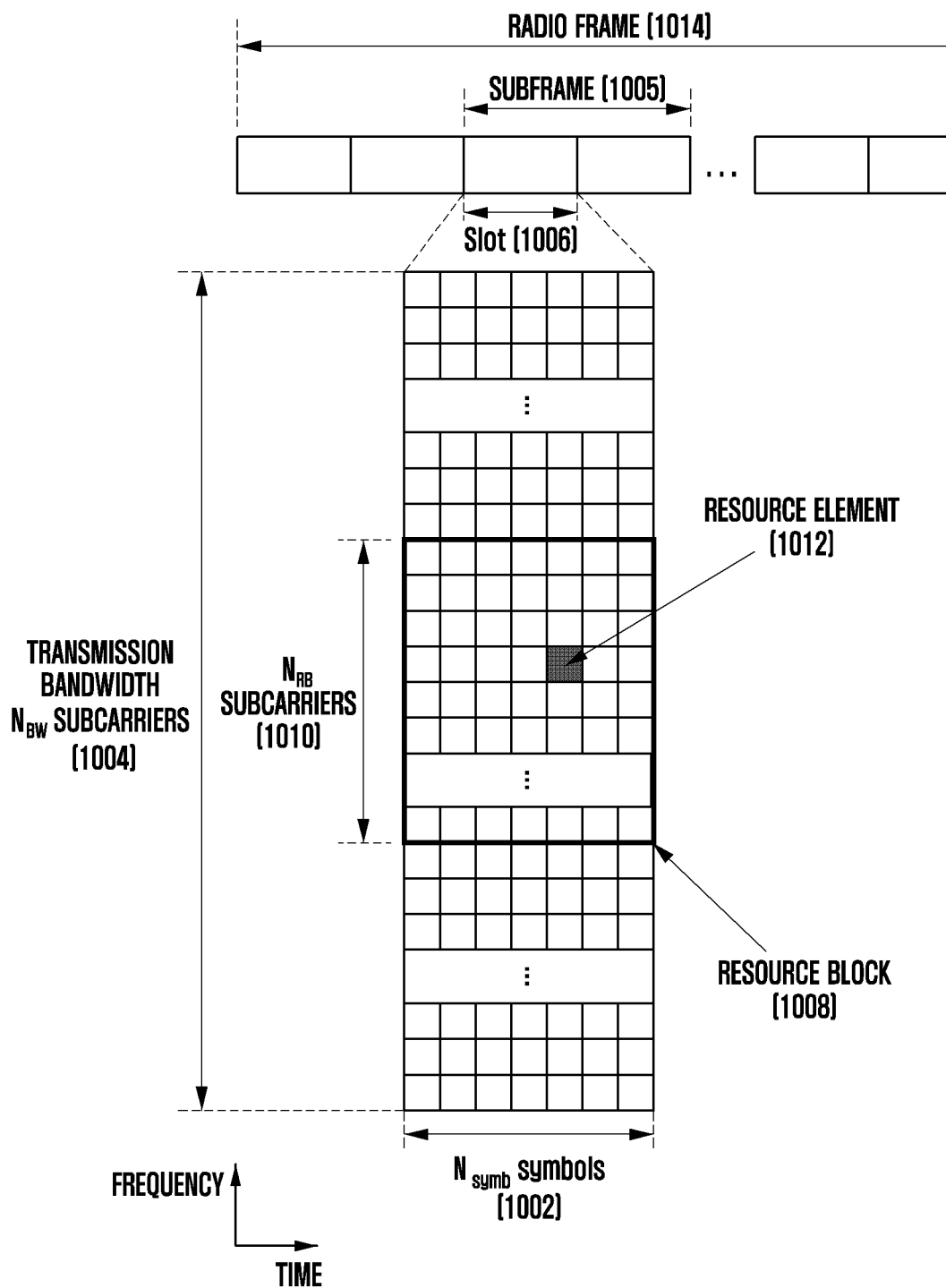
FIG. 10 illustrates the basic structure of a time-frequency resource region, which is a radio resource region in which a data or control channel of LTE and LTE-A systems are transmitted.

FIG. 10 illustrates the basic structure of the time-frequency resource region, which is the radio resource region in which data or a control channel of LTE and LTE-A systems is transmitted.

In FIG. 10, the horizontal axis indicates a time region and the vertical axis indicates a frequency region. Uplink (UL) is a radio link through which the UE transmits data or a control signal to the BS and downlink (DL) is a radio link through which the BS transmits data or a control signal to the UE. A minimum transmission unit in the time region of the LTE and LTE-A systems is an OFDM symbol in the case of downlink and is a single-carrier frequency-division multiple access (SC-FDMA) symbol in the case of the uplink, and one slot 1006 consists of $N_{symb}$ symbols 1002 and one subframe 1005 consists of two slots. The length of one slot is 0.5 ms, and the length of one subframe is 1 ms. A radio frame 1014 is a time region unit including ten subframes. The minimum transmission unit in the frequency region is a subcarrier (subcarrier spacing 15 kHz), and the entire system transport band (transmission bandwidth) consists of a total of $N_{BW}$ subcarriers 1004.

The basic unit of resources in the time-frequency region is a resource element (RE) 112, and may be indicated by an OFDM symbol or an SC-FDMA symbol index and a subcarrier index. A resource block (RB) (or physical resource block (PRB)) 108 is defined by $N_{symb}$ contiguous OFDM symbols 1002 in the time region and $N_{RB}$ contiguous subcarriers 1010 in the frequency region. Therefore, one RB 1008 consists of $N_{symb} \times N_{RB}$ REs 1012.

In the LTE and LTE-A systems, data is mapped in units of RBs, and the BS performs scheduling in units of RB pairs included in one subframe for a predetermined UE. $N_{symb}$, which is the number of SC-FDMA symbols or OFDM symbols, is determined according to the length of a cyclic prefix (CP) added to every symbol in order to prevent inter-symbol interference, and, for example, $N_{symb}=7$ if a normal CP is applied and $N_{symb}=6$ if an expanded CP is applied. Compared to the normal CP, the expanded CP may be applied to a system having a relatively longer propagation transmission distance, thereby maintaining inter-symbol orthogonality.

The subcarrier spacing and the CP length are information necessary for OFDM transmission and reception, and smooth transmission and reception are possible only when the BS and the UE recognize a common value as the information.

$N_{BW}$ and $N_{RB}$ are proportional to the bandwidth of the system transport band. The data rate increases in proportion to the number of RBs scheduled to the UE.

The frame structure of the LTE and LTE-A systems is a design made in consideration of normal voice and data communication and has a limitation on expandability to meet various services and requirements such as the 5G system. Accordingly, the 5G system is required to flexibly define and operate the frame structure in consideration of various services and requirements.

Figure 11:
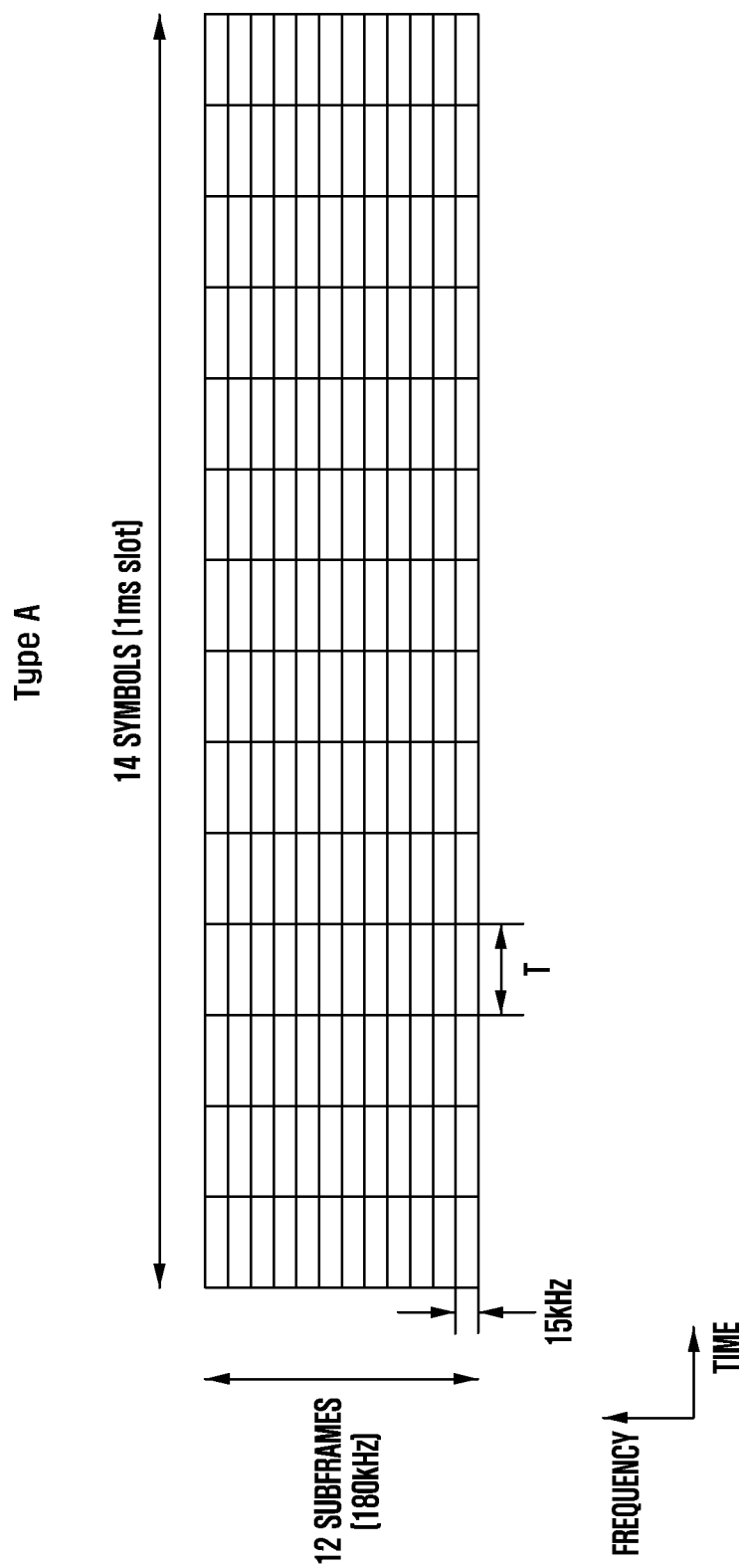
FIG. 11 illustrates an example of an expanded frame structure of a 5G system.
Figure 12:
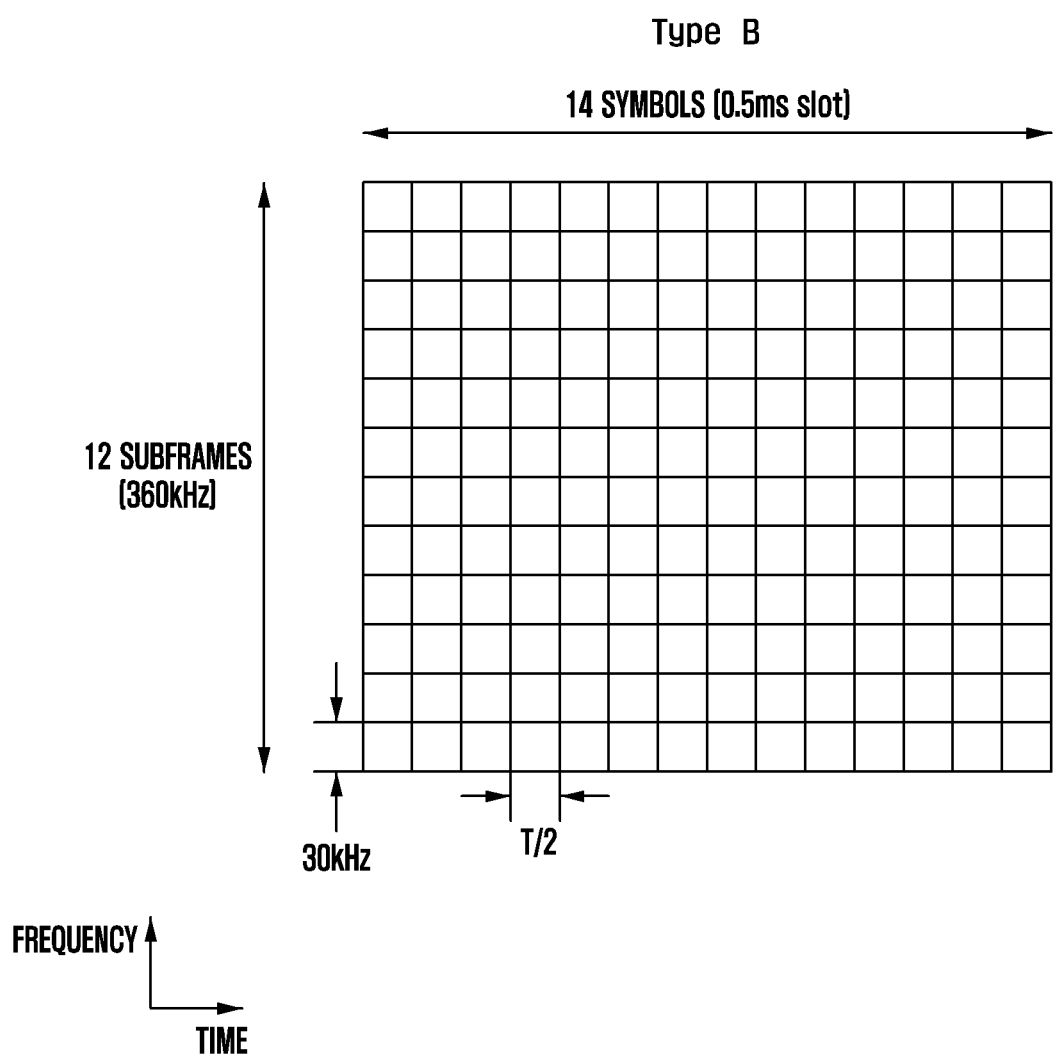
FIG. 12 illustrates another example of an expanded frame structure of a 5G system.
Figure 13:
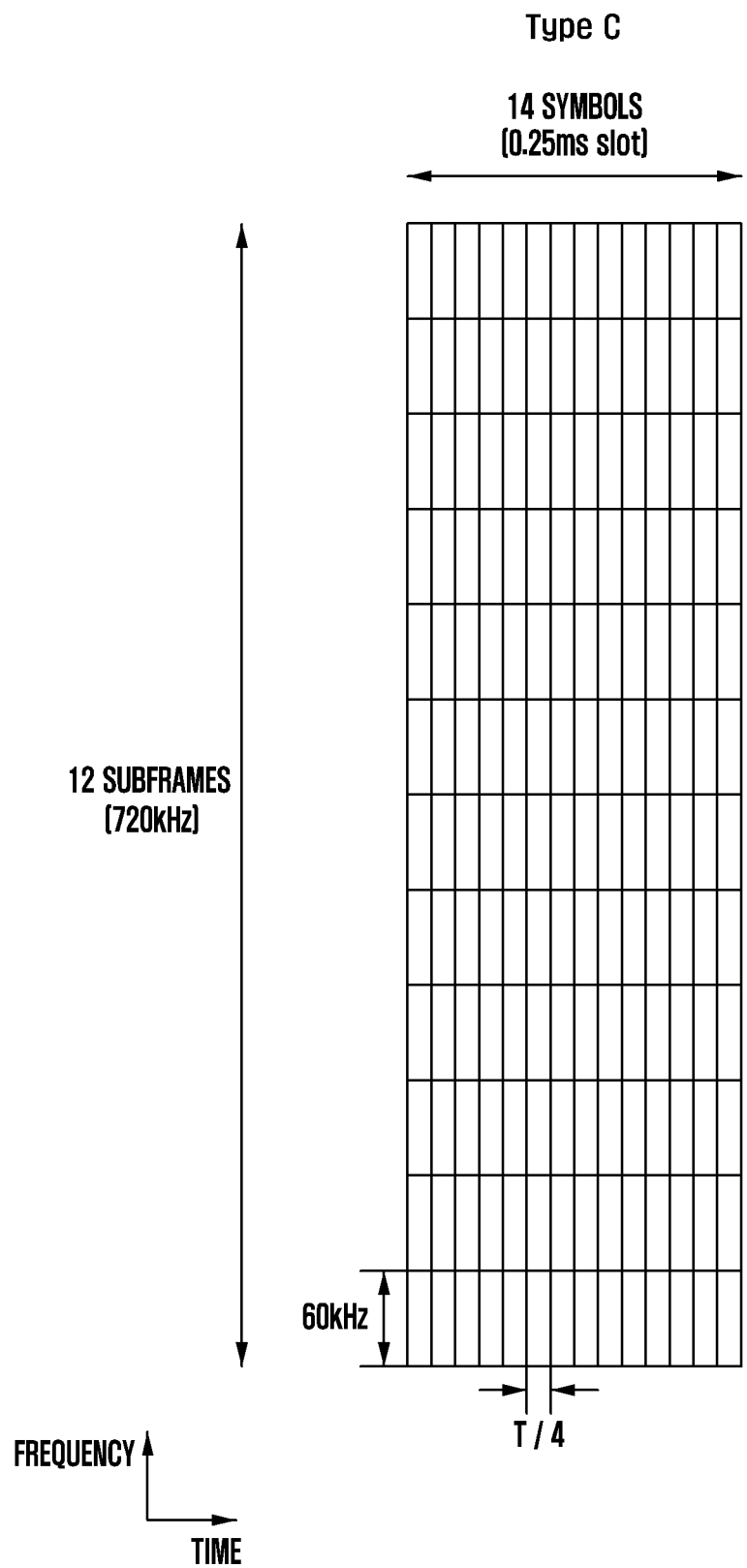
FIG. 13 illustrates another example of an expanded frame structure of a 5G system.

FIGS. 11, 12, and 13 illustrate examples of the expanded frame structure.

In the examples of FIGS. 11, 12, and 13, a set of necessary parameters for defining the expanded frame structure includes subcarrier spacing, CP length, and slot length. In the 5G system, the basic time unit to perform scheduling is a slot.

At the beginning of the 5G system, at least the coexistence of LTE/LTE-A system or dual-mode operation is expected. Accordingly, LTE/LTE-A may provide stable system operation and the 5G system may serve to provide an improved service. Therefore, the expanded frame structure of the 5G system needs to include at least the frame structure of LTE/LTE-A or a set of the necessary parameters.

FIG. 11 illustrates the 5G frame structure which is the same as the LTE/LTE-A frame structure or the necessary parameter set.

Referring to FIG. 11, in frame structure type A, subcarrier spacing is 15 kHz, 14 symbols constitute a slot of 1 ms, and 12 subcarriers (=180 kHz=12×15 kHz) constitute a PRB.

FIG. 12 illustrates a frame structure type B in which subcarrier spacing is 30 kHz, 14 symbols constitute a slot of 0.5 ms, and 12 subcarriers (=360 kHz=12×30 kHz) constitute a PRB. That is, compared to frame structure type A, the subcarrier spacing and the PRB size are twice as large and the slot length and the symbol length are half the size in frame structure type B.

FIG. 13 illustrates frame structure type C in which subcarrier spacing is 60 kHz, 14 symbols constitute a slot of 0.25 ms, and 12 subcarriers (=720 kHz=12×60 kHz) constitute a PRB. That is, compared to frame structure type A, the subcarrier spacing and the PRB size are four times as large and the slot length and the symbol length are one fourth the size in frame structure type C.

That is, when the frame structure type is generalized, the subcarrier spacing, the CP length, and the slot length that correspond to the necessary parameter set of each frame structure type have the relationship of an integer multiple, thereby providing high expandability. In order to indicate a reference time unit irrelevant to the frame structure type, a subframe of a fixed length of 1 ms is defined. Accordingly, one subframe consists of one slot in frame structure type A, one subframe consists of two slots in frame structure type B, and one subframe consists of four slots in frame structure type C.

The above-described frame structure types may be applied to correspond to various scenarios. From the viewpoint of cell size, a larger cell can be supported as the CP length is longer, so that frame structure type A may support a relatively larger cell than frame structure types B and C. From the viewpoint of the operation frequency band, a longer subcarrier spacing is advantageous for reconstruction of phase noise of a high frequency band, and thus frame structure type C may support a relatively higher operation frequency than frame structure types A and B. From the viewpoint of service, as the slot length, which is the basic time unit, is shorter, it is more advantageous to support an ultra-low-latency service like URLLC, so that frame structure type C is relatively more suitable for the URLLC service than frame structure types A and B.

Further, the several frame structure types may be multiplexed and integratedly operated within one system.

[Table 2] shows the mutual correspondence relationship between the subcarrier interval applied to a synchronization signal, the subcarrier spacing applied to a data channel or a control channel, and the frequency band in which the system operates among the necessary parameter set for defining the expanded frame structure. The UE performs time/frequency synchronization to the most appropriate cell through a cell search in an initial access step in which the UE accesses the system and obtains system information from the corresponding cell. The synchronization signal is a signal which is the reference of the cell search, and subcarrier spacing suitable for a channel environment such as phase noise is applied to each frequency band.

In the case of a data channel or a control channel, different subcarrier spacings are applied depending on the service type in order to support various services as described above. However, since the cell search step is a step before the UE transmits and receives data in earnest, it is required to minimize the increase in unnecessary UE complexity. Accordingly, subcarrier spacing applied to the synchronization signal is maintained as a single value within the frequency band within which the UE performs the cell search.

According to the example of [Table 2], in frequency band A, the subcarrier spacing applied to the synchronization signal is defined as a single value of 15 kHz and the subcarrier spacing applied to the data channel or the control channel is defined as a plurality of values of 15, 30, and 60 kHz. In frequency band B, the subcarrier spacing applied to the synchronization signal is defined as a single value of 30 kHz and the subcarrier spacing applied to the data channel or the control is defined as a plurality of values of 15, 30, and 60 kHz.

The subcarrier spacing to be actually applied to the data channel or the control channel may be provided to the UE through higher-layer signaling or physical layer signaling. In [Table 2], it is assumed that frequency bands A, B, C, and D have the relationship A<B<C<D therebetween.

| Frequency band | Subcarrier spacing (synchronization signal) | Subcarrier spacing (data channel) |
| --- | --- | --- |
| A | 15 kHz | 15, 30, 60 kHz |
| B | 30 kHz | 15, 30, 60 kHz |
| C | 120 kHz | 60, 120, 240 kHz |
| D | 240 kHz | 60, 120, 240 kHz |

Figure 14:
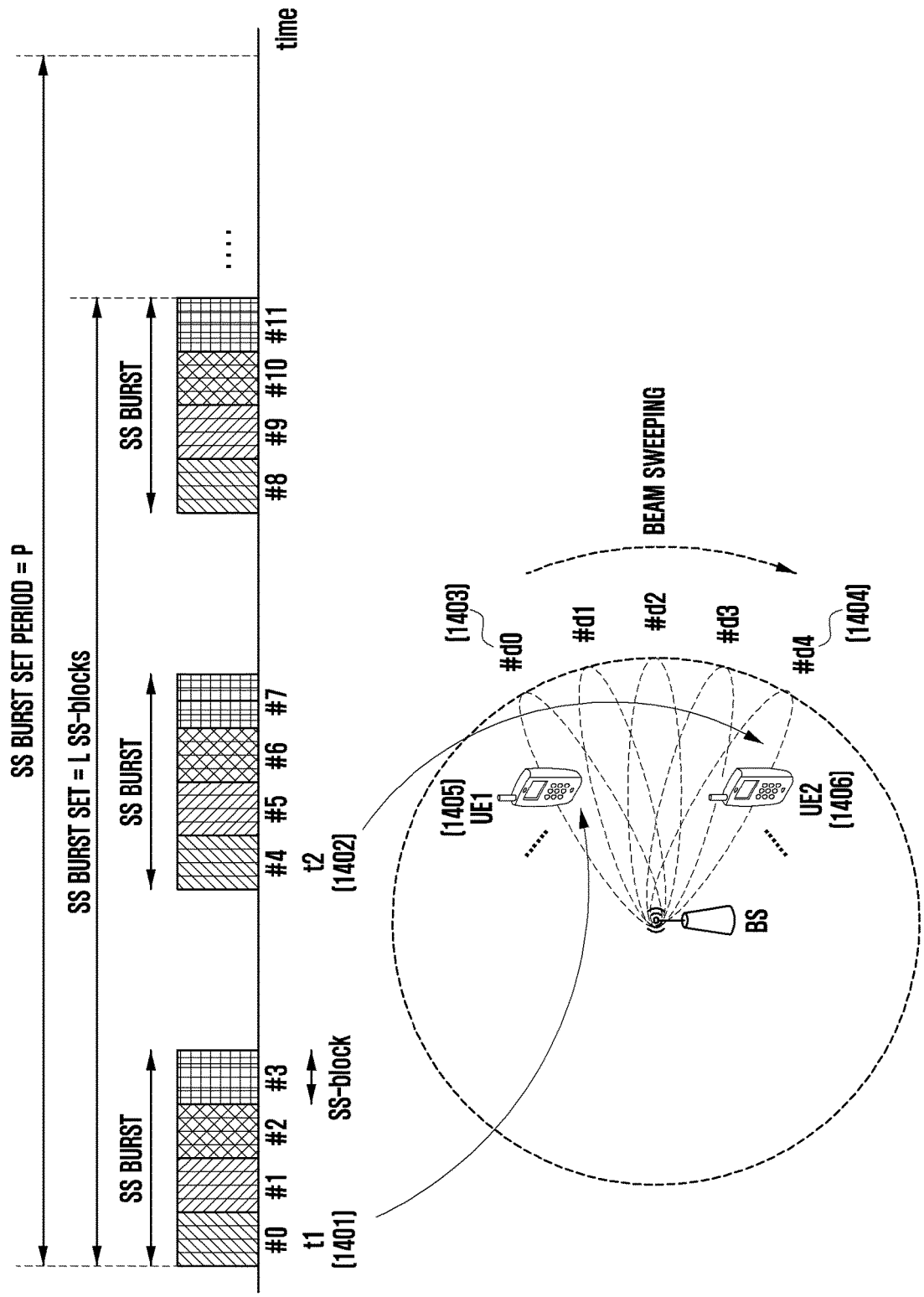
FIG. 14 illustrates a time region mapping structure of a synchronization signal and a beam-sweeping operation.

FIG. 14 illustrates the time region mapping structure of a synchronization signal and a beam-sweeping operation according to the disclosure. The following elements are defined for description.

Primary synchronization signal (PSS): indicates a signal which is the reference of DL time or frequency synchronization.

Secondary synchronization signal (SSS): indicates signals which is the reference of DL time or frequency synchronization and provides cell ID information. In addition, the SSS serves as a reference signal for demodulation of a PBCH.

Physical broadcast channel (PBCH): provides necessary system information required for transmission/reception of a data channel and a control channel by the UE. The necessary system information may include search space-related control information indicating radio resource mapping information of a control channel and scheduling control information of a separate data channel for transmitting system information.

Synchronization signal block (SS block): consists of N OFDM symbols and includes a set of a PSS, an SSS, and a PBCH. In the case of a system to which the beam-sweeping technology is applied, the SS block is the minimum unit to which beam sweeping is applied.

Synchronization signal (SS) burst: an SS burst consists of one or more SS blocks. In the example of FIG. 14, each SS burst consists of four SS blocks.

Synchronization signal (SS) burst set: consists of one or more SS bursts and includes a total of L SS blocks.

In the example of FIG. 14, the SS burst set consists of a total of 12 SS blocks. The SS burst set periodically repeats in units of a predetermined period P. The period P is defined as a fixed value according to a frequency band or is provided to the UE through signaling by the BS. If there is no separate signaling for the period P, the UE applies a pre-appointed default value.

FIG. 14 illustrates the application of beam sweeping in units of SS blocks according to the passage of time.

In the example of FIG. 14, UE #1 1405 receives an SS block through a beam radiated in direction #d0 1403 by beamforming applied to SS block #0 at a time point t1 1401. UE #2 1406 receives an SS block through a beam radiated in direction #d4 1404 by beamforming applied to SS block #4 at a time point t2 1402. The UE may obtain, from the BS, an optimal synchronization signal through a beam radiated in the direction in which the UE is located. For example, UE #1 1405 has difficulty in acquiring time frequency synchronization and necessary system information from the SS block through the beam radiated in direction #d4, far away from the location of UE #1.

Figure 15:
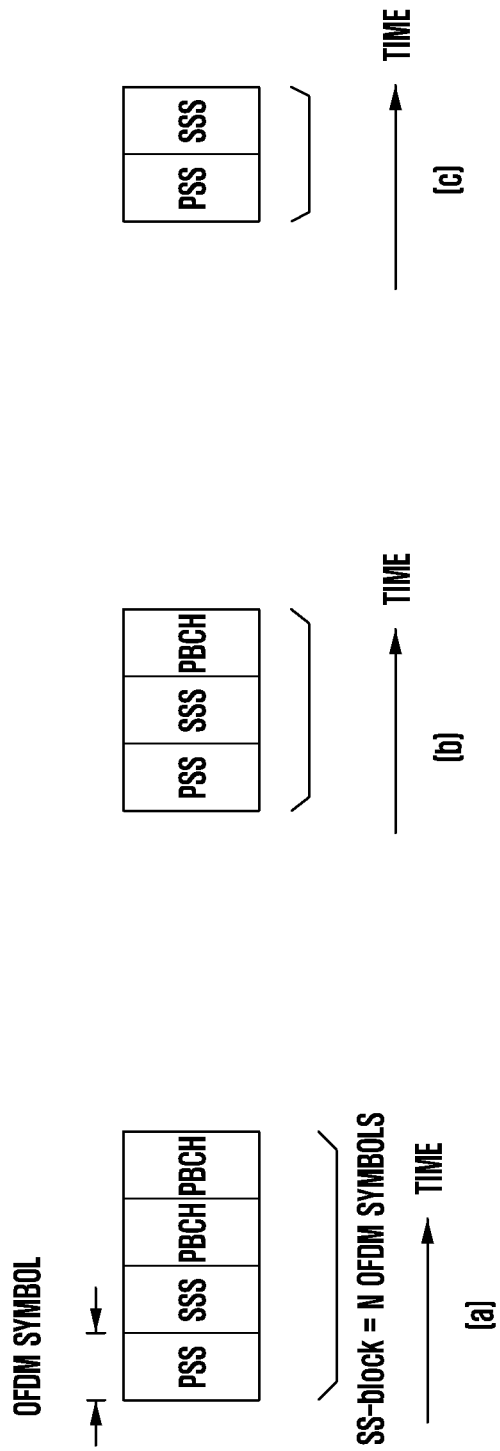
FIGS. 15 A, 15B, and 15C illustrate the configuration of SS blocks.

FIGS. 15A, 15B, and 15C illustrate examples of the configuration of the SS block. The SS block consists of N OFDM symbols. FIG. 15A illustrates an example in which the SS block consists of four OFDM symbols, FIG. 15B illustrates an example in which the SS block consists of three OFDM symbols, and FIG. 15C illustrates an example in which the SS block consists of two OFDM symbols.

Referring to FIG. 15A, in the SS block consisting of four OFDM symbols, each of a PSS and an SSS is mapped to one OFDM symbol and PBCHs are mapped to two OFDM symbols in the time region through a time-division multiplexing scheme. In a modified example, each of the PSS, the SSS, and the PBCH may be mapped to one OFDM symbol, and a tertiary synchronization signal (TSS) indicating a time index of the SS block may be additionally mapped to one OFDM symbol.

Referring to FIG. 15B, in the SS block consisting of three OFDM symbols, each of the PSS, the SSS, and the PBCH is mapped to one OFDM symbol through a TDM scheme. In a modified example, each of the PSS and the SSS may be mapped to one OFDM symbol, and the TSS may be mapped to the OFDM symbol, to which the PBCH is mapped, such that the TSS is multiplexed with the PBCH in the frequency region through a frequency-division multiplexing (FDM) scheme.

Referring to FIG. 15C, in the SS block consisting of two OFDM symbols, each of the PSS and the SSS is mapped to one OFDM symbol through a TDM scheme. In the case of FIG. 15C, in a scheme that can be applied to a non-standalone cell operating in a dependent mode in which a combination with a primary cell (Peen or anchor cell) is performed, the UE may obtain necessary system information required by a non-standalone cell through signaling of the primary cell (Pcell or anchor cell). Signaling of the primary cell may include control information indicating the type of the SS block of the non-standalone cell, for example, whether the PBCH is included.

Further, the mapping location of the PSS, the SSS, and the PBCH within the SS block illustrated in FIGS. 15A, 15B, and 15C can be variously modified.

As the method of achieving the ultra-low-latency service in the 5G system, not only a method of introducing and operating the expanded frame structure but also a "self-contained" transmission scheme for performing transmission of downlink data and HARQ-ACK/NACK feedback of the downlink data within the slot, which is the basic unit for performing scheduling, have been researched. From the viewpoint of transmission of uplink data, "self-contained" transmission means a scheme in which transmission of scheduling information of the BS for scheduling uplink data of the UE and transmission of uplink data of the UE corresponding thereto are performed in the same slot.

Figure 16:
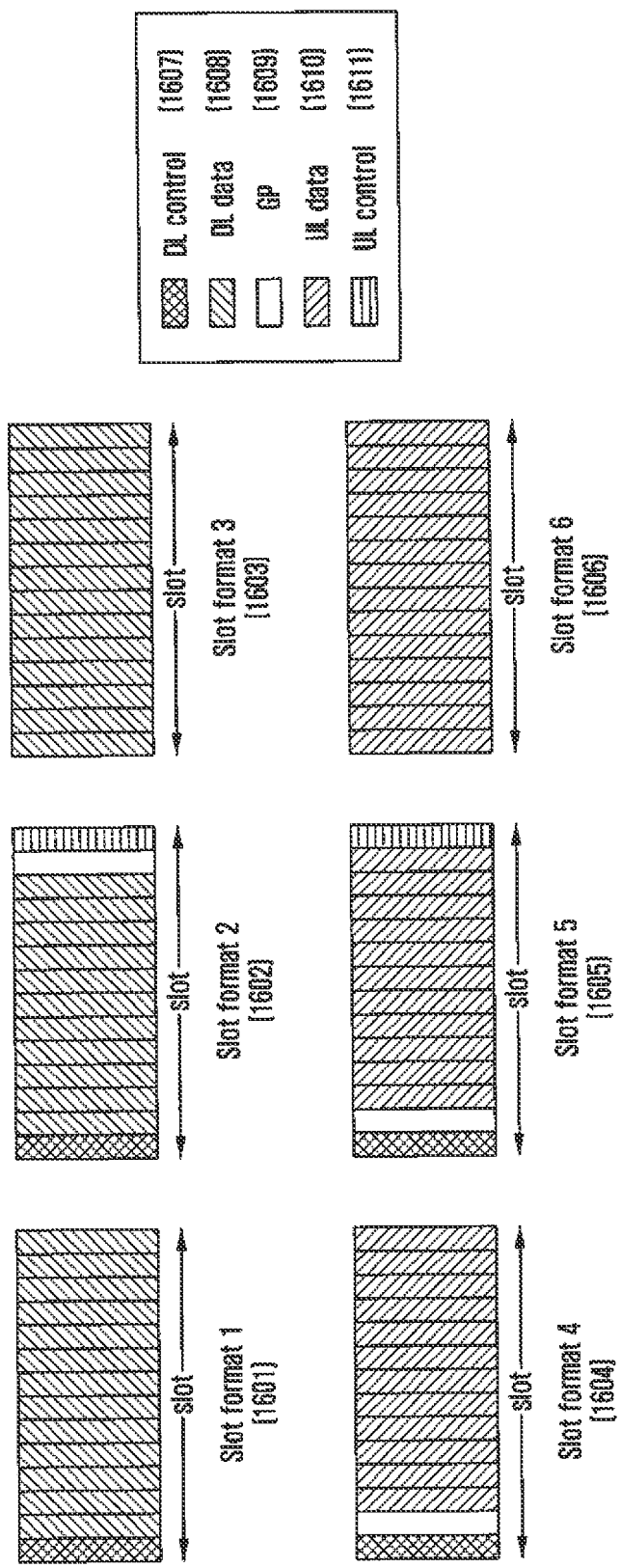
FIG. 16 illustrates various slot formats.

Hereinafter, at least six slot formats (slot format 1 to slot format 6) required to support the "self-contained" transmission will be described with reference to FIG. 16. In the example of FIG. 16, each slot consists of a total of 14 symbols. Each slot format may be defined by a combination of a symbol 1607 for transmission of downlink control information, a symbol 1608 for transmission of downlink data, a symbol 1609 for a guard period (GP) for downlink-uplink switching, a symbol 1610 for transmission of uplink data, and a symbol 1611 for transmission of uplink control information. The symbols constituting each slot format may be configured in various combinations according to an amount of control information to be transmitted, an amount of data to be transmitted, or a time required when the UE switches an RF module from downlink to uplink. The BS may inform the UE of control information indicating which format is applied among the slot formats through signaling.

Slot format #1 1601, slot format #2 1602, and slot format #3 1603 are slot formats for transmission of downlink data.

Slot format #1 1601 corresponds to a slot including symbols for transmission of one or more pieces of downlink control information and symbols for transmission of one or more pieces of downlink data, and all symbols are used for downlink transmission.

Slot format #2 1602 corresponds to a slot including symbols for transmission of one or more pieces of downlink control information, symbols for transmission of one or more pieces of downlink data, symbols of one or more GPs, and symbols for transmission of one or more pieces of uplink control information, and has a characteristic in which symbols for downlink transmission and symbols for uplink transmission coexist in one slot. Accordingly, through slot format #2, the downlink "self-contained" transmission scheme may be supported.

In slot format #3 1603, all symbols are symbols for transmission of downlink data. Accordingly, slot format 3 may minimize overhead for transmission of control information and thus maximize the efficiency of transmission of downlink data.

Slot format #4 1604, slot format #5 1605, and slot format #6 1606 are slot formats for transmission of downlink data.

Slot format #4 1604 corresponds to a slot including symbols for transmission of one or more pieces of downlink control information, symbols for one or more GPs, and symbols for transmission of one or more pieces of uplink data. That is, since symbols for downlink transmission and symbols for uplink transmission coexist in one slot, the uplink "self-contained" transmission scheme may be supported through slot format #4.

Slot format #5 1605 corresponds to a slot including symbols for transmission of one or more pieces of downlink control information, symbols for one or more GPs, symbols for transmission of one or more pieces of uplink data, and symbols for transmission of one or more pieces of uplink control information. That is, since symbols for downlink transmission and symbols for uplink transmission coexist in one slot, the uplink "self-contained" transmission scheme may be supported through slot format #5.

In slot format #6 1606, all symbols are symbols for the transmission of uplink data. Accordingly, slot format #6 may minimize the overhead for transmission of control information and thus maximize the efficiency of transmission of uplink data.

SS-block mapping in the time region is influenced by the expanded frame structure, whether beam sweeping is applied, and the "self-contained" transmission scheme.

Figure 17:
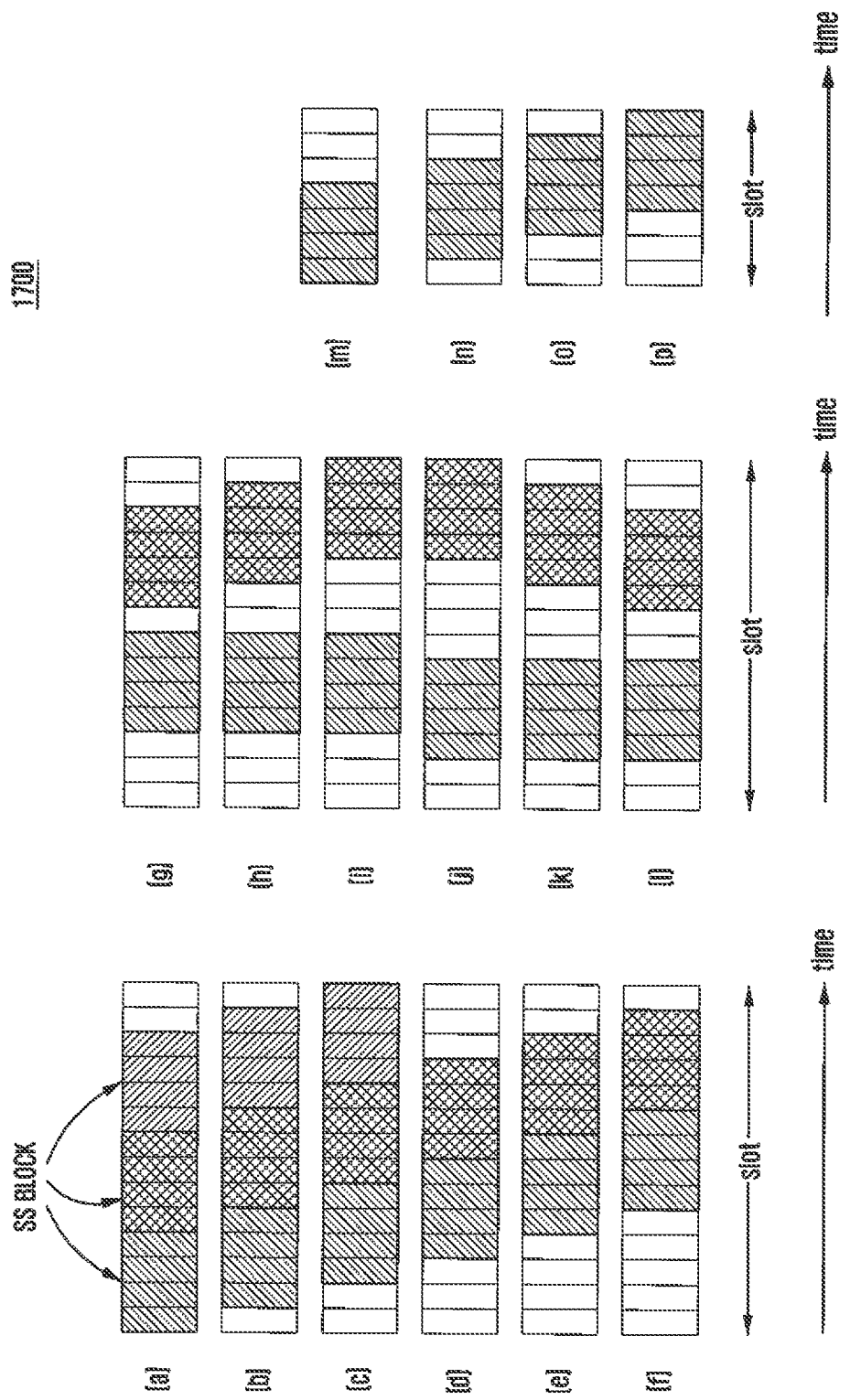
FIGS. 17A, 17B, 17C, 17D, 17E, 17F, 17G, 17H, 17I, 17J, 17K, 17L, 17M, 17N, 17O, and 17P illustrate a method of mapping SS blocks.

FIG. 17 illustrates various methods of mapping SS blocks in one slot.

Referring to reference numeral 1700 in FIGS. 17A to 17P, FIGS. 17A, 17B, and 17C illustrate a method of mapping three SS blocks in units of four symbols in a slot consisting of 14 symbols.

FIGS. 17D, 17E, 17F, 17G, 17U, 17I, 17J, 17K, and 17I, illustrate a method of mapping two SS blocks in units of four symbols in a slot consisting of 14 symbols.

FIGS. 17M, 17N, 17O, and 17P illustrate a method of mapping one SS block in units of four symbols in a slot consisting of seven symbols.

Downlink control information, downlink data, uplink control information, uplink data, and the GP may be mapped to symbols to which the SS blocks are not mapped in one slot.

Figure 18:
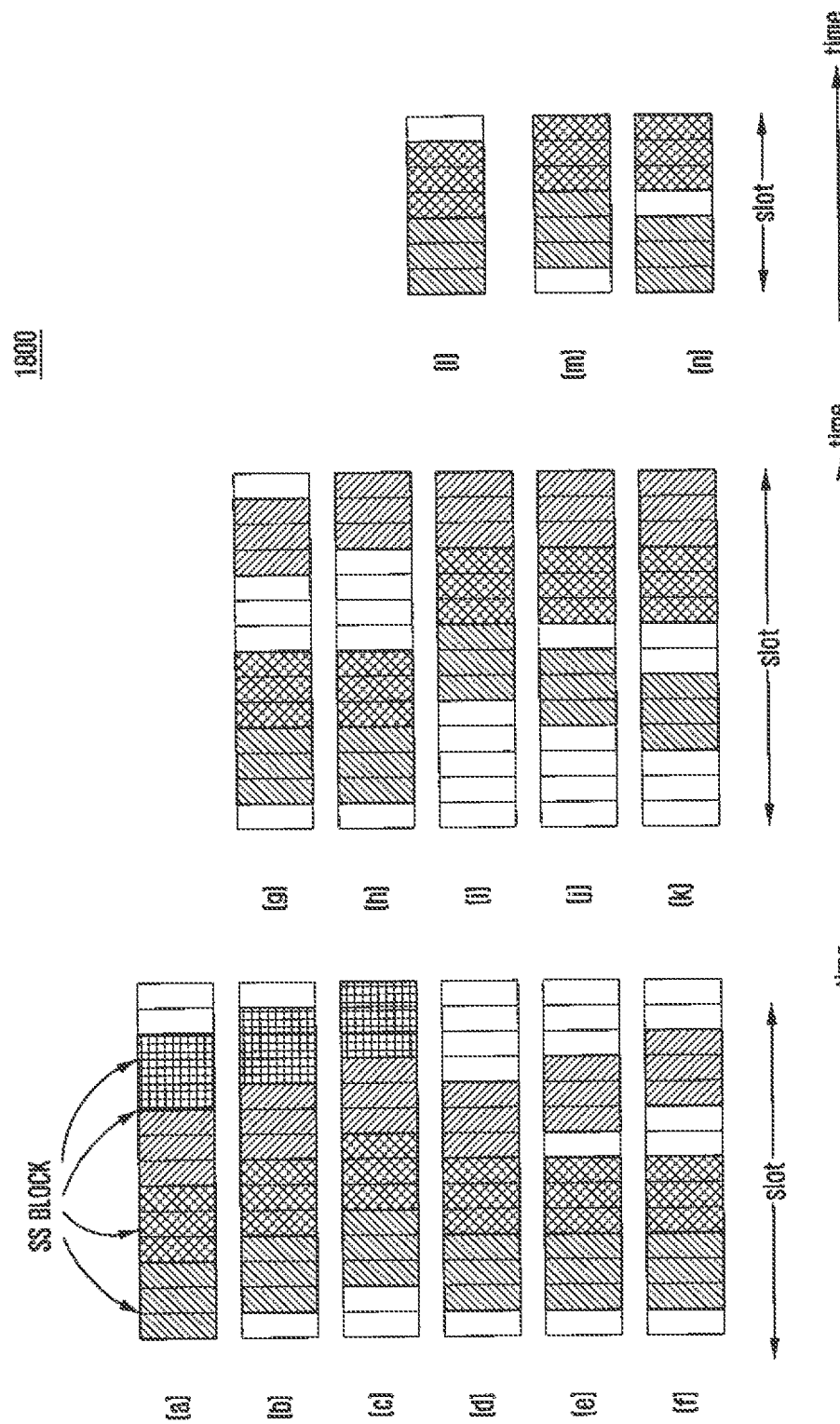
FIGS. 18A 18B, 18C, 18D, 18E, 18F, 18G, 18H, 18I, 18J, 18K, 18L, 18M, and 18N illustrate another method of mapping SS blocks.

FIG. 18 illustrates another method of mapping SS blocks in one slot.

Referring to reference numeral 1800 in FIGS. 18A to 18N, FIGS. 18A, 18B, and 18C illustrate a method of mapping four SS blocks in units of three symbols in a slot consisting of 14 symbols.

FIGS. 18D, 18E, 18F, 18G, 18H, 18I, 18J, and 18K illustrate a method of mapping three SS blocks in units of three symbols in a slot consisting of 14 symbols.

FIGS. 18L, 18M, and 18N illustrate a method of mapping two SS blocks in units of three symbols in a slot consisting of seven symbols.

Similar to FIG. 17, downlink control information, downlink data, uplink control information, uplink data, and the GP may be mapped to symbols to which the SS blocks are not mapped in one slot.

FIGS. 17A to 17P and FIGS. 18A to 18N illustrate various methods of mapping SS blocks in one slot, but there is a need to define one fixed mapping pattern appointed between the UE and the BS in order to reduce the complexity of detection of SS blocks by the UE.

As illustrated in [Table 2] above, the subcarrier spacing applied to the synchronization signal for each frequency band may be defined as a single value, and the subcarrier spacing applied to the data channel or the control channel may be defined as a plurality of values.

Figure 19:
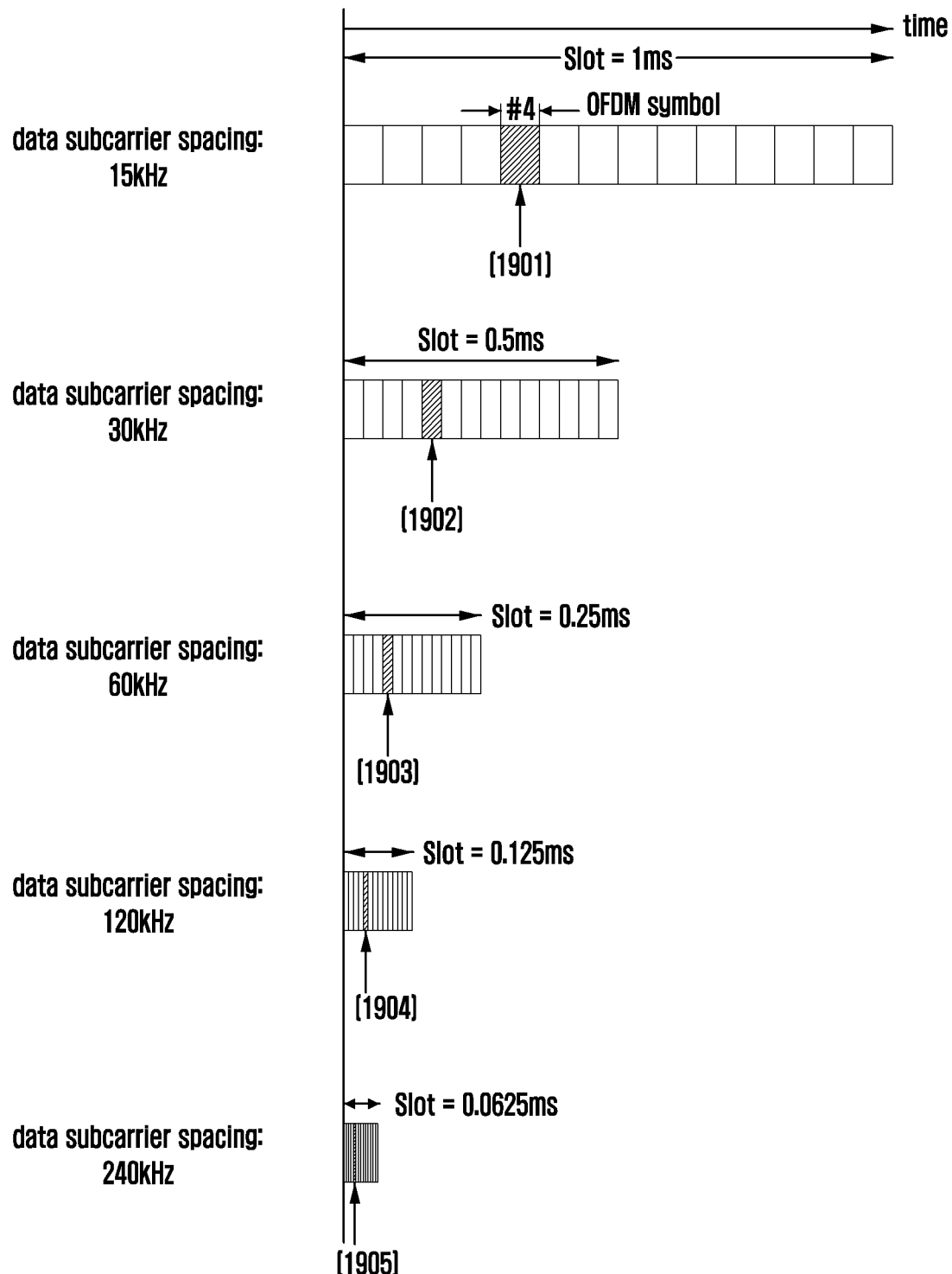
FIG. 19 illustrates an example of SS-block mapping varying depending on subcarrier spacing of a data channel.

In the initial access step in which the UE performs a cell search through SS block detection, as a step in which the UE transmits and receives data in earnest, when a plurality of subcarrier spacings are applied to the data channel or the control channel as described above, the UE is not able to accurately know which subcarrier spacing is actually applied to the data channel or the control channel. Accordingly, if mapping of the SS blocks in the time region is defined on the basis of the subcarrier spacing of the data channel or the control channel, the UE assumes all subcarrier spacings and has complexity to perform the SS block detection operation. FIG. 19 illustrates slot structures in the cases in which the subcarrier spacings applied to the data channel or the control channel are 15 kHz, 30 kHz, 60 kHz, 120 kHz, and 240 kHz. If mapping of the SS block in the time region is defined from OFDM symbol #4 in the slot, if the subcarrier spacing applied to the data channel or the control channel is 15 kHz, the SS block is mapped from the location 1901, if the subcarrier spacing applied to the data channel or the control channel is 30 kHz, the SS block is mapped from the location 1902, if the subcarrier spacing applied to the data channel or the control channel is 60 kHz, the SS block is mapped from the location 1903, if the subcarrier spacing applied to the data channel or the control channel is 120 kHz, the SS block is mapped from the location 1904, if the subcarrier spacing applied to the data channel or the control channel is 240 kHz, the SS block is mapped from the location 1905.

That is, a problem of an increase in complexity may occur in that the UE should find the mapping location of the SS block in consideration of all subcarrier spacings applied to the data channel or the control channel supported in the frequency band in which the cell search is attempted.

In order to solve the problem of the increase in complexity of the UE, "the frame structure of the data channel or the control channel" and "the synchronization signal frame structure" are separated and the SS block is mapped to a fixed location according to "the synchronization signal frame structure" regardless of "the frame structure of the data channel or the control channel". Hereinafter, the main subject of the disclosure will be described with reference to FIGS. 20, 21, 22, and 23.

FIGS. 20A, 20B, and 20C illustrate the cases in which the subcarrier spacing applied to the synchronization signal is 15 kHz and the subcarrier spacings applied to the data channel or the control channel are 15 kHz (FIG. 20A), 30 kHz (FIG. 20B), and 60 kHz (FIG. 20C).

If the UE performs the cell search in frequency band A according to the example of [Table 2], the UE recognizes that the subcarrier spacing applied to the synchronization signal is fixed to 15 kHz regardless of the subcarrier spacings 15, 30, and 60 kHz that can be applied to the data channel or the control channel. Further, mapping of the SS block in the time region is applied on the basis of the "synchronization signal frame structure". The length of symbols constituting the "synchronization signal frame structure" is determined by the subcarrier spacing 15 kHz applied to the synchronization signal. The biggest value among slot lengths supported by "the frame structure of the data channel or the control channel" in frequency band A is applied to the length of the SS slot, which is the slot of the "synchronization signal frame structure". Accordingly, the length of the SS slot of the "synchronization signal frame structure" includes all slot lengths of "the frame structure of the data channel or the control channel", and common SS-block mapping can be performed regardless of "the frame structure of the data channel or the control channel". That is expressed as <Equation 1> below.

Length of SS slot of "synchronization signal frame structure"=max{slot length of "frame structure of data channel or control channel"}  <Equation 1>

For example, if the length of one slot corresponds to 14 symbols in "the frame structure of the data channel or the control channel", the slot length of "the frame structure of the data channel or the control channel" is described below.

"the frame structure of the data channel or the control channel" in which the subcarrier spacing is 15 kHz→slot length 1 ms "the frame structure of the data channel or the control channel" in which the subcarrier spacing is 30 kHz→slot length 0.5 ms "the frame structure of the data channel or the control channel" in which the subcarrier spacing is 60 kHz→slot length 0.25 ms Accordingly, the length of the SS slot of the "synchronization signal frame structure" is determined as a maximum slot length of 1 ms of "the frame structure of the data channel or the control channel". The SS slot of 1 ms consists of 14 symbols according to "the synchronization signal frame structure".

Based on the assumption of SS blocks, each of which consists of four symbols, SS blocks #0, 41, and 02 are sequentially mapped in the order of reference numerals 2001, 2002, and 2003 (or reference numerals 2004, 2005, and 2006 or reference numerals 2007, 2008, and 2009), said blocks corresponding to common locations regardless of the frame structure of the data channel/control channel. For example, the location to which SS block #0 is mapped is determined as the fixed location, such as reference numeral 2001 of FIG. 20A, reference numeral 2004 of FIG. 20B, or reference numeral 2007 of FIG. 2kC based on a predetermined reference time point 2014 regardless of "the frame structure of the data channel/control channel".

If the BS transmits a downlink control channel or data channel to the UE or desires to receive an uplink control channel or data channel from the UE during the time interval to which the mapping structure of the SS block is applied, an SS block transmission collision may be avoided through the following methods.

Method 1: the BS or the UE transmits and receives a data channel or a control channel in a frequency region that does not overlap the bandwidth 2011 occupied by the SS block. Accordingly, the BS differently configures and operates a search space for determining mapping of radio resources of the downlink control channel depending on whether a time interval is the time interval in which the SS block is transmitted. That is, in the time interval in which the SS block is transmitted, the search space is mapped to a frequency region that does not overlap the bandwidth occupied by the SS block. Accordingly, in the time interval in which the SS block is transmitted, the UE detects a downlink control channel in the frequency region that does not overlap the bandwidth occupied by the SS block. Information on the search space is provided to the UE by the BS using a pre-appointed configuration therebetween or through signaling.

Method 2: the BS or the UE gives a high priority to SS block transmission and performs no transmission/reception of a data channel or a control channel in the interval which overlaps the transmission time of the SS block.

Method 3: in order to reduce limitation on scheduling of the BS within the SS slot in which the SS block is transmitted, a minimum of the downlink signal transmission interval and the uplink signal transmission interval are defined, and the SS block that does not overlap the corresponding time interval is transmitted. For example, priority is provided to a potential symbol location 2012 at which a downlink control channel can be transmitted and a potential symbol location of the GP or a potential symbol location 2013 at which an uplink control channel can be transmitted, and the SS block which overlaps the corresponding location is defined as an invalid SS block. The BS does not transmit the invalid SS block but transmits a valid SS block to the UE. Further, transmission of a downlink signal or an uplink signal which overlaps the transmission time point of the invalid SS block is allowed.

FIGS. 20A, 20B, and 20C illustrate examples in which the potential symbol location 2012 at which the downlink control channel can be transmitted is limited to two symbols and the potential symbol location of the GP or the potential symbol location 2013 at which the uplink control channel can be transmitted is limited to two symbols within the slot according to "the frame structure of the data channel or the control channel".

In this case, SS block #0 corresponds to the invalid SS block in the example of FIG. 20A, SS block #0 and SS block #1 correspond to invalid blocks in the example of FIG. 20B, and SS block #0, SS block #1, and SS block #2 correspond to invalid blocks in the example of FIG. 20C. In the case of FIG. 20C, since there is no invalid SS block in the SS slot, it is necessary to allow transmission of at least one SS block in spite of the limit on transmission/reception of the downlink control channel or the uplink control channel.

FIGS. 21A, 21B, and 21C illustrate the cases in which the subcarrier spacing applied to the synchronization signal is 30 kHz and the subcarrier spacings applied to the data channel or the control channel are 15 kHz (FIG. 21A), 30 kHz (FIG. 21B), and 60 kHz (FIG. 21C).

If the UE performs the cell search in frequency band B according to the example of [Table 2], the UE recognizes that the subcarrier spacing applied to the synchronization signal is fixed to 15 kHz regardless of the subcarrier spacings 15, 30, and 60 kHz that can be applied to the data channel or the control channel. Further, mapping of the SS block in the time region is applied on the basis of the "synchronization signal frame structure". The length of symbols constituting the "synchronization signal frame structure" is determined by the subcarrier spacing 30 kHz applied to the synchronization signal. The biggest value among slot lengths supported by "the frame structure of the data channel or the control channel" in frequency band B is applied to the length of the SS slot that is the slot of the "synchronization signal frame structure". In the cases of FIGS. 21A to 21C, the length of the SS slot of "the synchronization signal frame structure" is defined as a maximum slot length of 1 ms of "the frame structure of the data channel or the control channel". Accordingly, the SS slot of 1 ms consists of 28 symbols according to "the synchronization signal frame structure".

Based on the assumption of SS blocks, each of which consists of four symbols, SS blocks #0, #1, #2, #3, #4, #5, and #6 may be mapped during the SS slot length of 1 ms, said blocks corresponding to common locations regardless of "the frame structure of the data channel or the control channel".

For example, the location to which SS block #0 is mapped is determined as a fixed location, such as reference numeral 2102 of FIG. 21A, reference numeral 2103 of FIG. 21B, or reference numeral 2104 of FIG. 21C, based on a predetermined reference time point 2105 regardless of "the frame structure of the data channel/control channel".

Figure 20:
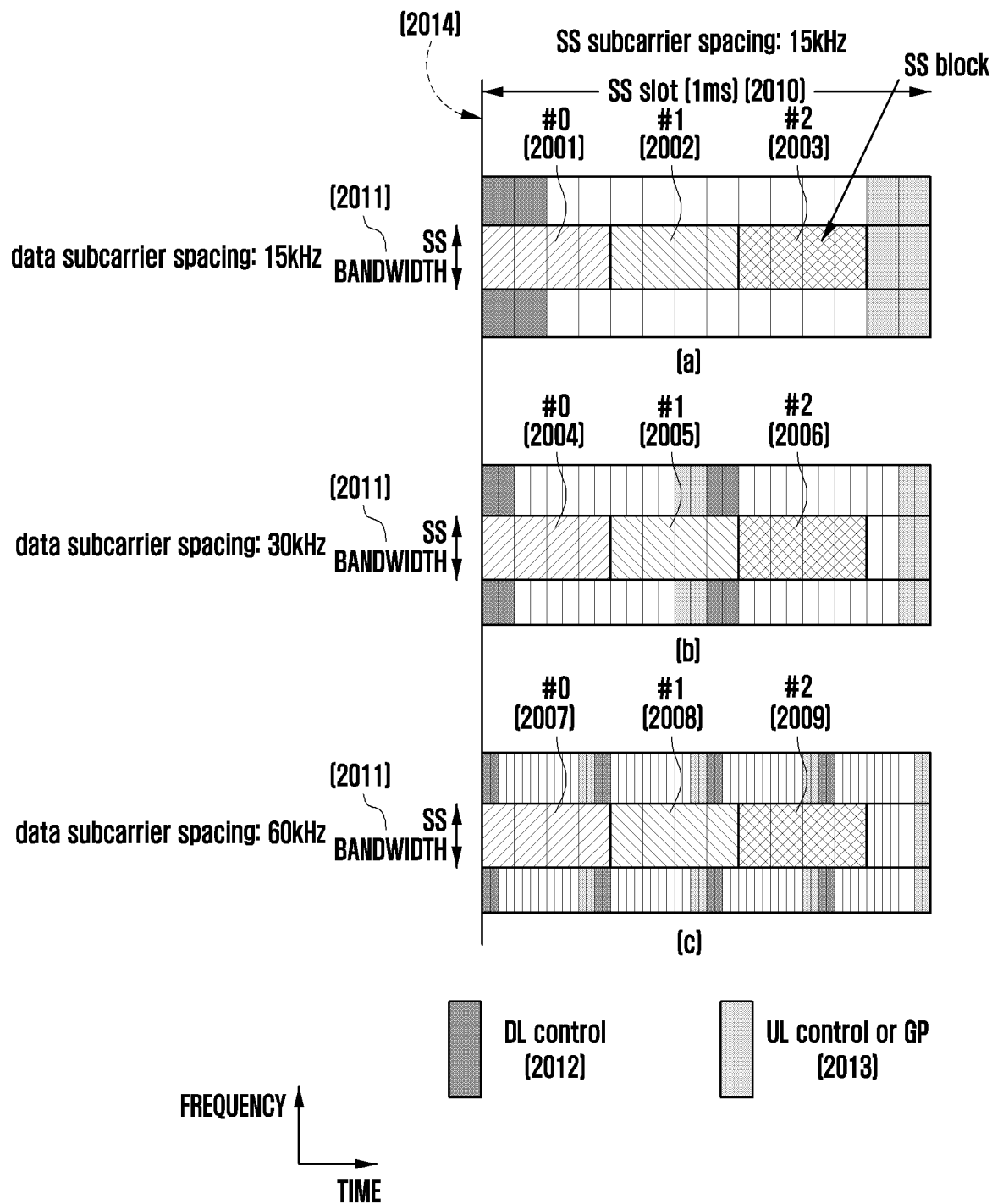
FIG. 20 illustrates an example of fixed SS-block mapping regardless of subcarrier spacing of a data channel.
Figure 21:
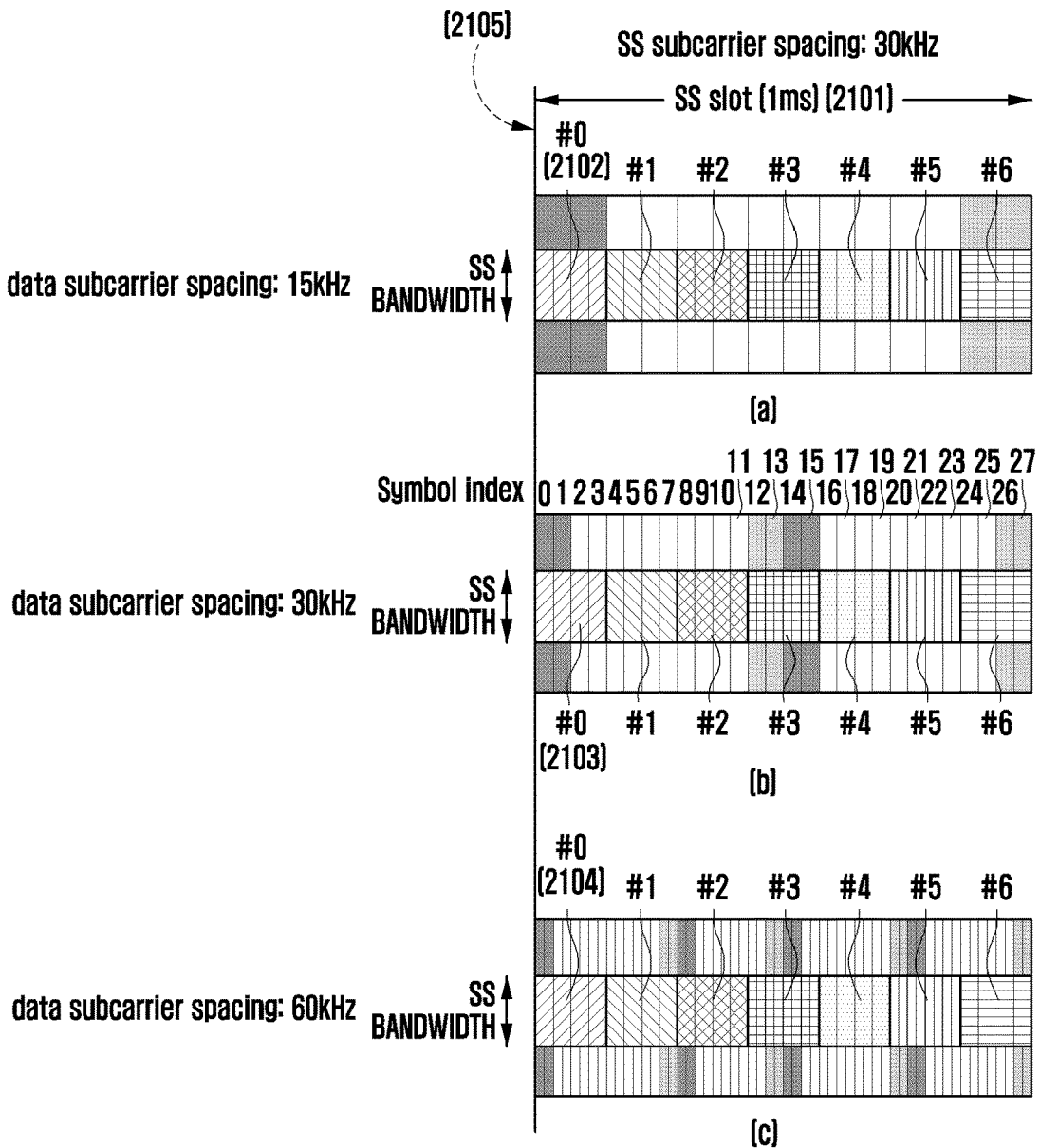
FIG. 21 illustrates another example of fixed SS-block mapping regardless of subcarrier spacing of a data channel.
Figure 21:
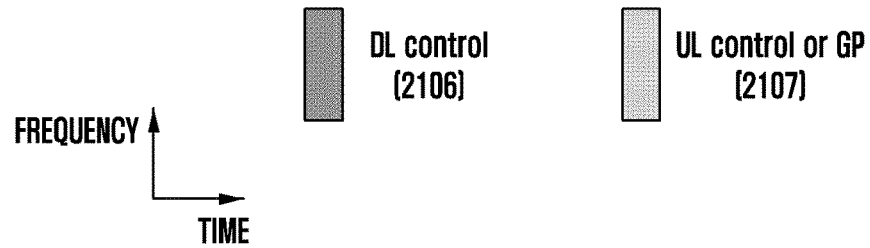
Figure 22:
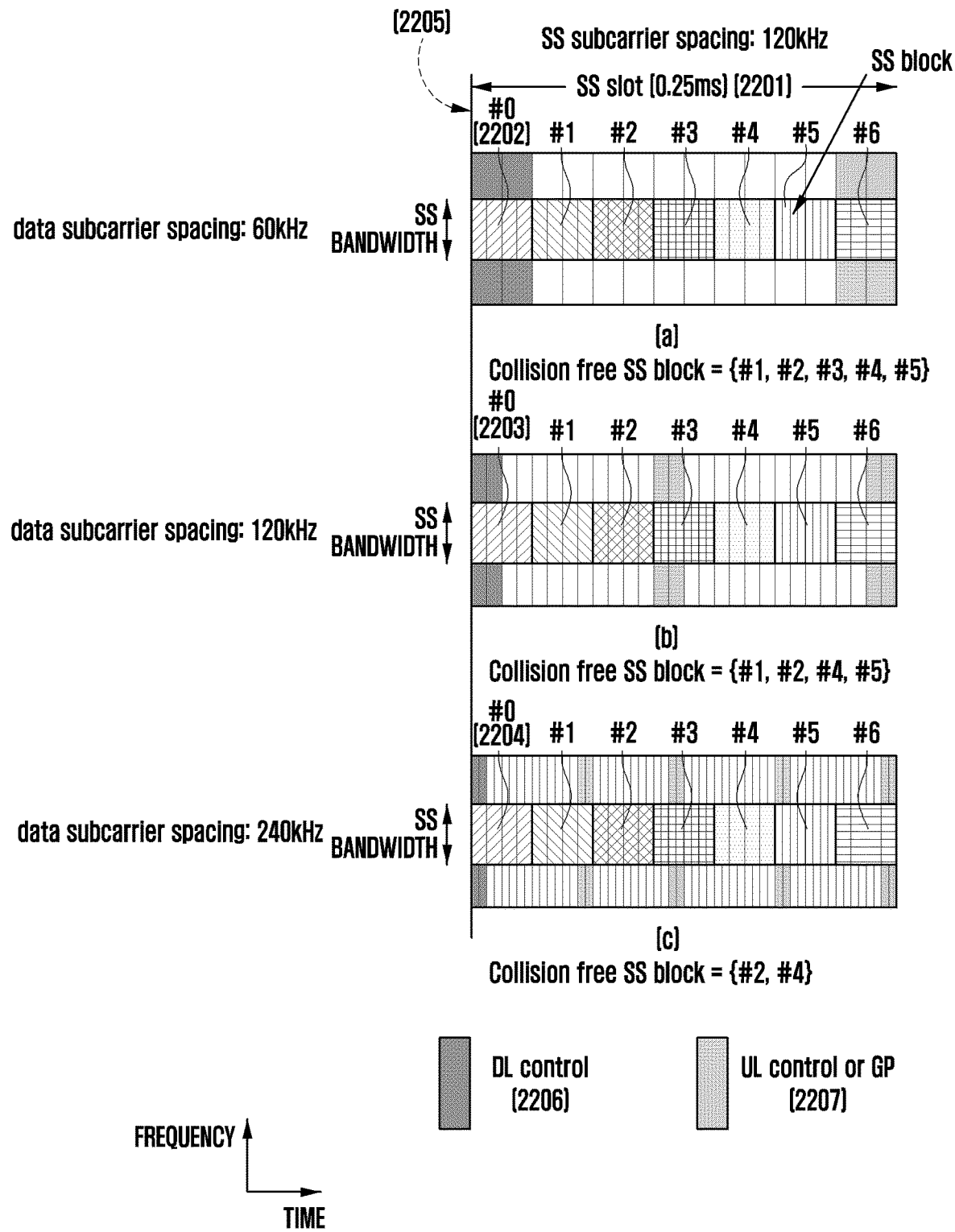
FIG. 22 illustrates another example of fixed SS-block mapping regardless of subcarrier spacing of a data channel.
Figure 23:
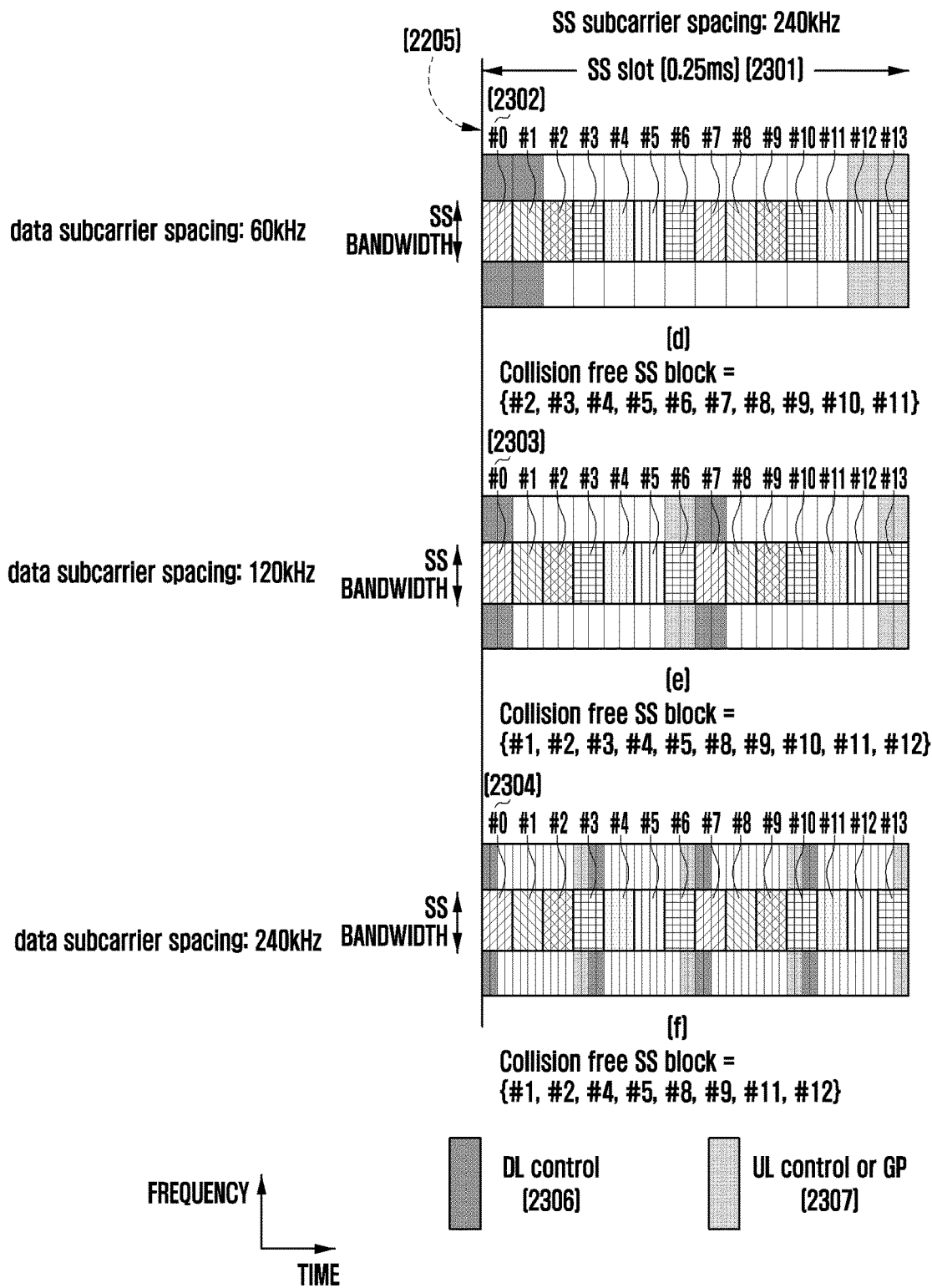
FIG. 23 illustrates another example of fixed SS-block mapping regardless of subcarrier spacing of a data channel.

If the BS transmits a downlink control channel or data channel to the UE or desires to receive an uplink control channel or data channel from the UE during the time interval to which the mapping structure of the SS block is applied, method 1, method 2, and method 3, described in connection with FIG. 20, may be applied.

FIGS. 21A, 21B, and 21C illustrate examples in which a potential symbol location 2106 at which the downlink control channel can be transmitted is limited to two symbols and a potential symbol location of the GP or a potential symbol location 2017 at which the uplink control channel can be transmitted is limited to two symbols within the slot according to "the frame structure of the data channel or the control channel". Accordingly, except for the invalid SS block, SS blocks #1, #2, #3, #4, and #5 correspond to valid blocks in the example of FIG. 21A, SS blocks #1, #2, #4, and #5 correspond to valid blocks in the example of FIG. 21B, and SS blocks #2 and #4 correspond to valid blocks in the example of FIG. 21C.

SS blocks #2 and #4 commonly correspond to valid SS blocks regardless of "the frame structure of the data channel or the control channel". The BS does not transmit an invalid SS block, but transmits a valid SS block to the UE. Further, transmission of a downlink signal or an uplink signal which overlaps the transmission time point of the invalid SS block is allowed.

The invalid SS block may be additionally included in invalid SS blocks in the following cases.

The case in which SS blocks are mapped over a slot boundary according to a "data channel" or a "control channel" is needed for consistent SS-block mapping even though "the frame structure of the data channel or the control channel" is changed. This corresponds to SS block #3 in the example of FIG. 21B and SS blocks #1, 43, and #5 in the example of FIG. 21C.

In the case in which first symbols located every 0.5 ms according to "the frame structure of the data channel or the control channel" overlap the SS block transmission interval, the symbol length of the first symbols located every 0.5 ms for each "frame structure of the data channel or the control channel" is defined to be different from the remaining symbols.

Accordingly, in order to consistently maintain the SS block length, it is required to designate the SS block as an invalid SS block in the above cases. This corresponds to SS blocks #0 and #3 in the examples of FIGS. 21A, 21B, and 21C.

FIGS. 22A, 22B, and 22C illustrate the cases in which the subcarrier spacing applied to the synchronization signal is 120 kHz and the subcarrier spacings applied to the data channel or the control channel are 60 kHz (FIG. 22A), 120 kHz (FIG. 22B), and 240 kHz (FIG. 22C).

If the UE performs the cell search in frequency band C according to the example of [Table 2], the UE recognizes that the subcarrier spacing applied to the synchronization signal is fixed to 120 kHz regardless of the subcarrier spacings 60, 120, and 240 kHz that can be applied to the data channel or the control channel. Further, mapping of the SS block in the time region is applied on the basis of the "synchronization signal frame structure". The length of symbols constituting the "synchronization signal frame structure" is determined by the subcarrier spacing of 120 kHz applied to the synchronization signal. The biggest value among slot lengths supported by "the frame structure of the data channel or the control channel" in frequency band C is applied to the length of the SS slot, which is the slot of the "synchronization signal frame structure". In the cases of FIGS. 22A to 22C, the length of the SS slot of "the synchronization signal frame structure" is defined as a maximum slot length of 0.25 ms of "the frame structure of the data channel or the control channel". Accordingly, the SS slot of 0.25 ms consists of 28 symbols according to "the synchronization signal frame structure".

Based on the assumption of SS blocks, each of which consists of four symbols, SS blocks #0, #1, #2, #3, #4, #5, and #6 may be mapped during an SS slot 0.25 ms in length, said blocks corresponding to common locations regardless of "the frame structure of the data channel or the control channel". For example, the location to which SS block #0 is mapped is determined as a fixed location, such as reference numeral 2202 of FIG. 22A, reference numeral 2203 of FIG. 21B, or reference numeral 2204 of FIG. 21C based on a predetermined reference time point 2205 regardless of "the frame structure of the data channel/control channel".

If the BS transmits a downlink control channel or data channel to the UE or desires to receive an uplink control channel or data channel from the UE during a time interval to which the mapping structure of the SS block is applied, method 1, method 2, and method 3, described in connection with FIG. 20, may be applied.

FIGS. 22A, 22B, and 22C illustrate examples in which a potential symbol location 2206 at which the downlink control channel can be transmitted is limited to two symbols and a potential symbol location of the GP or a potential symbol location 2207 at which the uplink control channel can be transmitted is limited to two symbols within the slot according to "the frame structure of the data channel or the control channel".

Accordingly, SS blocks #1, #2, #3, #4, and #5 correspond to valid SS blocks in the example of FIG. 22A, SS blocks #1, #2, #4, and #5 correspond to valid SS blocks in the example of FIG. 22B, and SS blocks #2 and #4 correspond to valid SS blocks in the example of FIG. 22C. SS blocks #2 and #4 commonly correspond to valid SS blocks regardless of "the frame structure of the data channel/control channel". The BS does not transmit the invalid SS block but transmits the valid SS block to the UE. Further, transmission of a downlink signal or an uplink signal which overlaps the transmission time point of the invalid SS block is allowed.

FIGS. 23A, 23B, and 23C illustrate the cases in which the subcarrier spacing is 240 kHz and the subcarrier spacings applied to the data channel or the control channel are 60 kHz (FIG. 23A), 120 kHz (FIG. 23B), and 240 kHz (FIG. 23C).

If the UE performs the cell search in frequency band D according to the example of [Table 2], the UE recognizes that the subcarrier spacing applied to the synchronization signal is fixed to 240 kHz regardless of the subcarrier spacings 60, 120, and 240 kHz that can be applied to the data channel or the control channel. Further, mapping of the SS block in the time region is applied on the basis of the "synchronization signal frame structure". The length of symbols constituting the "synchronization signal frame structure" is determined by the subcarrier spacing of 240 kHz applied to the synchronization signal. The biggest value among slot lengths supported by "the frame structure of the data channel or the control channel" in frequency band D is applied to the length of the SS slot which is the slot of the "synchronization signal frame structure". In the cases of FIGS. 23A to 23C, the length of the SS slot of "the synchronization signal frame structure" is defined as a maximum slot length of 0.25 ms of "the frame structure of the data channel or the control channel". Accordingly, the SS slot of 0.25 ms consists of 56 symbols according to "the synchronization signal frame structure".

Based on the assumption of SS blocks each of which consists of four symbols, SS blocks #0, #1, #2, #3, #4, #5, #6, 47, #8, #9, #10, #11, #12, and #13 may be mapped during an SS slot length of 0.25 ms, said blocks corresponding to common locations regardless of "the frame structure of the data channel or the control channel".

For example, the location to which SS block #0 is mapped is determined as a fixed location, such as reference numeral 2302 of FIG. 23A, reference numeral 2303 of FIG. 23B, or reference numeral 2304 of FIG. 23C, based on a predetermined reference time point 2305 regardless of "the frame structure of the data channel/control channel".

If the BS transmits a downlink control channel or data channel to the UE or desires to receive an uplink control channel or data channel from the UE during a time interval to which the mapping structure of the SS block is applied, method 1, method 2, and method 3, described in connection with FIG. 20, may be applied.

FIGS. 23A, 23B, and 23C illustrate examples in which a potential symbol location 2306 at which the downlink control channel can be transmitted is limited to two symbols and a potential symbols location of the GP or a potential symbol location 2307 at which the uplink control channel can be transmitted is limited to two symbols within the slot according to "the frame structure of the data channel or the control channel". SS blocks #2, #3, #4, #5, #6, #7, #8, #9, #10, and #11 correspond to valid SS blocks in the example of FIG. 23A, SS blocks #1, #2, #3, #4, #5, #8, #9, #10, #11, and #12 correspond to valid SS blocks in the example of FIG. 23B, and SS blocks #1, #2, #4, #5, #8, #9, #11, and #12 correspond to valid SS blocks in the example of FIG. 23C. SS blocks #2 #4, #5, #8, #9, #11, and #12 commonly correspond to valid SS blocks regardless of "the frame structure of the data channel or the control channel". The BS does not transmit the invalid SS block, but transmits a valid SS block to the UE. Further, transmission of a downlink signal or an uplink signal which overlaps the transmission time point of the invalid SS block is allowed.

Figure 24A:
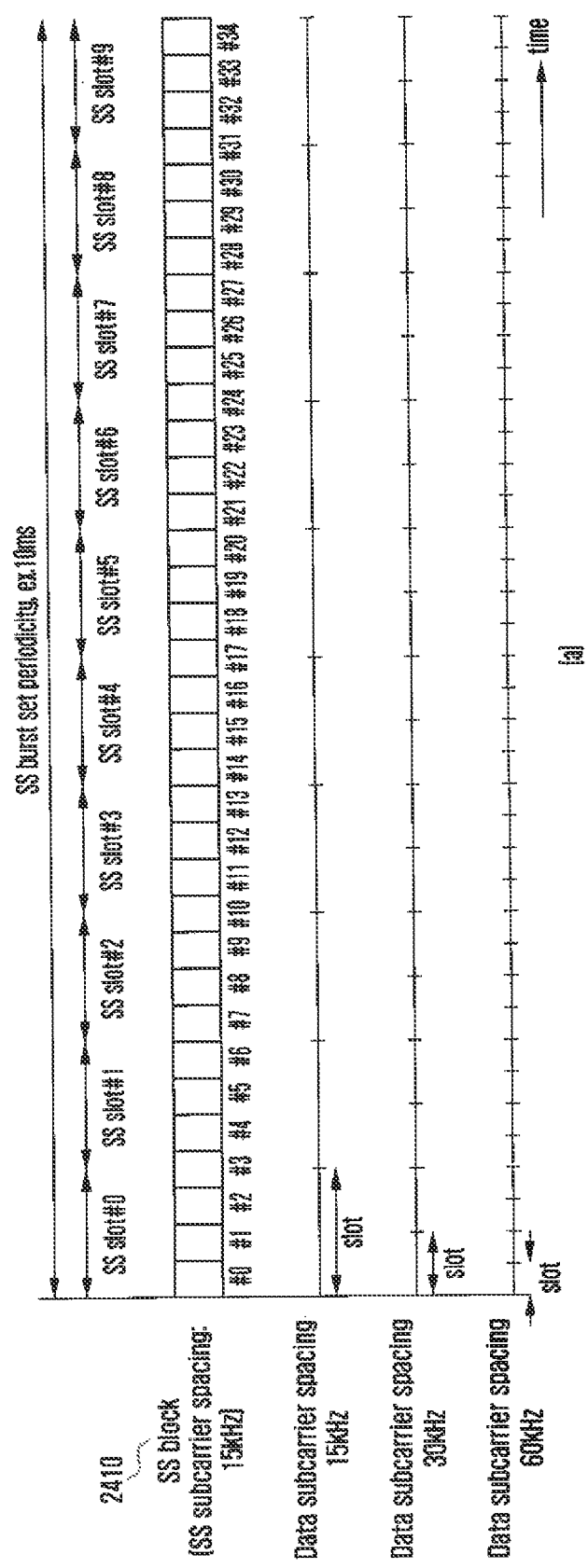
FIGS. 24A and 24B illustrate a method of mapping SS blocks within an SS burst set period.
Figure 24B:
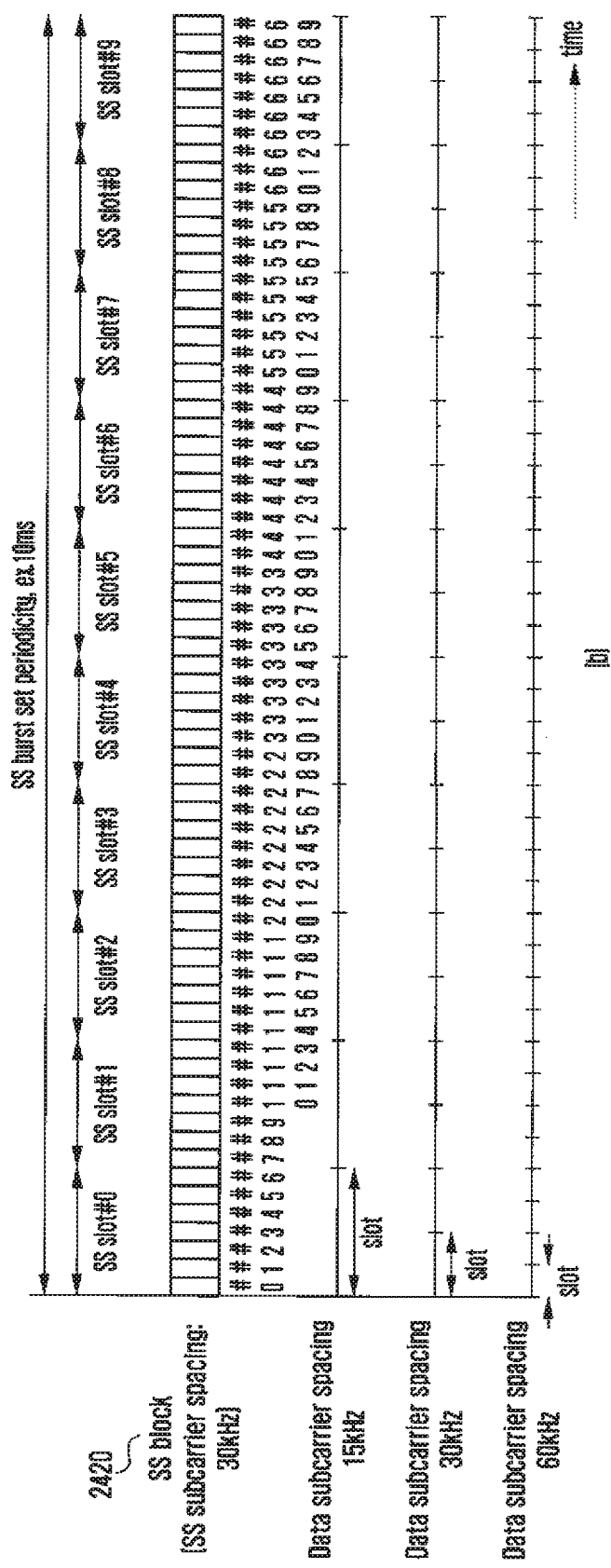

FIGS. 24A and 24B illustrate examples of the mapping location of SS blocks within an SS burst set period.

FIG. 24A illustrates the case in which the subcarrier spacing applied to the synchronization signal is 15 kHz and the subcarrier spacings applied to the data channel or the control channel are 15 kHz, 30 kHz, and 60 kHz. For example, if an SS burst set period is 10 ms and the SS block consists of four symbols, the time interval of 10 ms includes a maximum of 10 SS blocks and a maximum of 35 SS blocks.

In this case, the mapping is sequentially performed in an ascending order from a start point of the SS burst set period, that is, SS block #0, through the following methods.

Method A: indexes a maximum of SS blocks that can be configured within the SS burst set period. In the example of FIG. 24A, SS blocks from SS block #0 to SS block #34 can be indexed.

Method B: indexes valid SS blocks within the SS burst set period. That is, the invalid SS blocks may be excluded from the SS block indexing.

FIG. 248 illustrates the case in which the subcarrier spacing applied to the synchronization signal is 30 kHz, as indicated by reference numeral 2420, and the subcarrier spacings applied to the data channel or the control channel are 15 kHz, 30 kHz, and 60 kHz. For example, if a period of an SS burst set is 10 ms and the SS block consists of four symbols, the time interval of 10 ms includes a maximum of 10 SS blocks and a maximum of 70 SS blocks.

Figure 25A:
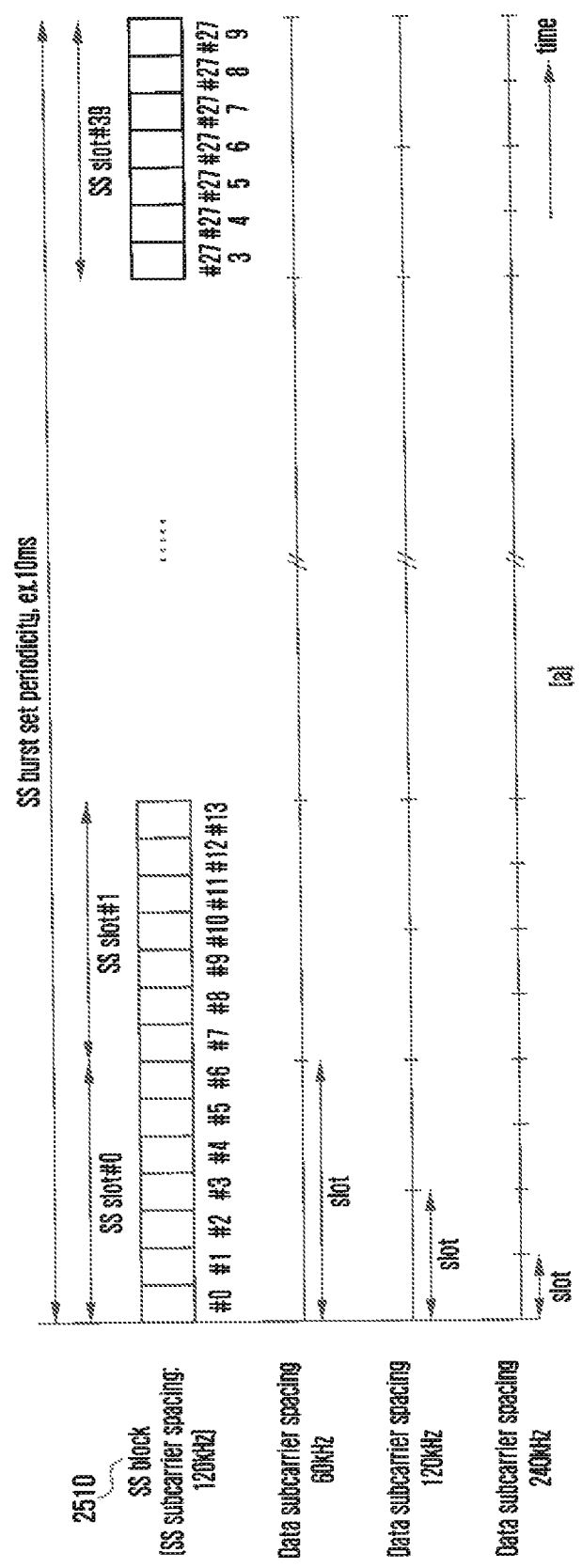
FIGS. 25A and 25B illustrate another method of mapping SS blocks within an SS burst set period.
Figure 25B:
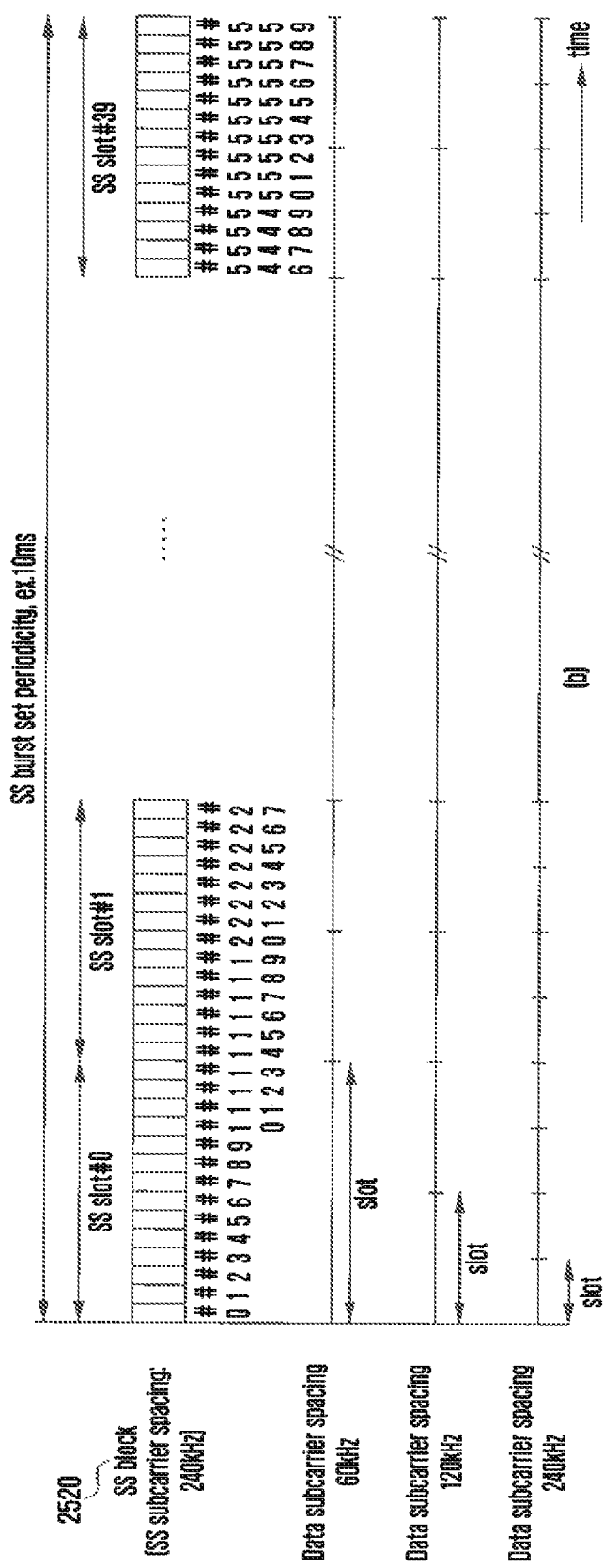

FIGS. 25A and 25B illustrate another method of mapping SS blocks within the SS burst set period.

FIG. 25A illustrates the case in which the subcarrier spacing applied to the synchronization signal is 120 kHz, as indicated by reference numeral 2510, and the subcarrier spacings applied to the data channel or the control channel are 60 kHz, 120 kHz, and 240 kHz. For example, if a period of an SS burst set is 10 ms and the SS block consists of four symbols, the time interval of 10 ms includes a maximum of 40 SS blocks and a maximum of 280 SS blocks.

FIG. 25B illustrates the case in which the subcarrier spacing applied to the synchronization signal is 240 kHz, as indicated by reference numeral 2520, and the subcarrier spacings applied to the data channel or the control channel are 60 kHz, 120 kHz, and 240 kHz. For example, if a period of an SS burst set is 10 ms and the SS block consists of four symbols, the time interval of 10 ms includes a maximum of 40 SS blocks and a maximum of 560 SS blocks.

The detailed mapping location of each signal included in the SS block may be expressed as follows.

For example, if the SS block consists of four symbols and is configured in the order of a PSS, an SSS, a first PBCH symbol, and a second PBCH symbol, each symbol is defined to be mapped to a location within the SS block that meets the following conditions.

PSS symbol mapping location: maps a PSS to a symbol location that meets symbol index % 4=0 according to the "synchronization signal frame structure".

SSS symbol mapping location: maps an SSS to a symbol location that meets symbol index % 4=1 according to the "synchronization signal frame structure".

First PBCH symbol mapping location: maps a first PBCH symbol to a symbol location that meets symbol index % 4=2 according to the "synchronization signal frame structure".

Second PBCH symbol mapping location: maps a second PBCH symbol to a symbol location that meets symbol index % 4=3 according to the "synchronization signal frame structure".

In the above equations, A % B means the remainder after A is divided by B.

Figure 26:
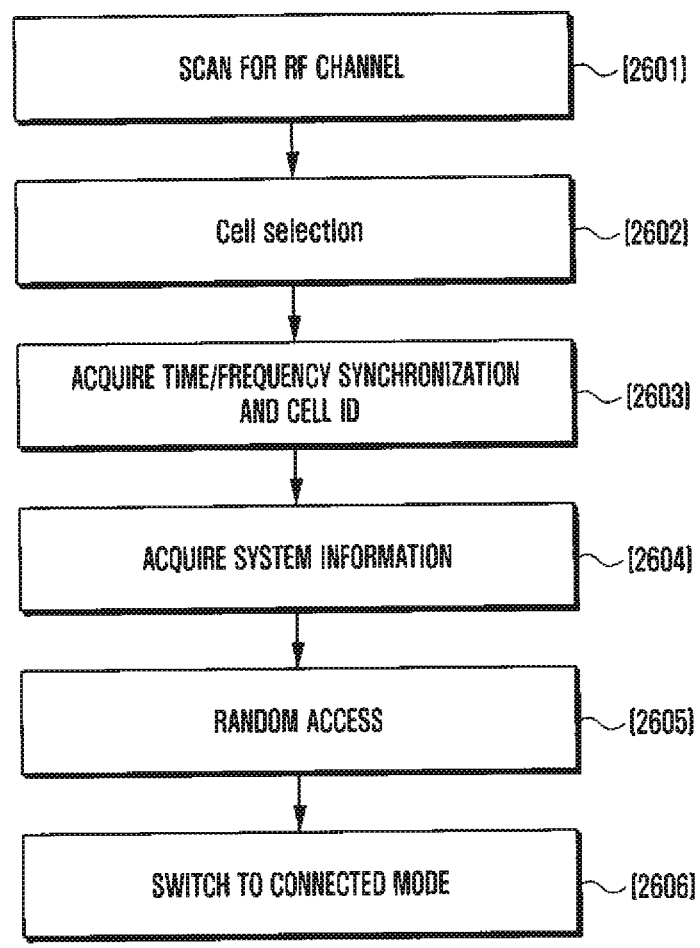
FIG. 26 illustrates an initial access procedure of a UE.

FIG. 26 illustrates a process in which the UE receives SS blocks through an initial access procedure and switches to a connected mode.

In the initial access step in which the UE accesses the system, the UE first scans for an RF channel supported by the UE through a cell search in step 2601. As illustrated in [Table 2] above, according to subcarrier spacing of a synchronization signal defined for each frequency band, the UE detects the corresponding synchronization signal. Further, as described above, the UE attempts to detect a synchronization signal at the location to which the synchronization signal can be mapped.

The cell search procedure may be sequentially performed on RF channels according to implementation of the UE, or may be simultaneously performed on a plurality of RF channels. In step 2602, the UE selects a cell which meets a cell selection criteria on the basis of the search result. The UE selects a cell having a synchronization signal of which the signal intensity exceeds a predetermined threshold value, for example, the highest signal intensity. In step 2603, the UE performs time/frequency synchronization from the synchronization signal for the selected cell and obtains a cell ID. The UE may additionally obtain a beam ID. In step 2604, the UE receives system information and obtains basic information for communication with the BS, Some of the system information is transmitted through a PBCH, and some of the remaining system information is transmitted through a data channel for system information transmission. In step 2605, the UE performs uplink time/frequency synchronization through a random access procedure. If the random access procedure is successfully completed, the UE switches a link to the BS from an idle state to a connected state in step 2606 and completes preparation for data transmission/reception to/from the BS.

As described above, in the initial access step, the UE may not accurately know which subcarrier spacing was applied to the data channel or the control channel. That is, the UE may obtain configuration information of "the frame structure of the data channel or the control channel" after successfully completing the random access and entering the connected state. Accordingly, the UE may perform the procedure for detecting the valid SS block differently depending on the UE state.

Figure 27:
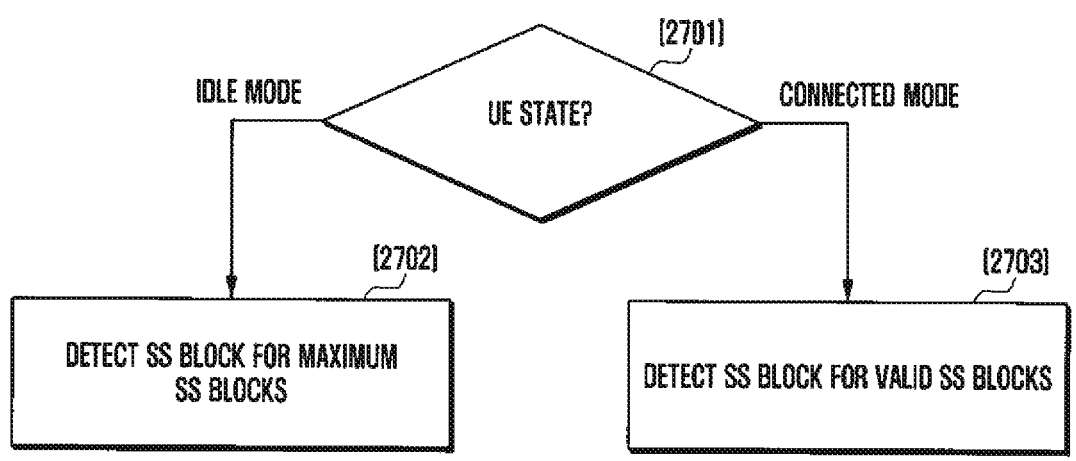
FIG. 27 illustrates a procedure of detecting an SS block according to a connection state of the UE.

FIG. 27 illustrates a procedure of detecting an SS block according to an access state of the UE.

That is, if an access state 2701 of the UE is an idle state, the UE attempts to detect an SS block on the basis of assumption of a maximum of SS blocks in step 2702.

If the access state of the UE is a connected state and the UE obtains configuration information of "the frame structure of the data channel or the control channel", the UE attempts to detect the SS block in valid SS blocks in consideration of the obtained configuration information of "the frame structure of the data channel or the control channel" in step 2703. Accordingly, in the case in which the UE is in a connected state, it is possible to obtain an effect of reducing UE power consumption by minimizing unnecessary SS block detection operation.

Figure 28:
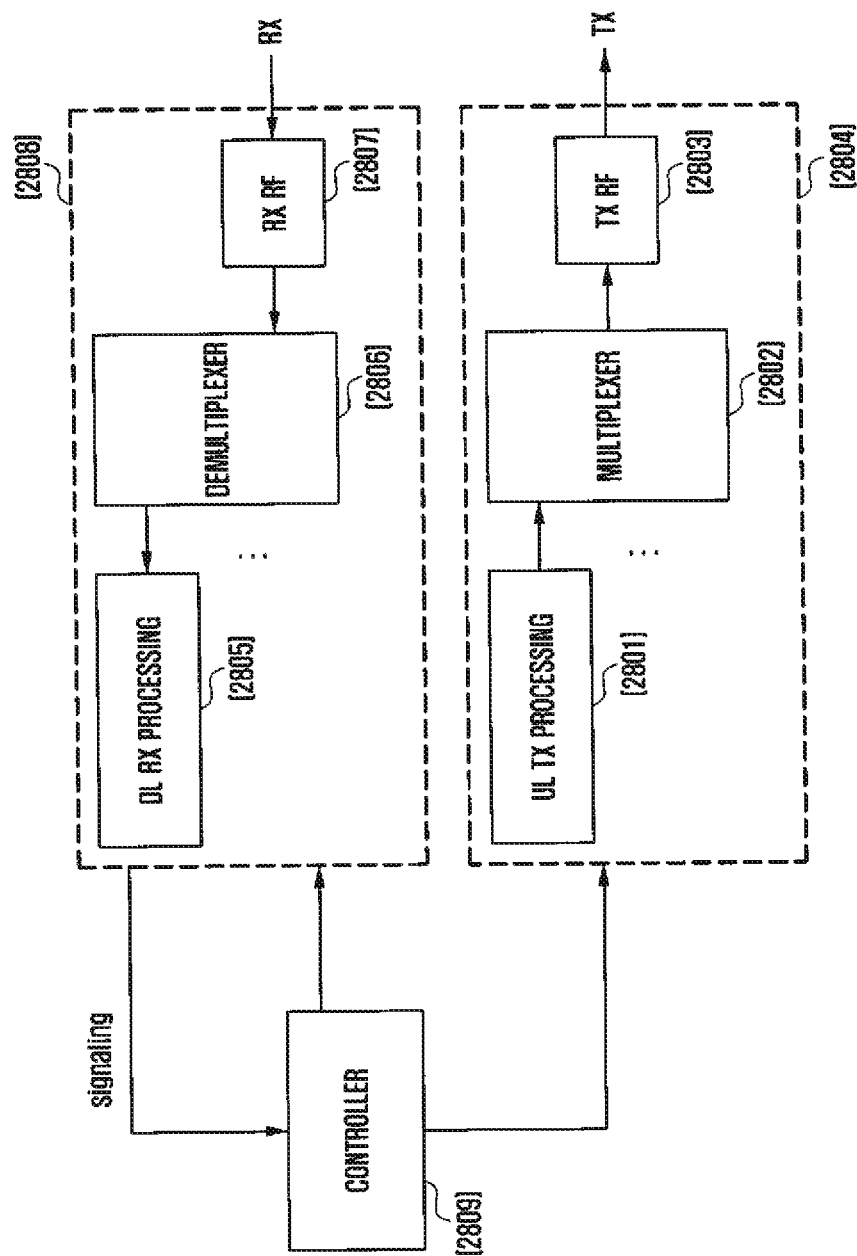
FIG. 28 illustrates UE transmission and reception devices.

FIG. 28 illustrates UE transmission and reception devices according to the disclosure. For convenience of description, devices which are not directly relevant to the disclosure are neither illustrated nor described.

Referring to FIG. 28, the UE includes a transmitter 2804 including an uplink transmission-processing block 2801, a multiplexer 2802, and a transmission RF block 2803, a receiver 2808 including a downlink reception-processing block 2805, a demultiplexer 2806, and a reception RF block 2807, and a controller 2809.

The controller 2809 determines whether the UE has successfully completed the random access procedure and the UE state (idle state or connected state) and controls element blocks of the receiver 2808 for receiving SS block signals and element blocks of the transmitter 2804 for transmitting uplink signals.

In the transmitter 2804 of the UE, the uplink transmission-processing block 2801 performs a process such as channel coding and modulation and generates a signal to be transmitted. The signal generated by the uplink transmission-processing block 2801 is multiplexed with another uplink signal by the multiplexer 2802, signal-processed by the transmission RF block 2803, and then transmitted to the BS.

The receiver 2808 demultiplexer the signal received from the BS and distributes the signal to each downlink reception-processing block. The downlink reception-processing block 2805 performs a process such as demodulation and channel decoding on the downlink signal of the BS and obtains control information or data transmitted by the BS. The receiver 2808 of the UE applies an output result of the downlink reception-processing block to the controller 2809 and supports the operation of the controller 2809.

Although exemplary embodiments of the disclosure have been shown and described in this specification and the drawings, they are used in general sense in order to easily explain technical contents of the disclosure, and to help comprehension of the disclosure, and are not intended to limit the scope of the disclosure. It is obvious to those skilled in the art to which the disclosure pertains that other modified embodiments on the basis of the spirits of the disclosure besides the embodiments disclosed herein can be carried out. Further, if necessary, the above respective embodiments may be employed in combination.

Third Embodiment

A wireless communication system has developed into a broadband wireless communication system that provides a high-speed and high-quality packet data service according to communication standards such as high-speed packet access (HSPA) of 3GPP, long-term evolution (LTE) or evolved universal terrestrial radio access (E-UTRA), LTE-advanced (LTE-A), LTE-Pro, high-rate packet data (HRPD) of 3GPP2, ultra-mobile broadband (UMB), and 802.16e of IEEE, beyond the voice-based service provided at initial stages.

In an LTE system, which is a representative example of broadband wireless communication systems, a downlink (DL) adopts an OFDM scheme and an uplink (UL) adopts a single-carrier frequency division multiple access (SC-FDMA) scheme. The uplink is a radio link through which a UE or a mobile station (MS) transmits data or a control signal to a BS (or an eNode B), and the downlink is a radio link through which the BS transmits data or a control signal to the UE.

In the multiple access schemes described above, time-frequency resources for carrying data or control information are allocated and operated in a manner to prevent overlapping of the resources, i.e. to establish orthogonality between users so as to identify data or control information of each user.

A post-LTE communication system, that is, a 5G communication system, should be able to freely reflect the various requirements of a user and a service provider, and thus it is required to support a service which satisfies the various requirements. Services under consideration for the 5G communication system include enhanced mobile broadband communication (eMBB), massive machine-type communication (mMTC), and ultra-reliable low-latency communication (URLLC).

The eMBB aims to provide a data transmission rate that is improved so as to surpass the data transmission rate supported by LTE, LTE-A, or LTE-Pro. For example, in the 5G communication system, the eMBB should provide a peak downlink data rate of 20 Gbps and a peak uplink data rate of 10 Gbps from the viewpoint of a single base station. Further, the 5G communication system should provide not only the peak data rate but also an increased user-perceived data rate. In order to satisfy these requirements, improvement of various transmission/reception technologies, including a further improved multi-input multi-output (MIMO) transmission technology, is needed. Further, while the current LTE system uses transmission bandwidths from a bandwidth of 2 GHz to a maximum bandwidth of 20 MHz to transmit signals, the 5G communication system uses a frequency bandwidth wider than 20 MHz in frequency bands of 3 to 6 GHz or greater than 6 GHz, whereby the data transmission rate required by the 5G communication system can be satisfied.

Also, in order to support an application service such as the Internet of Things (IoT), the implementation of mMTC is under consideration in the 5G communication system. The mMTC is required to support access of massive numbers of UEs within a cell, improve coverage of the UE, increase a battery lifetime, and reduce the costs of the UE in order to efficiently provide IoT. IoT connects various sensors and devices to provide a communication function, and thus should support a large number of UEs (for example, 1,000,000 UEs/km$^2$) within a cell. Further, since the UE supporting the mMTC is highly likely to be located in a shade area, such as a basement, which a cell cannot cover due to the service characteristics thereof, the mMTC requires wider coverage compared to other services provided by the 5G communication system. The UE supporting the mMTC needs to be produced at low cost and it is difficult to frequently exchange a battery thereof, and thus a very long battery lifetime, for example, 10 to 15 years, is required.

Last, the URLLC is a cellular-based wireless communication service used for a particular (mission-critical) purpose. For example, services used for remote control of robots or machinery, industrial automation, unmanned aerial vehicles, remote health care, and emergency alerts may be considered. Accordingly, communication provided by the URLLC should provide very low latency and very high reliability. For example, services supporting the URLLS should satisfy a radio access delay time (air interface latency) shorter than 0.5 milliseconds and should also have requirements of a packet error rate equal to or smaller than $10^{-5}$. Accordingly, for services supporting URLLC, the 5G system should provide a transmission time interval (TTI) smaller than that of other systems and should also have design requirements of allocating wide resources in a frequency band in order to guarantee the reliability of a communication link.

Three services of 5G, namely eMBB, URLLC, and mMTC, may be multiplexed and transmitted in one system. At this time, in order to meet the different requirements of the respective services, different transmission/reception schemes and transmission/reception parameters may be used for the services.

The frame structure of LTE and LTE-A systems is the same as that described with reference to FIG. 1, which will be omitted hereinafter.

Subsequently, downlink control information (DCI) in the LTE and LTE-A systems will be described in more detail.

In the LTE system, scheduling information of downlink data or uplink data is transmitted from the base station to the UE through the DCI. The DCI is defined in various formats, and a DCI format is operated through the application of one of various predefined DCI formats depending on whether scheduling information is scheduling information of uplink data or downlink data, whether the DCI is compact DCI having small size control information, and whether spatial multiplexing using multiple antennas is applied, and the DCI is DCI for controlling power. For example, the content contained in information on DCI format 1, which is scheduling control information of downlink data, is the same as described above, and thus will be omitted hereinafter.

A cyclic redundancy check (CRC) is added to a DCI message payload and is scrambled to a radio network temporary identifier (RNTI) corresponding to the identity of the UE.

Depending on the purpose of the DCI message, for example, UE-specific data transmission, a power control command, or a random access response, different RNTIs are used. The RNTI is not explicitly transmitted, but is transmitted while being included in a CRC calculation process. If the DCI message transmitted through the PDCCH is received, the UE may identify the CRC through the allocated RNTI, and may recognize that the corresponding message is transmitted to the UE when the CRC is determined to be correct on the basis of the CRC identification result.

Next, a resource allocation (RA) method of the PDSCH in LTE and LTE-A systems will be described in detail.

LTE supports three types of resource allocation schemes for the PDSCH, namely resource allocation type 0, resource allocation type 1, and resource allocation type 2.

Resource allocation type 0 supports allocation of non-contiguous RBs on the frequency axis, and the allocation RBs are indicated using a bitmap. At this time, if the corresponding RBs are expressed using a bitmap for the size, such as the number of RBs, a very large bitmap should be transmitted via a large cell bandwidth, thereby causing high control signaling overhead. Accordingly, resource allocation type 0 reduces the size of the bitmap by grouping contiguous RBs and indicating the group without directly indicating each RB in the frequency region. For example, if the total transmission bandwidth is $N_{RB}$ and the number of RBs per resource block group (RBG) is P, a bitmap required to indicate RB allocation information is $N_{RB}/P$ in resource allocation type 0. There is an advantage of increasing flexibility of scheduling as the number of RBs per RBG, that is, P, is smaller, but also a disadvantage of increasing control signaling overhead. Accordingly, P should be appropriately selected to maintain flexibility of allocation of sufficient resources and reduce the number of bits required.

In LTE, the RBG size is determined by a downlink cell bandwidth, and at this time an available RBG size is as shown in [Table 3] below.

TABLE 3

| System Bandwidth $N_{RB}^{DL}$ | RBG Size (P) |
|---|---|
| ≤10 | 1 |
| 11-26 | 2 |
| 27-63 | 3 |
| 64-110 | 4 |

In resource allocation type 1, resource allocation is performed such that all RBG sets on the frequency axis are divided into scattering RBG subsets. The number of subsets is given from the cell bandwidth, and the number of subsets in resource allocation type 1 is the same as the group size (RBG size, P) in resource allocation type 0. RB allocation information of resource allocation type 1 includes three fields below.

First field: selected RBG subset indicator ($\log_2(P)$) bits)
Second field: indicator indicating whether resource allocation within subset is shifted (1 bit)
Third field: bitmap of allocated RBG(($N_{RB}/P$)–($\log_2(P)$)–1 bits)

As a result, the total number of bits used by resource allocation type 1 is ($N_{RB}/P$), which is the same as the number of bits required for resource allocation type 0. Accordingly, in order to inform the UE whether the resource allocation type is 0 or 1, the 1-bit indicator is added.

Unlike the two resource allocation types described above, resource allocation 2 does not depend on the bitmap. Instead, resource allocation is expressed by a start point and a length of RB allocation. Accordingly, while both resource allocations 0 and 1 support non-contiguous RB allocation, resource allocation type 2 supports only contiguous RE allocation. As a result, RB allocation information of resource allocation type 2 includes the two fields below.

First field: indicator indicating RB start point
Second field: indicator indicating length of consecutively allocated RBs ($L_{CRBs}$)

In resource allocation type 2, ($\log_2(N_{RB}(N_{RB}+1)/2$ bits are used.

All of the three resource allocation types correspond to a virtual resource block (VRB). In resource allocation types 0 and 1, VRBs are directly mapped to PRBs in a localized manner. On the other hand, in resource allocation type 2, VRBs in both the localized and distributed types are supported. Accordingly, in resource allocation type 2, an indicator for identifying the localized and distributed VRBs is added.

Figure 29:
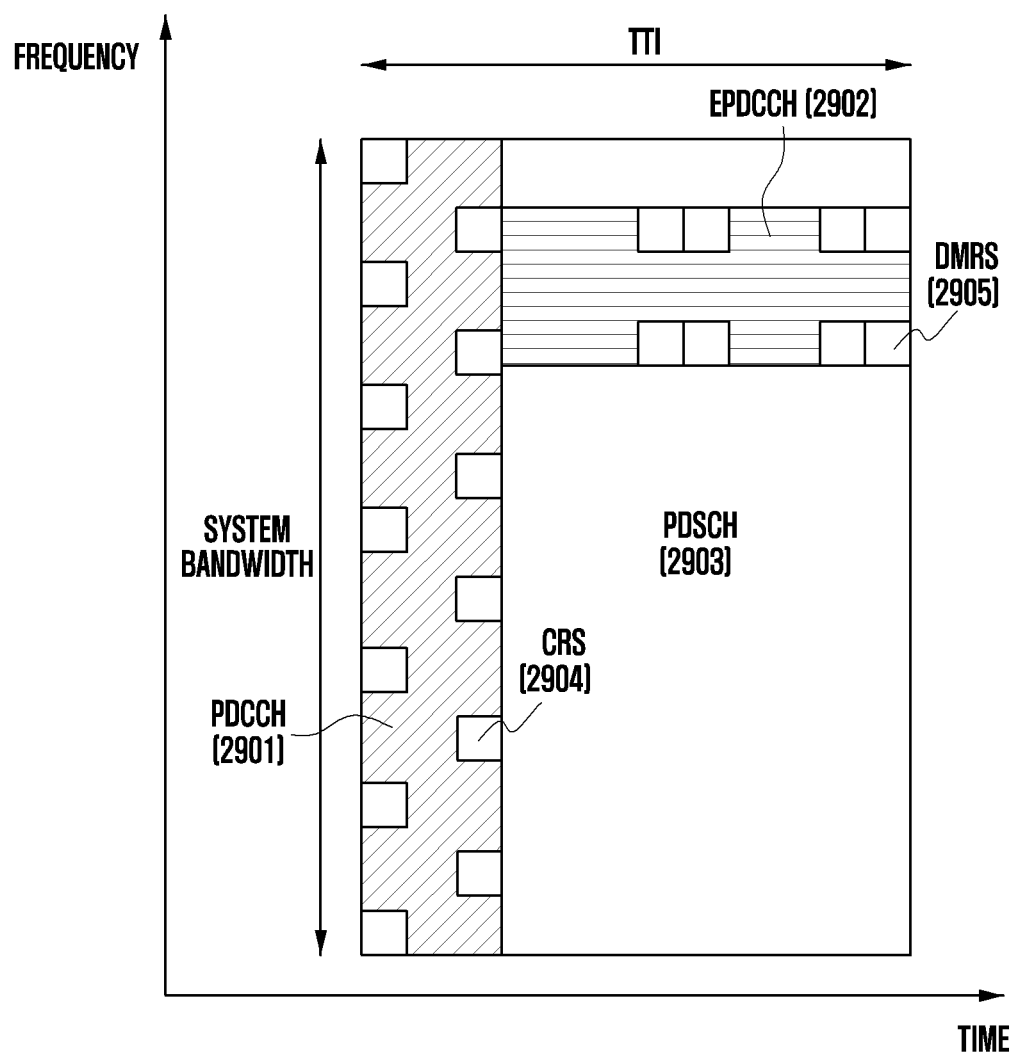
FIG. 29 illustrates a PDCCH and an EPDCCH which are downlink control channels of LTE.

FIG. 29 illustrates a PDCCH 2901 and an EPDCCH 2902, which are downlink physical channels for transmitting DCI in LTE.

Referring to FIG. 29, the PDCCH 2901 is multiplexed with a PDSCH 2903, which is a data transmission channel, on the time axis and is transmitted over the entire system bandwidth.

An area of the PDCCH 2901 is expressed by the number of OFDM symbols, which is indicated to the UE by a CFI transmitted through a physical control format indicator channel. By allocating the PDCCH 2901 to OFDM symbols on the front part of the subframe, the UE may decode downlink scheduling allocation as soon as possible, and thus a decoding delay for a downlink shared channel (DL-SCH), that is, an entire downlink transmission delay, may be reduced. One PDCCH carries one DCI message, and a plurality of terminals is simultaneously scheduled on the downlink and the uplink, so that transmission of a plurality of PDCCHs is simultaneously performed within each cell.

A CRS 2904 is used as a reference signal for decoding the PDCCH 2901. The CRS 2904 is transmitted in every subframe over the entire band, and scrambling and resource mapping vary depending on a cell identity (ID). Since the CRS 2904 is a reference signal used in common by all UEs, UE-specific beamforming cannot be used. Accordingly, a multi-antenna transmission scheme of the PDCCH in LTE is limited to open-loop transmission diversity. The number of ports of the CRS is implicitly made known to the UE from decoding of a PBCH.

Resource allocation of the PDCCH 2901 is based on a control-channel element, and one CCE consists of 9 resource element groups (REGs), that is, a total of 36 REs. The number of CCEs required for a particular PDCCH 2901 may be 1, 2, 4, or 8, which varies depending on the channel-coding rate of the DCI message payload. As described above, different numbers of CCEs may be used to implement link adaptation of the PDCCH 2901.

The UE is required to detect a signal without being aware of information on the PDCCH 2901, so a search space indicating a set of CCEs is defined for blind decoding in LTE. The search space includes a plurality of sets at an aggregation level (AL) of each CCE, which is not explicitly signaled but is implicitly defined through a function using a UE identity and a subframe number. In each subframe, the UE performs decoding on the PDCCH 2901 with respect to all resource candidates that can be configured by CCEs within the set search space and processes information declared to be valid to the corresponding terminal through identification of the CRC.

The search space is classified into a UE-specific search space and a common search space. UEs in a predetermined group or all UEs may search for a common search space of the PDCCH 2901 in order to receive cell-common control information such as dynamic scheduling of system information or paging messages. For example, scheduling allocation information of the DL-SCH for transmission of system information block (SIB)-1 including service provider information of the cell may be received through the search for the common search space of the PDCCH 2901.

Referring to FIG. 29, the EPDCCH 2902 is multiplexed on the frequency with the PDSCH 2903. The BS may appropriately allocate resources of the EPDCCH 2902 and the PDSCH 2903 through scheduling and accordingly effectively support the coexistence with transmission of data for the existing LTE UE. However, the EPDCCH 2902 is transmitted while being allocated to the entirety of one subframe on the time axis, so that there is a problem in terms of transmission delay time. A plurality of EPDCCHs 2902 constitutes a set of EPDCCHs 2902, and allocation of the set of EPDCCHs 2902 is performed in units of PRB pairs. Location information of the set of EPDCCHs is configured in a UE-specific manner and is signaled through radio resource control (RRC). Up to two sets of EPDCCHs 2902 may be configured in each UE, and one set of EPDCCHs 2902 may be simultaneously multiplexed and configured in different UEs.

Resource allocation of the EPDCCH 2902 is based on enhanced CCEs (ECCEs), one ECCE consists of 4 or 8 enhanced REGs (EREGs), and the number of EREGs per ECCE varies depending on a CP length and subframe configuration information. One EREG consists of 9 REs, and accordingly 16 EREGs may exist per RPB pair. EPDCCH transmission types are classified into localized and distributed transmission types according to the RE mapping scheme of EREGs. The aggregation level of the ECCEs may be 1, 2, 4, 8, 16, or 32, which is determined by a CP length, a subframe configuration, an EPDCCH format, and a transmission scheme.

The EPDCCH 2902 supports only a UE-specific search space. Accordingly, the terminal that desires to receive a system message should necessarily search for a common search space on the existing PDCCH 2901.

Unlike the PDCCH 2901, the EPDCCH 2902 uses a demodulation reference signal (DM-RS) 2905 as the reference signal for decoding. Accordingly, precoding for the EPDCCH 2902 may be configured by the BS, and may use UE-specific beamforming. Although UEs are not aware which kind of precoding is used through the DMRS 2905, the UEs may perform decoding for the EPDCCH 2902. In the EPDCCH 2902, the same pattern as the DMRS of the PDSCH 2903 is used. However, unlike the PDSCH 2903, the DMRS 2905 of the EPDCCH 2902 may support transmission using a maximum of four antenna ports. The DMRS 2905 is transmitted only in the corresponding PRB through which the EPDCCH is transmitted.

Port configuration information of the DMRS 2905 varies depending on the transmission scheme of the EPDCCH 2902. In a localized transmission scheme, an antenna port corresponding to the ECCE to which the EPDCCH 2902 is mapped is selected on the basis of a UE ID. If different UEs share the same ECCE, that is, if multiuser MIMO transmission is used, the DMRS antenna port may be allocated to each UE. Alternatively, transmission may be performed while sharing the DMRS 2905. In this case, the transmission may be identified by a DMRS 2905 scrambling sequence configured through higher-layer signaling.

In the distributed transmission scheme, up to two antenna ports of the DMRS 2905 are supported, and a diversity scheme in a precoder cycling type is supported. All REs transmitted within one PRB pair may share the DMRS 2905.

The downlink control channel transmission schemes in LTE and LTE-A and the RS for decoding the downlink control channel have been described above.

Hereinafter, the downlink control channel in the 5G communication system which is currently under discussion will be described in more detail with reference to the drawings.

Figure 30:
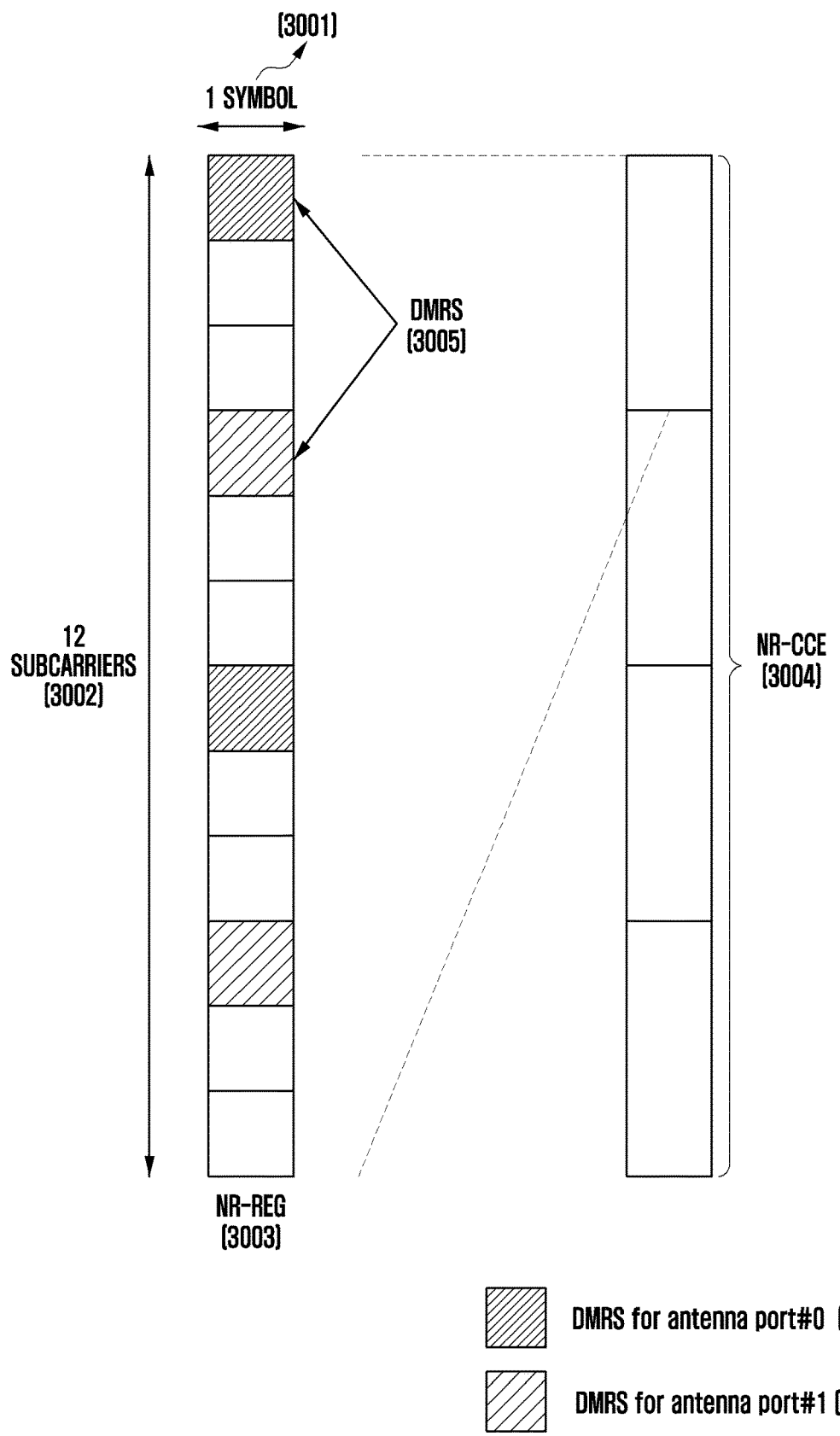
FIG. 30 illustrates a 5G downlink control channel.

FIG. 30 illustrates an example of a basic unit of time and frequency resources included in a downlink control channel that can be used in 5G.

Referring to FIG. 30, the basic unit of time and frequency resources for the control channel (named an REG, an NR-REG, or a PRB, and hereinafter, referred to as an NR-REG 3003 in the disclosure) is one OFDM symbol 3001 on the time axis and 12 subcarriers 3002, that is, one RB, on the frequency axis. On the assumption that the basic unit of the control channel on the time axis is one OFDM symbol 3001, a data channel and a control channel may be time-multiplexed within one subframe. It is easy to satisfy delay time requirements through a decrease in processing time of the user by placing the control channel ahead of the data channel. By configuring the basic unit of the control channel on the frequency axis as one RB 3003, frequency multiplexing between the control channel and the data channel may be more efficiently performed.

Various sizes of control channel areas may be configured by concatenating the NR-REG 3003 illustrated in FIG. 30. For example, if a basic unit for allocation of the downlink control channel in 5G is a CCE 3004, one NR-CCE 3004 may consist of a plurality of NR-REGs 3003. For example, the NR-REG 3003 illustrated in FIG. 30 may consist of 12 REs, and if one NR-CCE 3004 consists of four NR-REGs 3003, the one NR-CCE 3004 may consists of 48 REs. If a downlink control region is configured, the corresponding region may include a plurality of NR-CCEs 3004, and a particular downlink control channel may be mapped to one or a plurality of NR-CCEs 3004 according to an aggregation level (AL) within the control region, and may then be transmitted. NR-CCEs 3004 within the control region may be distinguished by numbers, and the numbers may be assigned according to a logical mapping scheme.

The basic unit of the downlink control channel illustrated in FIG. 30, that is, the NR-REG 3003, may include all of the REs to which the DCI is mapped and the region to which a DMRS 3005, which is a reference signal for decoding the REs, is mapped. At this time, the DMRS 3005 may be efficiently transmitted in consideration of overhead due to RS allocation. For example, if the downlink control channel is transmitted using a plurality of OFDM symbols, the DMRS 3005 may be transmitted only through a first OFDM symbol. The DMRS 3005 may be mapped and transmitted in consideration of the number of antenna ports used for transmitting the downlink control channel.

FIG. 30 illustrates an example in which two antenna ports are used. At this time, a DMRS 3006 transmitted for antenna port #0 and a DMRS 3007 transmitted for antenna port #1 may exist. The DMRSs for different antenna ports may be multiplexed in various ways.

FIG. 30 illustrates an example in which DMRSs corresponding to different antenna ports are orthogonal and transmitted in different REs. As illustrated in FIG. 30, the DMRSs may be transmitted in an FDM manner or a CDM manner. Further, various DMRS patterns may exist, which is relevant to the number of antenna ports. Hereinafter, it is assumed that two antenna ports are used for description of the disclosure. However, the same principle of the disclosure can be applied to the case in which two or more antenna ports are used.

Figure 31:
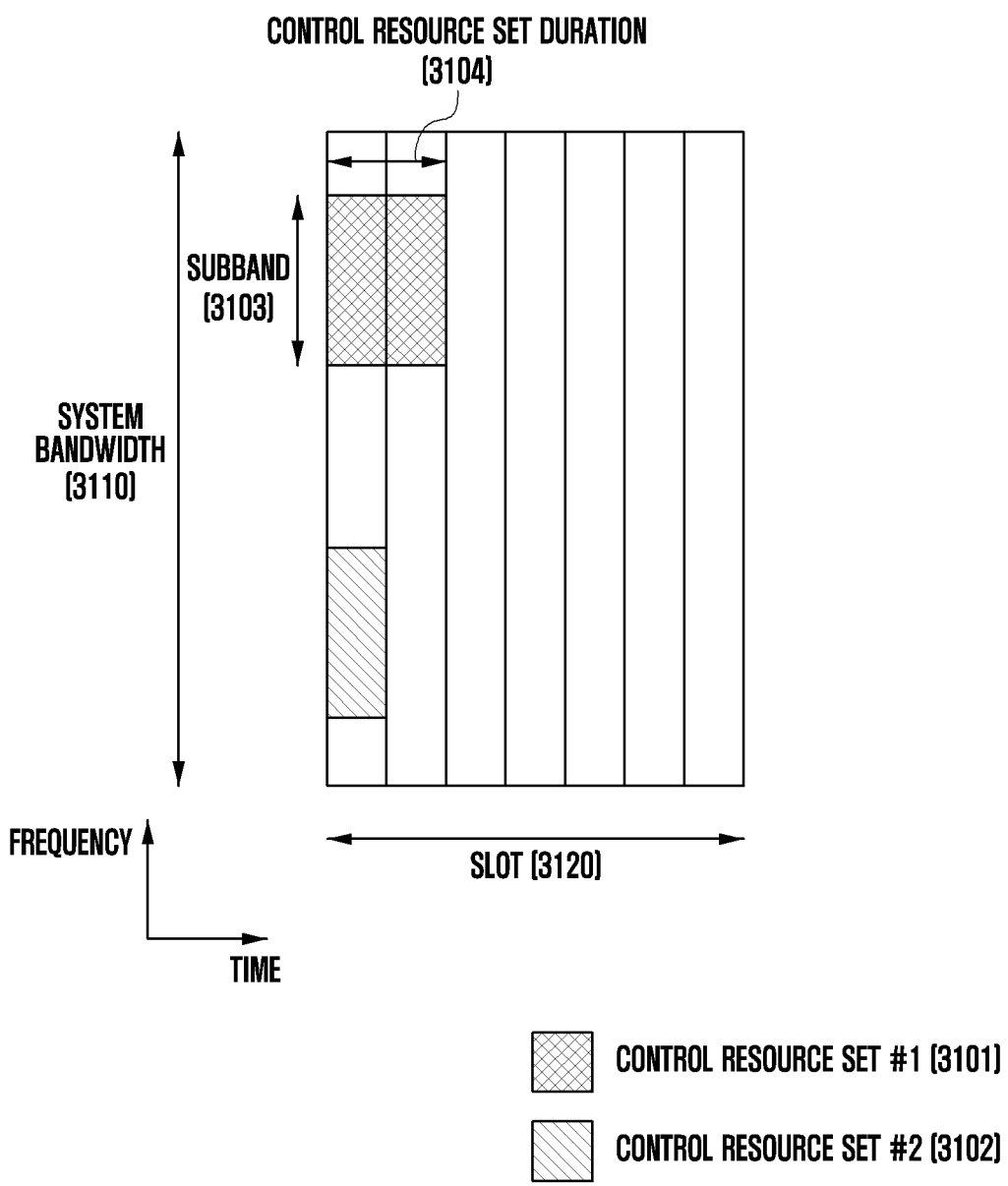
FIG. 31 illustrates resource region allocation in a 5G downlink control channel.

FIG. 31 illustrates an example of a control region (control resource set) in which a downlink control channel is transmitted in a 5G wireless communication system.

FIG. 31 illustrates an example in which two control regions (control region #1 3101 and control region #2 3102) are configured within a system bandwidth 3110 on the frequency axis and one slot 3120 on the time axis (it is assumed that one slot consists of 7 OFDM symbols in the example of FIG. 31).

The control regions 3101 and 3102 may be configured as particular subbands 3103 in an entire system bandwidth 3110 on the frequency axis. The control regions 3101 and 3102 may be configured as one or a plurality of OFDM symbols on the time axis, which may be defined as a control region length (control resource set duration) 3104. In the example of FIG. 31, control region #1 3101 is configured as the control region length of two symbols and control region #2 3102 is configured as the control region length of one symbol.

In 5G, a plurality of control regions may be configured within one system from the viewpoint of the BS. Further, a plurality of control regions may be configured to one UE from the viewpoint of the UE. In addition, some of the configured control regions within the system may be configured to the UE. Accordingly, the UE may not know whether a particular control region exists within the system. In a detailed example, two control regions including control region #1 3101 and control region #2 3102 are configured within the system of FIG. 31, and control region #1 3101 may be configured to UE #1 and control region #1 3101 and control region #2 3102 may be configured to UE #2. At this time, if there is no additional indicator, UE #1 may not know whether control region #2 3102 exists.

The control region in 5G may be configured as a common control region, a UE-group common region, or a UE-specific region. The control region may be configured to each UE through UE-specific signaling, UE-group common signaling, or RRC signaling. Configuring the control region to the UE means providing information such as the location of the control region, a subband, resource allocation of the control region, and the control region length.

Figure 32:
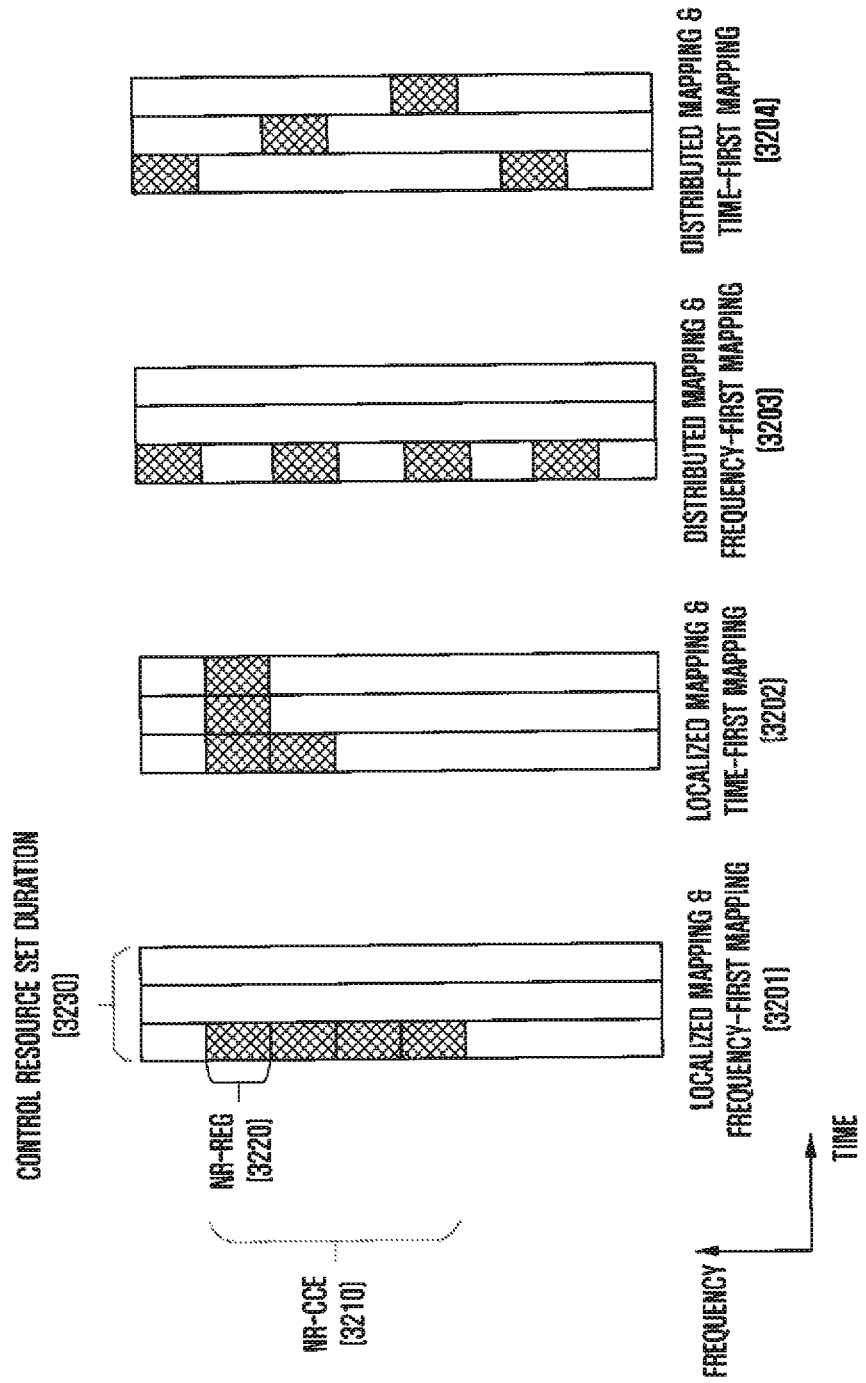
FIG. 32 illustrates a source allocation method of a 5G downlink control channel.

FIG. 32 illustrates an example of a method of mapping downlink control channels in the 5G wireless communication system.

It is assumed that one NR-CCE 3210 consists of four NR-REGs 3220 in FIG. 32. Further, it is assumed that a control region length 3230 is three OFDM symbols.

A resource mapping type considered in FIG. 32 is a mapping type between the NR-CCE 3210 and the REG 3220. Methods of mapping a plurality of NR-REGs 3220 to one NR-CCE 3210 may include localized mapping and distributed mapping. Localized mapping is a mapping type of configuring one NR-CCE 3210 by a plurality of contiguous NR-REGs 3220. Distributed mapping is a mapping type of configuring one NR-CCE 3210 by a plurality of non-contiguous NR-REGs 3220.

Methods of mapping the NR-REGs 3220 to one NR-CCE 3210 may include time-first mapping and frequency-first mapping. Time-first mapping means first mapping two-dimensional resources for frequency and time to the time region when mapping a plurality of NR-REGs 3220 to one NR-CCE 3210. Similarly, frequency-first mapping means first mapping two-dimensional resources for frequency and time to the frequency region when mapping a plurality of NR-REGs 3220 to one NR-CCE 3210.

FIG. 32 illustrates an example of a total of four mapping types.

Reference numeral 3201 indicates an example of localized mapping and frequency-first mapping in which contiguous NR-REGs 3220 are mapped to one NR-CCE 3210. Reference numeral 3202 indicates an example of localized mapping and time-first mapping in which contiguous NR-REGs 3220 are mapped to one NR-CCE 3210. Reference numeral 3203 indicates an example of distributed mapping and frequency-first mapping in which non-contiguous NR-REGs 3220 are mapped to one NR-CCE 3210. Reference numeral 3204 indicates an example of distributed mapping and time-first mapping in which non-contiguous NR-REGs 3220 are mapped to one NR-CCE 3210.

The downlink control channel in the 5G communication system which is currently under discussion will be described in detail with reference to the drawings.

As described above, the downlink control channel may be transmitted within the configured control region in 5G. In order to increase the efficiency of use of resources, data, for example, the PDSCH may be transmitted in the remaining regions that are not actually used for DCI transmission in the control regions. At this time, PDSCHs transmitted in the control region may start to be transmitted at different start points, that is, at different OFDM symbols. Accordingly, if some resources of the control region which is not used are used for data transmission, additional signaling for the data start point may be needed. If PDSCHs are multiplexed in the state in which a plurality of resource regions exists within a plurality of systems, not only signaling for the data start point but also various kinds of signaling for resource region configuration information may be needed. Further, an indicator indicating whether there is DCI transmission by another user according to rate matching or puncturing of the PDSCH transmitted within the control region may be needed. As a result, there may be a tradeoff between increased resource usage efficiency according to resource sharing between the data channel and the control channel and overhead according to additional signaling. Accordingly, the disclosure provides a method of efficiently sharing resources between the data channel and the control channel in 5G and a method and an apparatus for additional signaling to support the same.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

Further, although the following detailed description of embodiments of the disclosure will be directed to the 3GPP LTE standard, it can be understood by those skilled in the art that the main gist of the disclosure may also be applied to any other communication system having similar technical backgrounds and channel formats, with a slight modification, without substantially departing from the scope of the disclosure.

Hereinafter, various embodiments of resource sharing between the data channel and the control channel proposed by the disclosure will be described.

Embodiment 3-1

Figure 33:
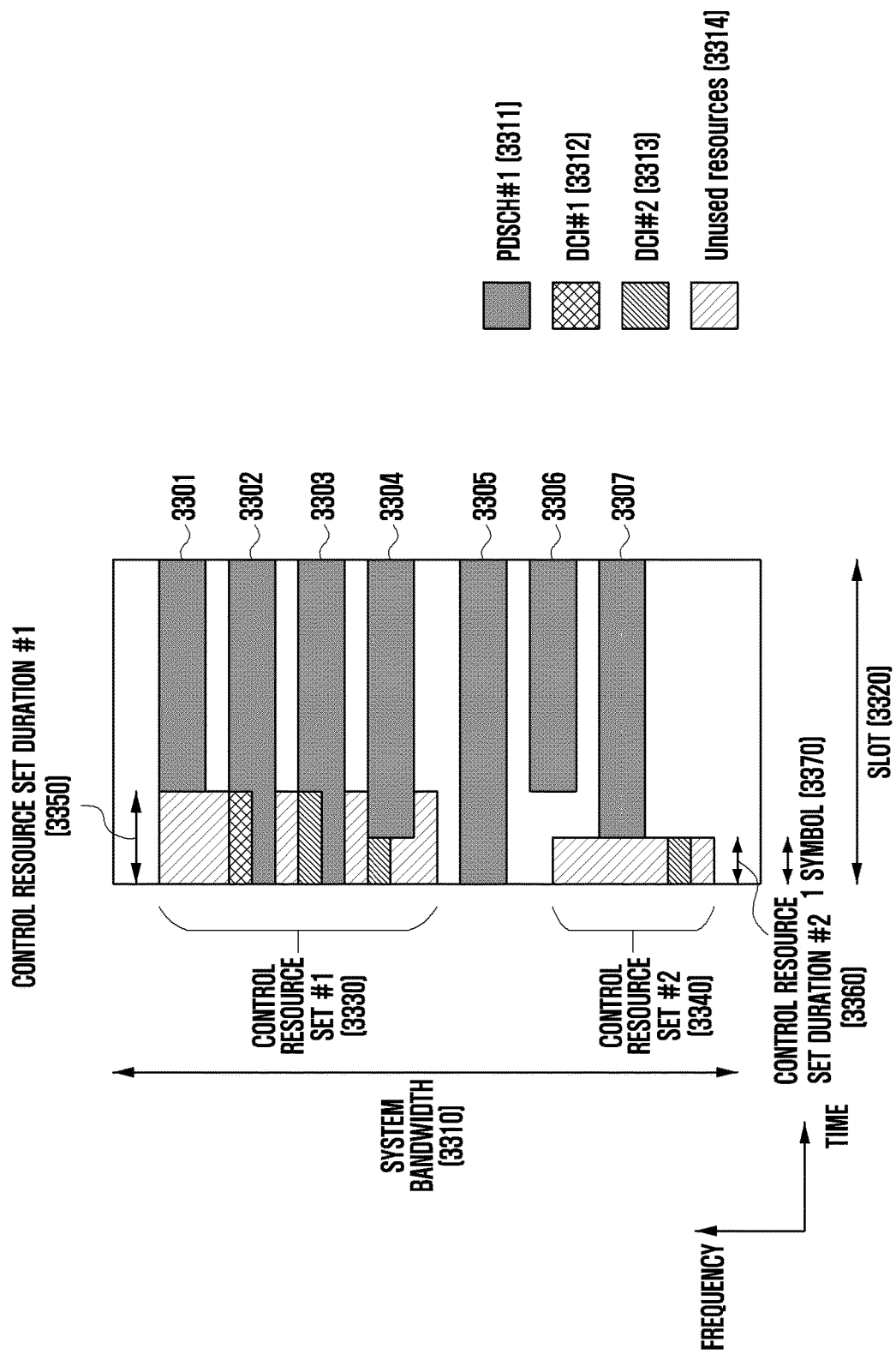
FIG. 33 illustrates embodiment 3-1 of the disclosure.

FIG. 33 illustrates an example of a method of sharing resources between a data channel and a control channel according to embodiment 3-1 of the disclosure.

More specifically, FIG. 33 illustrates an example in which two control regions, that is, control region #1 3330 and control region #2 3340, are configured within time and frequency resources including a system bandwidth 3310 on the frequency axis and one slot 3320 on the time axis. In FIG. 33, a control region length of control region #1 3330 is configured as control region length #1 3350 and a control region length of control region #2 3340 is configured as control region length #2 3360.

Referring to FIG. 33, it is assumed that control region #1 3330 is configured for UE #1, and control region #1 3330 and control region #2 3340 are configured for UE #2 in the disclosure. Further, it is assumed that DCI #1 3312, which is a control signal for UE #1, is transmitted in control region

1 3330, and that DCI #2 3313, which is a control signal for UE #2, is transmitted in control region #1 3330 and control region #2 3340 in FIG. 33. In control region #1 3330 and control region #2 3340, resources 3314 which are not used for transmission of DCI #1 3312 and DCI #2 3313 may exist. Further, it is assumed that PDSCH #1 3313, which is a data channel for UE #1, is transmitted in FIG. 33. FIG. 33 is only an example for convenience of description of the disclosure, and it is noted that FIG. 33 does not limit the disclosure to a specific situation. The disclosure may be equally applied to various transmission environments through slight modification thereof without departing from the scope of the disclosure.

Embodiment 3-1-1

In an example corresponding to reference numeral 3301 of FIG. 33, control region #1 3330 configured for UE #1 exists on the frequency for scheduling of PDSCH #1 3311, which is a data channel of UE #1.

At this time, in the time domain, the BS may perform scheduling such that PDSCH #1 3311 starts after control region length #1 3350, corresponding to the time axis region of control region #1 3330. In other words, a data start point of PDSCH #1 3311 may be designated to a (control region length #1 3350+1)$^{th}$ symbol. In this case, UE #1 knows in advance configuration information of control region #1, and thus is able to implicitly know the location of the data start point of PDSCH #1 3311 from control region length #1 3350.

Embodiment 3-1-2

In an example corresponding to reference numeral 3302 of FIG. 33, control signal #1 3330 exists and DCI #1 3312, which is a control channel of UE #1, is transmitted at the frequency location for scheduling of PDSCH 3311, which is a data channel of UE #1. At this time, PDSCH #1 3311 may be scheduled while reusing unused resources 3314 within the control region and a portion of PDSCH #1 3311 which overlaps transmission resources of DCI #1 3312 may be rate-matched.

UE #1 may obtain information on transmission resources of DCI #1 3312 through blind decoding, and thus is able to implicitly know which part of PDSCH #1 3311 is rate-matched. Because PDSCH #1 3311 may be transmitted within control region #1 3330, an indicator of the data start point may be additionally transmitted.

Embodiment 3-1-3

In an example corresponding to reference numeral 3303 of FIG. 33, control region #1 3330 exists, and DCI #2 3313, which is a control channel of UE #2, is transmitted at the frequency location for scheduling of PDSCH #1 3311, which is a data channel of UE #1. At this time, PDSCH #1 3311 may be scheduled while resources 3314, which are not used within the control region, are reused and a portion of PDSCH #1 3311 which overlaps transmission resources of DCI #1 3313 may be rate-matched or punctured. If the rate-matching is performed, an additional indicator indicating a rate-matched portion of PDSCH #1 3311 may be transmitted since UE #1 is not aware of transmission resources of DCI #2 3313. If puncturing is performed, UE #1 may directly decode PDSCH #1 3311. Because PDSCH #1 3311 may be transmitted within control region #1 3330, an indicator of the data start point may be additionally transmitted.

Embodiment 3-1-4

In an example corresponding to reference numeral 3304 of FIG. 33, control region #1 3330 exists and DCI #2 3313, which is a control signal of UE #2, is transmitted at the frequency location for scheduling of PDSCH #1 3311, which is a data channel of UE #1. At this time, PDSCH #1 3311 may be scheduled while reusing unused resources within the control region and avoiding transmission resources of DCI #2 3313. For example, if DCI #2 3313 is transmitted in a first OFDM symbol in control region #1 3330, PDSCH #1 3311 may be transmitted starting at a second OFDM symbol, which is a symbol after DCI #2 3313 is transmitted. As PDSCH #1 3311 may be transmitted within control region #1 3330, an indicator of the data start point may be additionally transmitted.

Embodiment 3-1-5

In an example corresponding to reference numeral 3305 of FIG. 33, there is no control region configured at the frequency location for scheduling of PDSCH #1 3311, which is a data channel of UE #1. At this time, PDSCH #1 3311 may be transmitted starting at a first OFDM system. At this time, since control region length #1 3350 corresponding to the time axis region of control region #1 configured to UE #1 and PDSCH #1 3311 may be different, an indicator of the data start point may be additionally transmitted.

Embodiment 3-1-6

An example corresponding to reference numeral 3306 of FIG. 33 shows the case in which there is no control region configured in the frequency location at which PDSCH #1 3311, which is a data channel of UE #1, is scheduled or there is control region #2 3340, which is not configured for UE #1. At this time, PDSCH #1 3311 may be scheduled to start after control region length #1 3350, corresponding to the time axis region of control region #1 3330 configured to UE #1. In this case, UE #1 is made aware in advance of configuration information of control region #1, and thus is able to implicitly know the location of the data start point of PDSCH #1 3311 from control region length #1 3350.

Embodiment 3-1-7

In an example corresponding to reference numeral 3307 of FIG. 33, control region #2 3340, which is not configured to UE #1, exists at the frequency location for scheduling of PDSCH #1 3311, which is a data channel of UE #1. At this time, in the time domain, the BS may perform scheduling such that PDSCH #1 3311 starts after control region length #2 3360, corresponding to the time axis region of control region #2 3330. In other words, a data start point of PDSCH #2 3311 may be designated to a (control region length #2 3360+1)$^{th}$ symbol.

In this case, since UE #1 is not aware of configuration information of control region #2 3330, an indicator for the data start point of PDSCH #1 3311 may be additionally transmitted. Alternatively, configuration information of control region #2 3340 (for example, information on the frequency location of control region #2 3340 and control region length #2 3360) may be provided to UE #1, and UE #1 may be implicitly aware of the start point of PDSCH #1 3311 from control region length #2 3360.

Embodiment 3-1-8

PDSCH #1 3311 which is a data channel of UE #1, may be scheduled and transmitted over the entire system band 3310. More specifically, at least two of the examples of transmission of PDSCH #1 3311, corresponding to reference numerals 3301, 3302, 3303, 3304, 3305, 3305, 3306, and 3307 of FIG. 33, may be simultaneously performed. In this case, the above-described embodiments may be complexly applied to the method of sharing resources between the data channel and the control channel. The data start point may be differently applied depending on the frequency location at which PDSCH #1 3311 is scheduled.

In a detailed example, it is assumed that PDSCH #1 3311 is scheduled over the entire system band 3310 and thus a portion of PDSCH #1 3311 is scheduled and transmitted in a region 3302 and the remaining portions of PDSCH #1 3311 are scheduled and transmitted in a region 3307 in FIG. 33. In this case, the portion of PDSCH #1 3311 in the region 3302 may be transmitted according to embodiment 3-1-2 and thus transmitted starting at a first OFDM symbol. The remaining portions of PDSCH #1 3311 in the region 3302 may be transmitted according to embodiment 3-1-7 and thus transmitted starting at a second OFDM symbol. Accordingly, the data start point may be different for each portion of PDSCH #1 3311 depending on the frequency region to which PDSCH #1 3311 is allocated. In this case, a plurality of indicators for the data start points may be transmitted.

Embodiment 3-1-9

PDSCH #1 3311, which is a data channel of UE #1, may be scheduled and transmitted over the entire system band 3310, and at least two of the examples of transmission of PDSCH #1 3311 corresponding to reference numerals 3301, 3302, 3303, 3304, 3305, 3306, and 3307 of FIG. 33 may be simultaneously performed. In this case, the above-described embodiments may be complexly applied to the method of sharing resources between the data channel and the control channel. However, the data start points may be equally scheduled regardless of the frequency location at which PDSCH #1 3311 is scheduled. In a detailed example, it is assumed so that PDSCH #1 3311 is scheduled over the entire system band 3310 and thus a portion of PDSCH #1 3311 is scheduled and transmitted in a region 3302 and the remaining portions of PDSCH #1 3311 are scheduled and transmitted in a region 3307 in FIG. 33.

In this case, the portion of PDSCH #1 3311 in the region 3302 may be transmitted according to embodiment 3-1-2 and thus transmitted starting at a first OFDM symbol. The remaining portions of PDSCH #1 3311 in the region 3302 may be transmitted according to embodiment 3-1-7 and thus transmitted starting at a second OFDM symbol. However, the BS may select one of different data start points according to each portion of PDSCH #1 3311 and determine the selected data start point as a data start point of whole PDSCH #1 3311. For example, the biggest value among a plurality of data start points of the portions may be selected as the total data start point. Accordingly, in this case, only one indicator for the data start point may be transmitted.

The method of sharing resources between the data channel and the control channel and necessary signaling have been described through various embodiments. As described above, in order to efficiently support resource sharing between the data channel and the control channel, a tradeoff between the increase in resource efficiency according to resource sharing and overhead according to signaling required for supporting the same should be considered.

Hereinafter, a resource-sharing method of more efficiently supporting resource sharing between the data channel and the control channel in 5G and a signaling method thereof will be described with reference to various embodiments.

Embodiment 3-2

Figure 34:
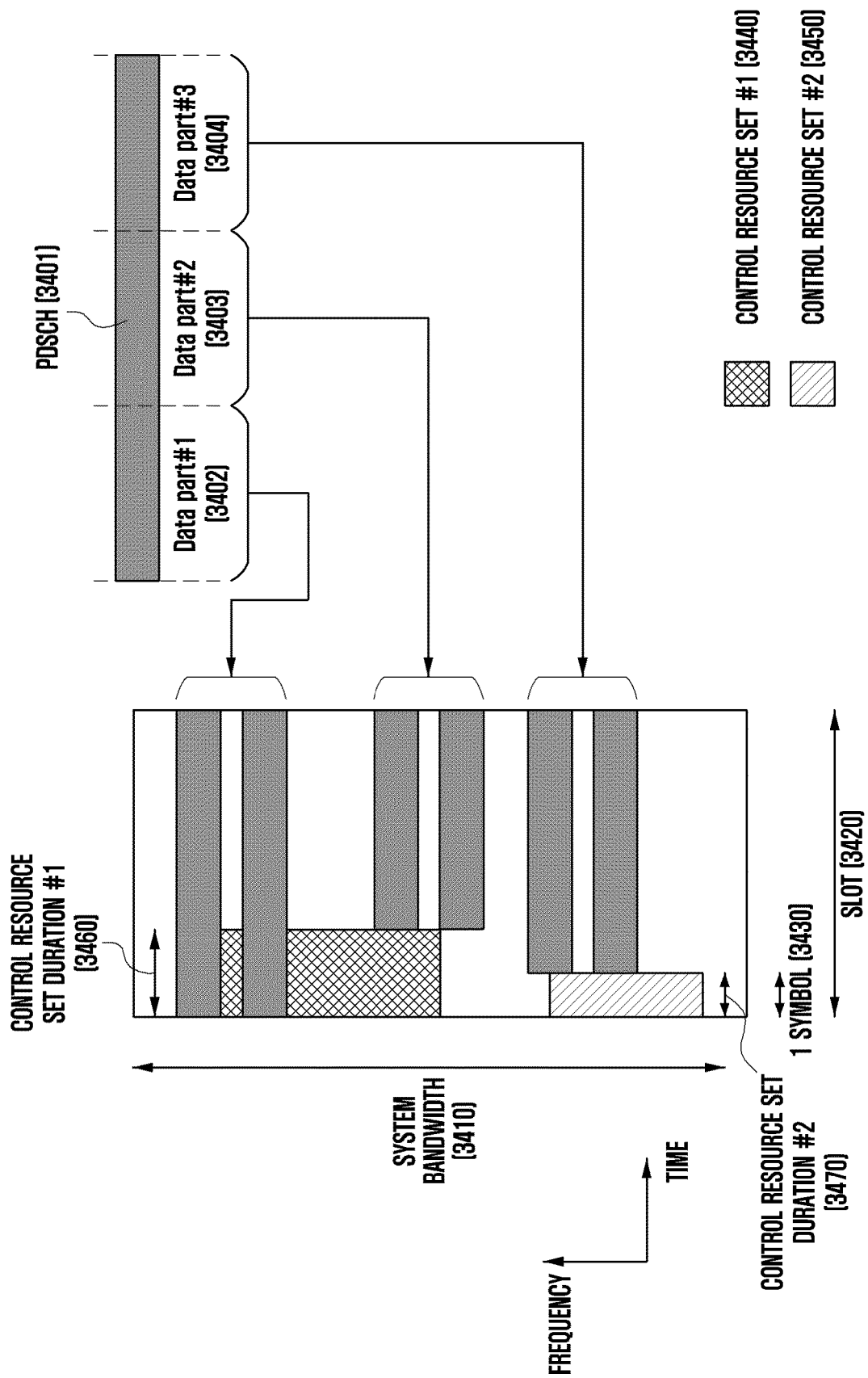
FIG. 34 illustrates embodiment 3-2 of the disclosure.

FIG. 34 illustrates an example of a method of sharing resources between the data channel and the control channel according to embodiment 3-2 of the disclosure.

More specifically, FIG. 34 illustrates an example in which two control regions, that is, control region #1 3440 and control region #2 3450, are configured within time and frequency resources including a system bandwidth 3410 on the frequency axis and one slot 3420 on the time axis (it is assumed that one slot=seven symbols 3430).

In FIG. 34, a control region length of control region #1 3440 is configured as control region length #1 3460 and a control region length of control region #2 3450 is configured as control region length #2 3470. In the example of FIG. 34, some parts of a PDSCH 3401 may be scheduled through predetermined resources within the system band 3410. In scheduling of the PDSCH 3401, resource allocation may be performed using various resource-sharing methods according to embodiment 3-1 described above in consideration of resource regions 3440 and 3450 configured within the system. Accordingly, respective parts of the PDSCH 3401 may have different start points according to the allocated frequency location.

In embodiment 3-2 of the disclosure, in order to support resource allocation having a plurality of data start points for one PDSCH 3401, the BS may transmit indicators for the plurality of data start points. At this time, the PDSCH 3401 may be partitioned to reduce signaling overhead according to transmission of the plurality of indicators, and may be scheduled to have the same data start point in the respective parts of the PDSCH 3401. This will be described in more detail with reference to the drawings.

FIG. 34 illustrates an example in which the PDSCH 3401 is partitioned into three data parts, that is, data part #1 3402, data part #2 3403, and data part #3 3404. The data parts 3401, 3402, and 3403 may include one or a plurality of RBs or RBGs. FIG. 34 illustrates an example in which each of the data parts 3401, 3402, and 3403 consists of two RBGs. The data parts 3401, 3402, and 3403 of the PDSCH 3401 may be scheduled in units of RBGs without any restriction on the frequency axis as in the conventional way. (It is assumed that the PDSCH is scheduled in units of RBGs for convenience of description of the disclosure. The scheduling in units of RBGs is a concept basically including scheduling in units of RBs.) At this time, the data parts 3401, 3402, and 3403 may be scheduled at a predetermined frequency location and may have different data start points depending on the method of reusing resources for the control region and whether resources for the control region are reused. At this time, when the data start point of the PDSCH 3401 is determined, all RBGs existing in the data parts 3401, 3402, and 3403 may be scheduled to have the same data start point. As a result, the data start point may be different for each of the data parts 3401, 3402, and 3403.

In the example of FIG. 34, the data start point of data part #1 3402 may be scheduled and transmitted in a first OFDM system, the data start point of data part #2 3403 may be scheduled and transmitted in a third OFDM symbol, and the data start point of data part #3 3404 may be scheduled and transmitted in a second OFDM symbol. The BS may transmit indicators for the data start points of the data parts 3401, 3402, and 3403, and the UE may decode the PDSH 3401 on the basis of resource allocation information of the PDSCH 3401 and information on the data start points of the data parts 3401, 3402, and 3403.

Partitioning configuration information (for example, the number of parts) of the PDSCH 3401 may be used as a value appointed by a system parameter. Alternatively, partitioning configuration information of the PDSCH may be implicitly determined by other system parameters, for example, a system bandwidth, the number of configured resource regions, resource region configuration information, a slot length, and whether slots are aggregated. Alternatively, the partitioning configuration information may be provided to the UE through a master information block (MIB) or a system information block (SIB) as cell-common system information. Alternatively, the partitioning configuration information may be semi-statically configured to the UE through higher-layer signaling, for example, RRC signaling and MAC CE signaling. The data start point indicators for the data parts 3401, 3402, and 3403 may be dynamically transmitted through UE-specific DCI.

Embodiment 3-2 of the disclosure may include an operation for indicating one data start point for one PDSCH 3401. For example, if the number of data parts is configured as one, one indicator may be transmitted for the data start point.

Figure 35A:
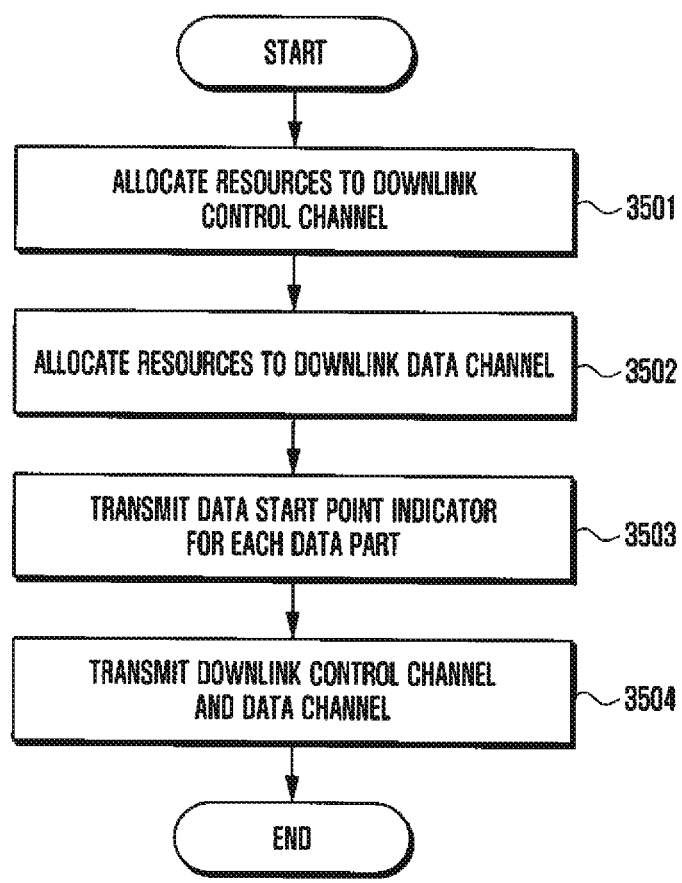
FIGS. 35A and 35B illustrate BS and UE operations according to the disclosure.
Figure 35B:
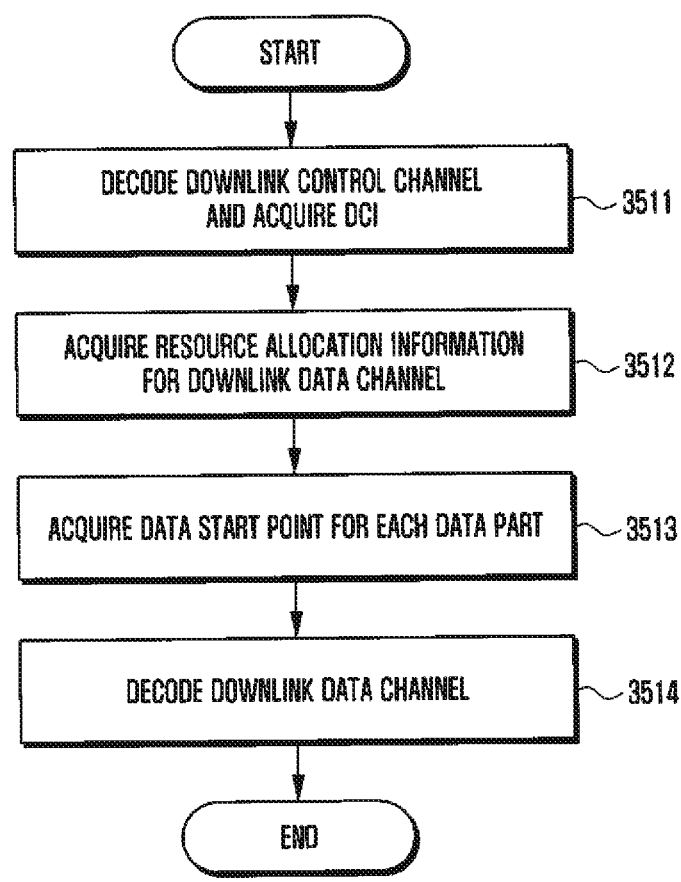

FIGS. 35A and 35B illustrate BS and UE operations according to the disclosure.

First, the BS procedure will be described with reference to FIG. 35A.

The BS performs resource allocation for a downlink control channel in step 3501.

The BS performs resource allocation for a downlink data channel in step 3502. At this time, the BS may perform resource allocation for a data channel on the basis of the method of sharing resources between the data channel and the control channel according to embodiment 3-2 of the disclosure described above. That is, the data channel may be partitioned into a plurality of data parts and scheduled at different data start points. Further, the BS may perform resource allocation on the basis of the method of sharing resources between the data channel and the control channel according to embodiment 3-1 described above. The BS may additionally transmit a data start point indicator for each data part in step 3503. The BS may transmit a downlink control channel and data channel in step 3504.

Next, the UE procedure will be described with reference to FIG. 35B.

The UE decodes the downlink control channel and obtains DCI in step 3511.

The UE may obtain resource allocation information of the downlink data channel from the DCI in step 3512. Further, the UE may obtain information on the data start point for each data part in step 3513.

The UE may decode the scheduled downlink data channel on the basis of the obtained resource allocation information and information on the data start point in step 3514.

Embodiment 3-3

Figure 36:
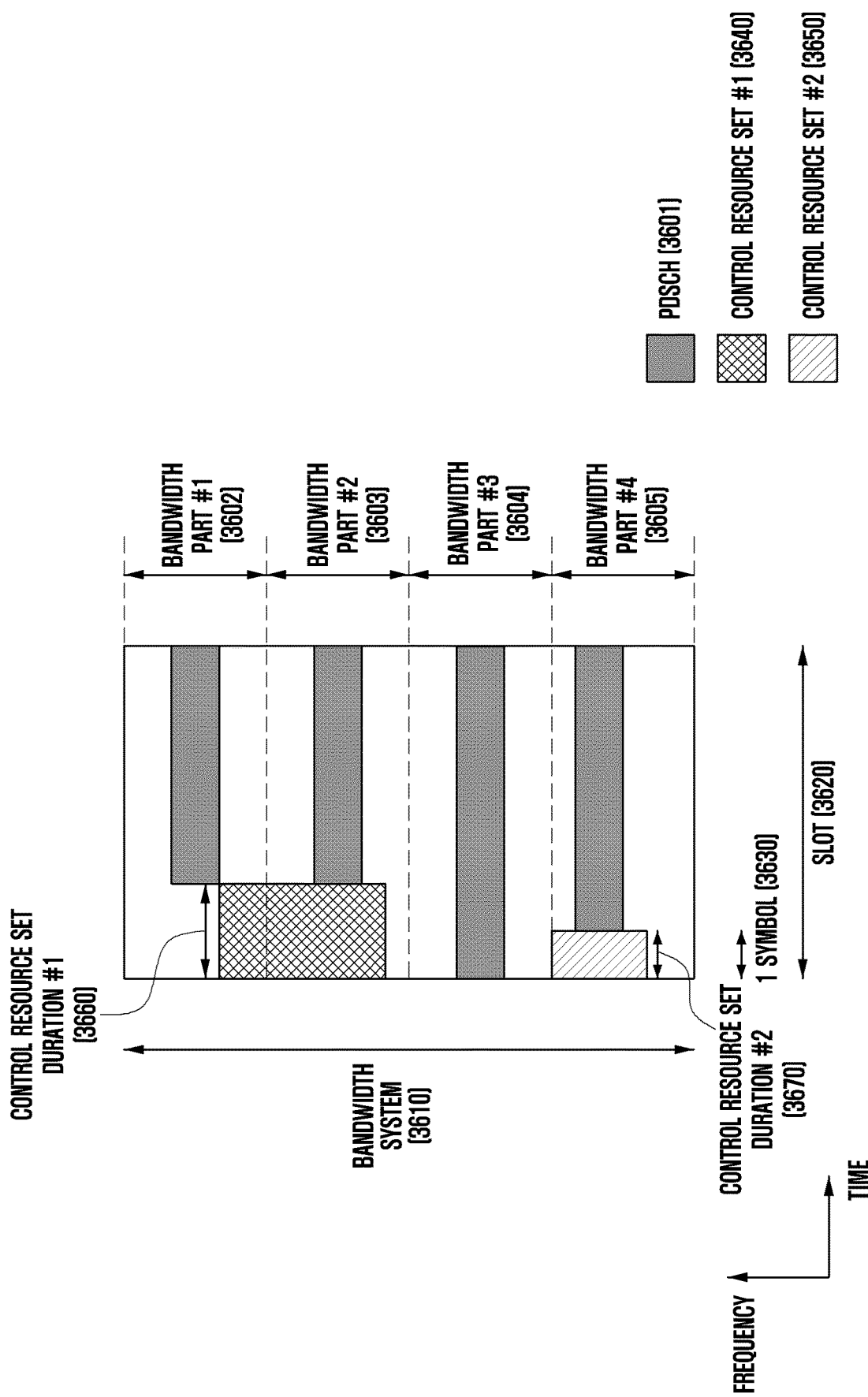
FIG. 36 illustrates embodiment 3-3 of the disclosure.

FIG. 36 illustrates an example of a method of sharing resources between the data channel and the control channel according to embodiment 3-3 of the disclosure.

More specifically, FIG. 36 illustrates an example in which two control regions, that is, control region #1 3640 and control region n #2 3650, are configured within time and frequency resources including a system bandwidth 3610 on the frequency axis and one slot 3620 on the time axis.

In FIG. 36, a control region length of control region #1 3640 is configured as control region length #1 3660 and a control region length of control region #2 3650 is configured as control region length #2 3670. In the example of FIG. 36, some parts of a PDSCH 3601 may be scheduled through predetermined resources within the system band 3610.

In scheduling of the PDSCH 3601, resource allocation may be performed using various resource-sharing methods according to embodiment 3-1 in consideration of resource regions 3640 and 3650 configured within the system. Accordingly, parts of the PDSCH 3601 may have different start points depending on the allocated frequency location and whether resources of the control region are reused.

The data start point at each frequency location to which the PDSCH 3601 is allocated may be semi-statically configured in embodiment 3-3 of the disclosure. In a more detailed description made with reference to the drawing, the entire system bandwidth 3610 may be partitioned into a plurality of bandwidth parts. In the example of FIG. 36, the entire system bandwidth 3610 is partitioned into a total of four parts, that is, bandwidth part #1 3602, bandwidth part #2 3603, bandwidth part #3 3604, and bandwidth part #4 3605. The bandwidth parts 3602, 3603, 3604, and 3605 may be semi-statically configured to have specific data start points, and the corresponding configuration may be indicated to the UE.

FIG. 36 illustrates an example in which the data start points in bandwidth part #1 3602 and bandwidth part #2 3603 are configured as a third OFDM symbol, the data start point in bandwidth part #3 3604 is configured as a first OFDM symbol, and the data start point in bandwidth part #4 3605 is configured as a second OFDM symbol.

According to the bandwidth part 3602, 3603, 3604, or 3605 through which the PDSCH 3601 is transmitted via the resource allocation process, the PDSCH 3601 or a portion of the PDSCH 3601 transmitted through the corresponding bandwidth part may be scheduled to be transmitted to the preconfigured data start point.

For example, with respect to the parts of the scheduled PDSCH 3601 transmitted through bandwidth part #1 3602 and bandwidth part #2 3603, data may be transmitted with the third OFDM symbol as the data start point in FIG. 36. Similarly, with respect to the part of the PDSCH 3601 transmitted through bandwidth part #3 3604, data may be transmitted with the first OFDM symbol as the data start point, and with respect to the part transmitted through bandwidth #4 3605, data may be transmitted with the second OFDM symbol as the data start point. As a result, the data start points of all parts of the PDSCH 3601 transmitted in specific bandwidth parts may be data start points preconfigured in the corresponding bandwidth parts.

In embodiment 3-3 of the disclosure, the data start points of the bandwidth parts 3602, 3603, 3604, and 3605 may be determined on the basis of configuration information of the control regions 3640 and 3605 existing within the system. More specifically, it is determined whether there is a control region within a specific bandwidth part, and if there is such a control region, a (control region length+1)$^{th}$ symbol of the corresponding control region may be configured as n the data start point in the corresponding bandwidth part. For example, in FIG. 36, control region #1 3640 may exist in bandwidth part #2 3603, and accordingly, a data start point in bandwidth part #2 3603 may be configured as a third symbol which is a (control region length #1 3660+1)$^{th}$ symbol.

In another example, since there is no control region in bandwidth part #3 3604, a data start point may be configured as a first OFDM symbol in FIG. 36.

Further, each UE may not receive an indicator of the data start point in the specific bandwidth part according to control region configuration information configured for the UE. For example, if it is assumed that control region #1 3640 is configured to UE #1 in FIG. 36, the UE already knows the frequency axis location of control region #1 3640 and information on control region length #1 3660. Accordingly, the BS may omit the transmission of indicators for the data start points in the bandwidth parts (bandwidth part #1 3602 and bandwidth part #2 3603) in which control region #1 3640 is configured to UE #1.

UE #1 may implicitly be aware of configuration information of the data start points in bandwidth part #1 3602 and bandwidth part #2 3603 from configuration information of control region #1 3640.

A value appointed by a system parameter may be used as partitioning configuration information of the system bandwidth 3610 (for example, the number of bandwidth parts and the bandwidth of the bandwidth part). Alternatively, the partitioning configuration information may be implicitly determined by other system parameters, for example, a system bandwidth, the number of configured resource regions, resource region configuration information, and whether carriers are aggregated. Alternatively, the partitioning configuration information may be provided to the UE through an MIB or an SIB as cell-common system information.

Alternatively, the partitioning configuration information may be semi-statically configured to the UE through higher-layer signaling, for example, RRC signaling and MAC CE signaling.

The indicators of the data start points in the bandwidth parts 3602, 3603, 3604, and 3605 may be transmitted to the UE through higher-layer signaling, for example, RRC signaling or MAC CE signaling.

Embodiment 3-3 of the disclosure may include an operation for indicating one data start point for one PDSCH 3601. For example, if the number of bandwidth parts is configured as one, one indicator may be transmitted or semi-statically configured for the data start point.

In 5G, the sizes of the system bandwidth and the maximum bandwidth that the UE can support may be different from each other. Accordingly, all procedures operating on the basis of the system bandwidth may be replaced with the bandwidth (for example, UE bandwidth) supported by the UE and equally applied.

Figure 37A:
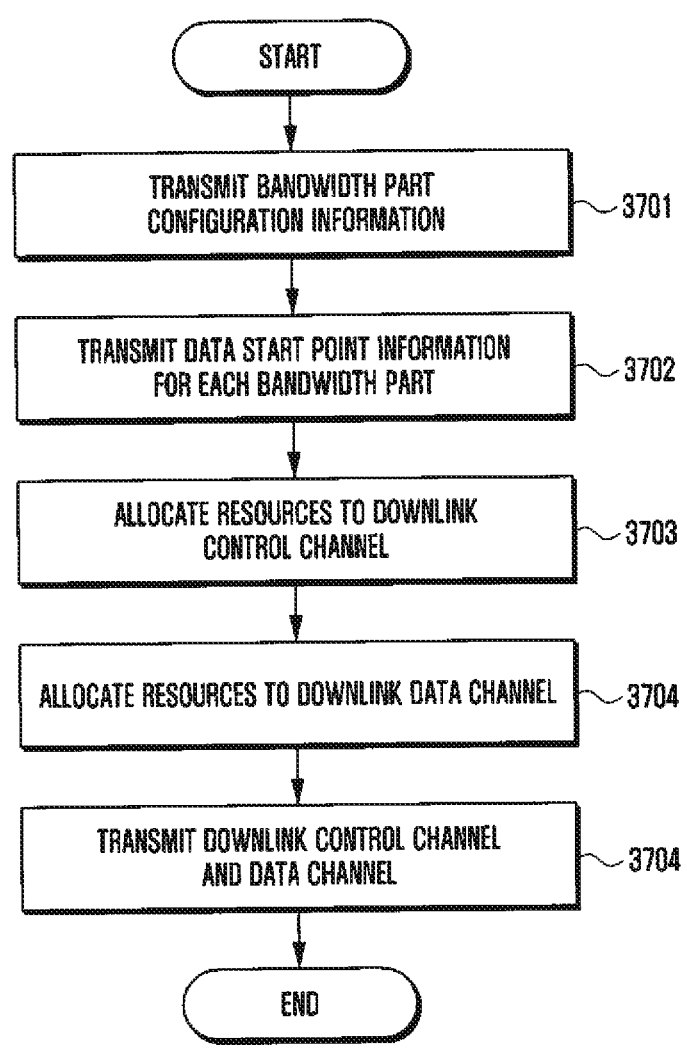
FIGS. 37A and 37B illustrate BS and UE operations according to embodiment 3-3 of the disclosure.
Figure 37B:
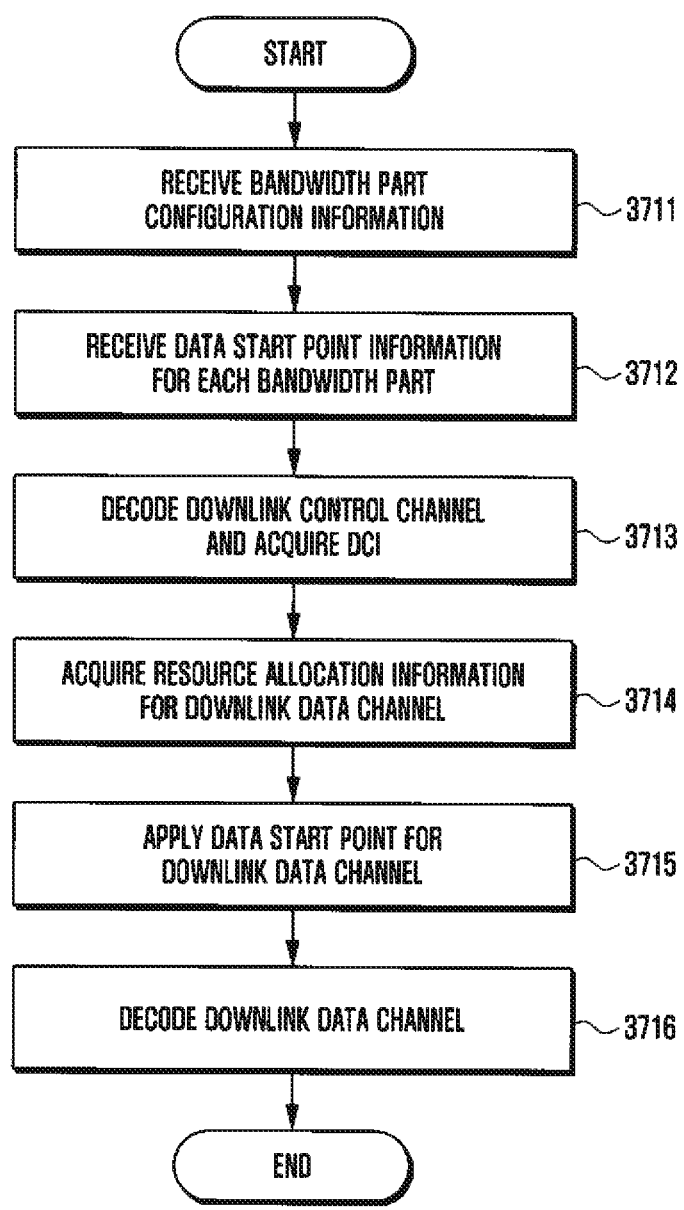

FIGS. 37A and 37B illustrate BS and UE operations according to embodiment 3-3 of the disclosure.

First, the BS procedure will be described with reference to FIG. 37A.

The BS may transmit configuration information of bandwidth parts in step 3701 and transmit information on a data start point in each bandwidth part in step 3702.

The BS performs resource allocation for a downlink control channel in step 3703. The BS may perform resource allocation for a data channel in step 3704.

At this time, the BS may perform resource allocation for a data channel on the basis of the method of sharing resources between the data channel and the control channel according to embodiment 3-3 of the disclosure. That is, scheduling may be performed by applying the preconfigured data start point according to the frequency region to which the data channel is allocated.

The BS may perform transmission for the downlink control channel and the data channel in step 3705.

Next, the UE procedure will be described with reference to FIG. 37B. The UE may receive configuration information of bandwidth parts in step 3711.

The UE may receive information on a data start point for each bandwidth part in step 3712.

The UE decodes the downlink control channel and obtains DCI in step 3713.

The UE may obtain resource allocation information for the downlink data channel from the DCI in step 3714 and apply the preconfigured data start point to the downlink data channel in each bandwidth part in step 3715.

The UE may decode the scheduled downlink data channel in step 3716.

Embodiment 3-3-1

In embodiment 3-3-1 of the disclosure, through a method of semi-statically configuring a data start point at each frequency location to which the PDSCH is allocated, all (or some required) pieces of control region configuration information within the system may be indicated to the UE. More specifically, control region of UE #1 may be configured as control region n #1 3640 in FIG. 36, and thus UE #1 may be aware of time and frequency resource information for control region #1 3640. However, UE #1 does not receive the configuration for control region #2 3650 and thus is not aware whether control region #2 3650 exists within the system bandwidth 3610. At this time, in order to semi-statically configure the data start point at the frequency location to which the PDSCH 3601 is allocated, configuration information for control region #2 3650 may be provided to UE That is, UE #1 may apply the corresponding data start point according to the frequency location at which the PDSCH 3601 is transmitted on the basis of configuration information for all control regions existing within the system, such as control region #1 3640 and control region #2 3650.

Embodiment 3-3-2

In embodiment 3-3-2 of the disclosure, through the method of sharing resources between the data channel and the control channel according to embodiment 3-3 of the disclosure, semi-static signaling for the data start point may be turned on/off using various methods. The on/off operation may be applied to the entire system bandwidth 3610 or to a specific bandwidth part 3602, 3603, 3604, or 3605. The on/off operation may be dynamically configured through DCI or may be semi-statically configured through higher-layer signaling (for example, RRC signaling or MAC CE signaling).

Embodiment 3-4

Figure 38:
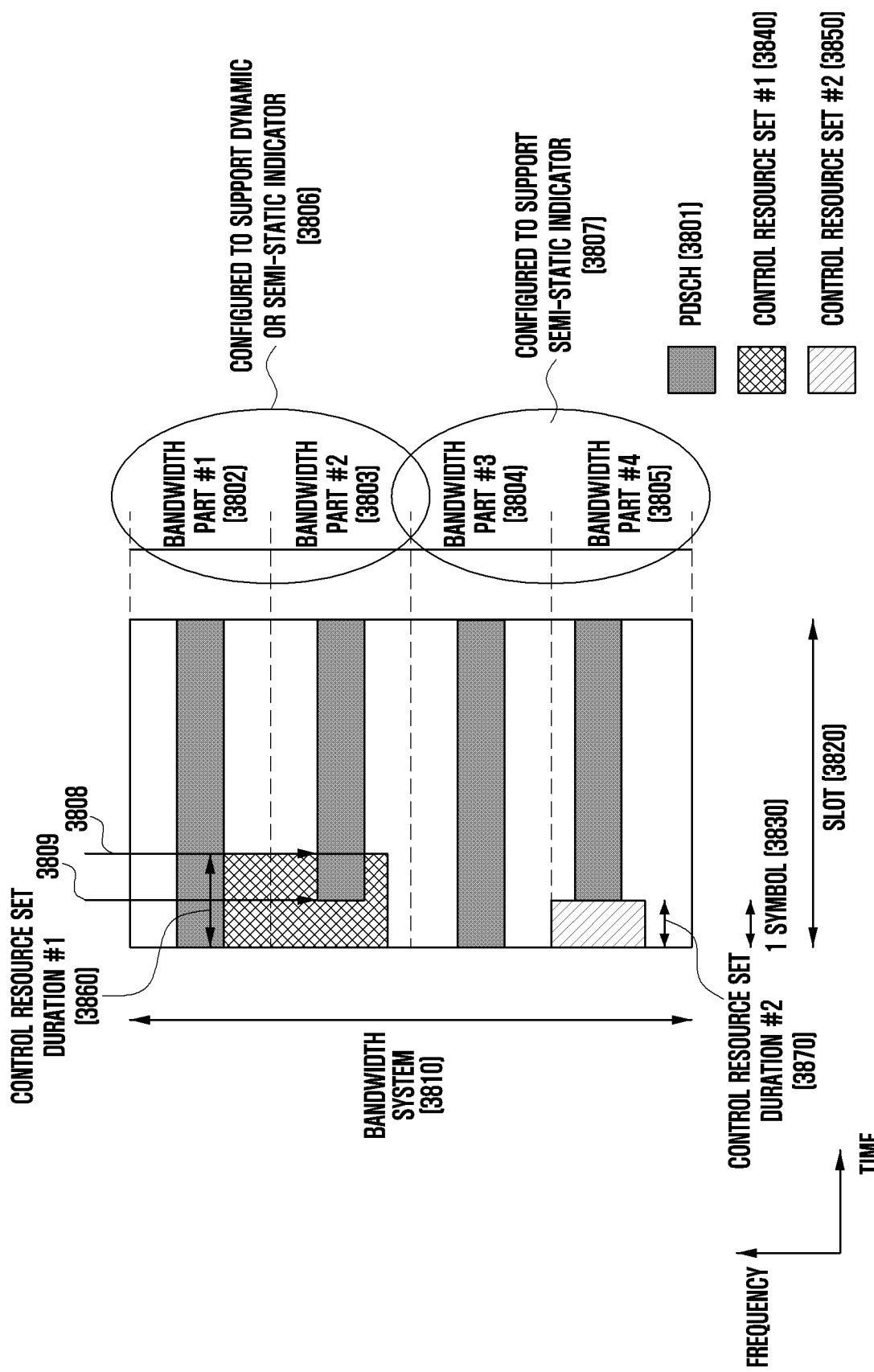
FIG. 38 illustrates embodiment 3-4 of the disclosure.

FIG. 38 illustrates an example of a method of sharing resources between the data channel and the control channel according to embodiment 3-4 of the disclosure.

More specifically, FIG. 38 illustrates an example in which two control regions, such as control region #1 3840 and control region #2 3850, are configured within time and frequency resources including a system bandwidth 3810 on the frequency axis and one slot 3820 on the time axis.

In FIG. 38, a control region length of control region #1 3840 is configured as control region length #1 3860 and a control region length of control region #2 3850 is configured as control region length #2 3870.

In the example of FIG. 38, some parts of a PDSCH 3801 may be scheduled through predetermined resources within the system band 3810. In scheduling of the PDSCH 3801, resource allocation may be performed using various resource-sharing methods according to embodiment 3-1 to embodiment 3-3 in consideration of resource regions 3840 and 3850 configured within the system. Accordingly, parts of the PDSCH 3801 may have different start points according to the allocated frequency location and whether resources of the control region are reused.

The data start point at each frequency location to which the PDSCH 3801 is allocated may be semi-statically and dynamically configured in embodiment 3-4 of the disclosure. The entire system bandwidth 2810 may be partitioned into a plurality of bandwidth parts, and a data start point in each bandwidth part may be semi-statically configured. Further, some bandwidth parts may be configured to dynamically receive the data start points.

In a more detailed description made with reference to the drawing, the entire system bandwidth 3810 is partitioned into a total of four bandwidth parts, that is, bandwidth part #1 3802, bandwidth part #2 3803, bandwidth part #3 3804, and bandwidth part #4 3805 in the example of FIG. 38.

The bandwidth parts 3802, 3803, 3804, and 3805 may be semi-statically configured to have specific data start points, and the corresponding configuration matter may be indicated to the UE. As described in the embodiments of the disclosure, the semi-statically configured data start points may be configured in consideration of the length of the resource region depending on whether there is a resource region within the corresponding bandwidth part.

For example, in FIG. 38, the semi-static data start points in bandwidth part #1 3802 and bandwidth part #2 3803 may be configured as a third OFDM symbol 3808 in consideration of control region length #1 3840 of control region #1 3840 existing in the corresponding bandwidth part. The data start point in bandwidth part #3 3804 may be configured as a first OFDM symbol, and the data start point in bandwidth part #4 3805 may be configured as a second OFDM symbol.

Some of the bandwidth parts may be additionally configured to support dynamic indicators for the data start points in embodiment 3-4 of the disclosure.

In the example of FIG. 38, bandwidth part #1 3802 and bandwidth part #2 3803 are configured to support dynamic indicators for data start points.

In the case of the PDSCH 3801 transmitted in bandwidth part #1 3802 or bandwidth part #2 3803, information on data start points may be dynamically indicated. In a more detailed example, the semi-static data start point of bandwidth part #2 3803 may be configured as a third OFDM symbol 3808, as assumed above. If bandwidth part #2 3803 is configured to support the dynamic data start point indicator, as indicated by reference numeral 3806, resource allocation may be freely performed for the PDSCH 3801 in the corresponding bandwidth part in consideration of resource reuse in resource region #1 3840. For example, the start point of the PDSCH 3801 may be dynamically scheduled to a second OFDM symbol 3809 in bandwidth part #2 3803, and the BS may additionally transmit the indicator for the data start point in bandwidth part #2 3803 through DCI.

Information on whether a dynamic indicator for a data start point is supported in a specific bandwidth part may be transmitted to the UE through higher-layer signaling, for example, RRC signaling or MAC CE signaling. Alternatively, the information may be implicitly provided on the basis of configuration information of the resource region. For example, if control region #1 3840 is configured for UE #1 in FIG. 38, bandwidth part #1 3802 and bandwidth part #2 3803, which are bandwidth parts in which control region #1 3840 exists, may be implicitly configured to transmit the dynamic indicator. If the PDSCH 3801 of UE #1 is transmitted, efficiency of resource use may increase through the more active use of resource sharing in control region #1 3840, since time and frequency resource information of control region #1 3840 is already known to UE #1. Accordingly, in order to support the resource sharing, it is preferable to configure dynamic indicators for data start points in bandwidth part #1 3802 and bandwidth part #2 3803.

If the dynamic indicator is transmitted in the bandwidth part configured to transmit the dynamic indicator, the UE may determine the data start point by ignoring the preconfigured semi-static indicator and preferentially applying the dynamic indicator.

Even in the bandwidth part configured to transmit the dynamic indicator, the dynamic indicator may be transmitted only when the dynamic indicator is necessary. For example, if the data start point indicated by the dynamic indicator is the same as the data start point indicated by the semi-static indicator, the dynamic indicator may not be transmitted. In this case, the UE may determine the data start point by directly applying the preconfigured semi-static indicator. At this time, an additional field indicating whether to transmit the dynamic indicator may be included in DCI, and a number of bits corresponding to some or all of the dynamically configured bandwidth may be needed. If the dynamic indicator is not transmitted, unused DCI bits may be reserved or may be used for another purpose.

Embodiment 3-4 of the disclosure may include an operation for indicating one data start point for one PDSCH 3801. For example, if the number of bandwidth parts is configured as one, one indicator may be dynamically or semi-statically configured for the data start point.

Figure 39A:
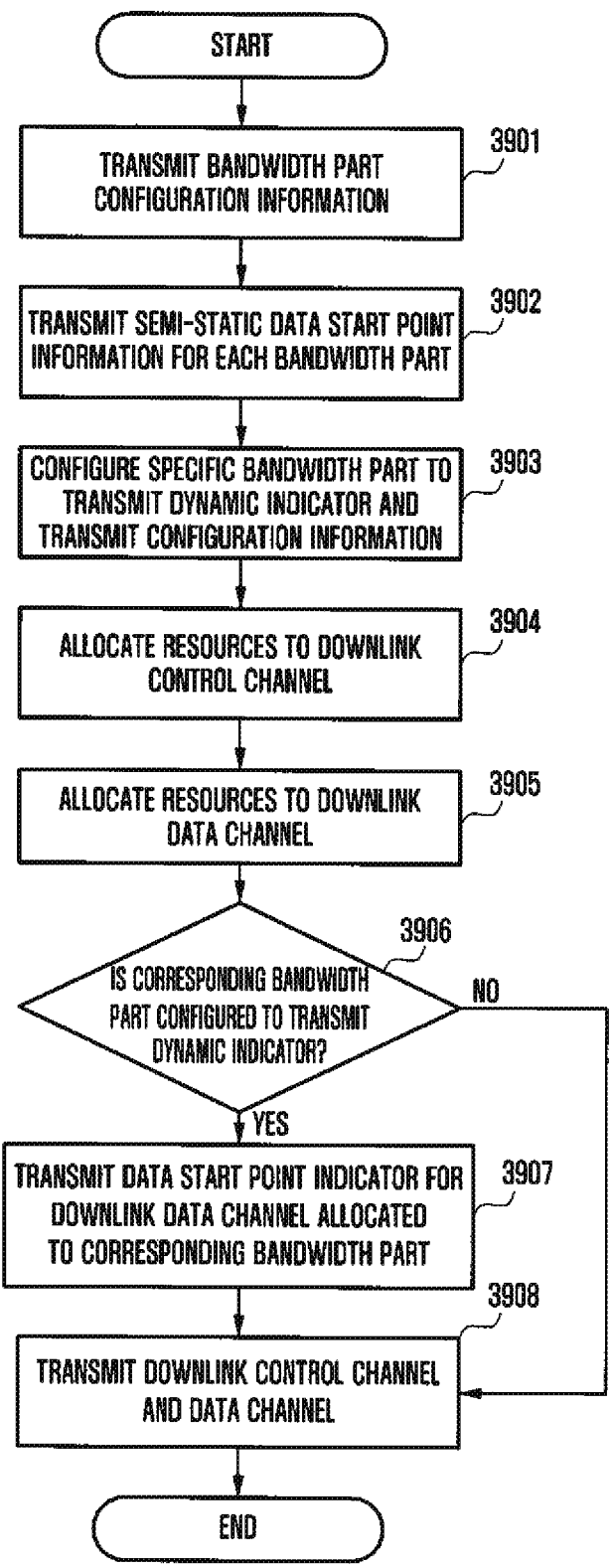
FIGS. 39A and 39B illustrate BS and UE operations according to embodiment 3-4 of the disclosure.
Figure 39B:
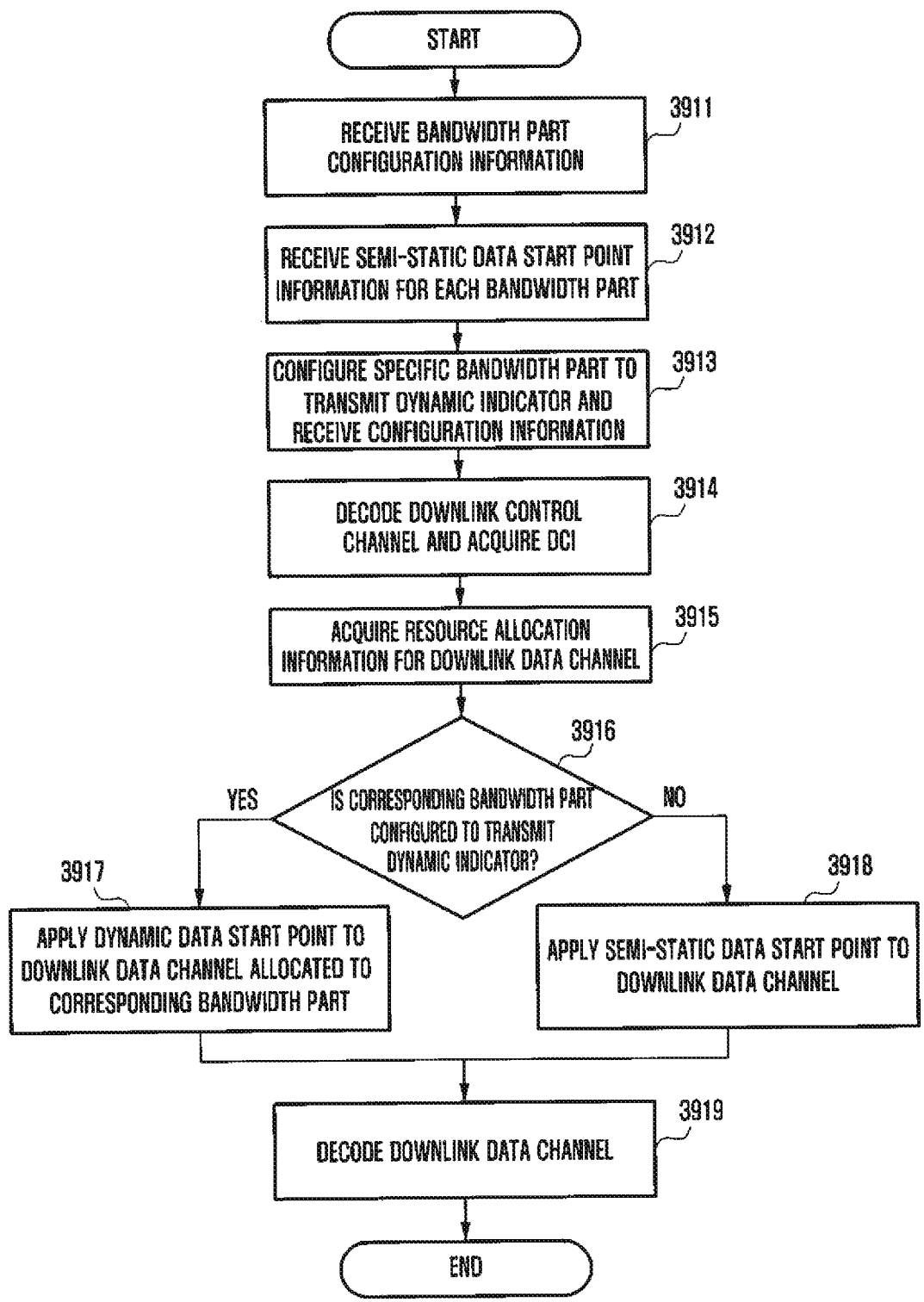

FIGS. 39A and 39B illustrate BS and UE operations according to embodiment 3-4 of the disclosure.

First, the BS procedure will be described with reference to FIG. 39A.

The BS may transmit configuration information on the bandwidth part in step 3901 and transmit semi-static data start point information in each bandwidth part in step 3902.

The BS may configure a specific bandwidth to transmit the dynamic indicator for the data start point and transmit configuration information thereof to the UE in step 3903.

The BS performs resource allocation for a downlink control channel in step 3904.

The BS may perform resource allocation for a data channel in step 3905. At this time, the BS may perform resource allocation for a data channel on the basis of the method of sharing resources between the data channel and the control channel according to embodiment 3-4 of the disclosure. That is, the BS may perform scheduling by applying different data start points according to the frequency region to which the data channel is allocated. If the frequency location for scheduling of the data channel belongs to the bandwidth part for transmitting the semi-static indicator for the data start point, the data channel may be scheduled according to the preconfigured semi-static data start point. If the frequency location for scheduling of the data channel belongs to the bandwidth part for transmitting the dynamic indicator for the data start point, the data channel may be scheduled to various data start points according to determination of the BS.

The BS determines whether the frequency band to which the data channels or some of the data channels are scheduled is a bandwidth part configured to transmit the dynamic indicator in step 3906. If the corresponding bandwidth part is configured to transmit the dynamic indicator, the BS may additionally transmit the data start point indicator for the corresponding bandwidth part in step 3907. The BS may transmit a downlink control channel and a data channel in step 3908.

Next, the UE procedure will be described with reference to FIG. 39B.

The UE may receive configuration information on bandwidth parts in step 3911. The UE may receive semi-static data start point information for each bandwidth part in step 3912.

The UE may receive configuration information of a specific bandwidth part in which the dynamic indicator for the data start point is transmitted in step 3913.

The UE may obtain DCI after decoding the downlink control channel in step 3914. The UE may obtain resource allocation information of the downlink data channel from DCI in step 3915.

The UE determines whether the frequency band to which the data channels or some of the data channels are scheduled is the bandwidth part configured to transmit the dynamic indicator in step 3916. If the corresponding bandwidth is configured to transmit the dynamic indicator, the UE may dynamically obtain the data start point indicator for the corresponding bandwidth from DCI in step 3917. If the corresponding bandwidth part is not configured to transmit the dynamic indicator, the UE may apply the data start point for the corresponding bandwidth part as the preconfigured semi-static data start point in step 3918.

If determination of the data start point is completed, the UE may decode the data channel in step 3919.

Embodiment 3-4-1

The BS may indicate all pieces of control region configuration information (or a required portion thereof) within the system to the UE through the method of configuring the data start point at each frequency location to which the PDSCH is allocated in embodiment 3-4-1 of the disclosure. More specifically, the BS may inform UE #1 of configuration information of control region #1 3840 and control region #2 3850, that is, time and frequency resource information, in FIG. 38. In this case, transmission of the dynamic/semi-static indicator for the data start point may be configured for each resource region, rather than the bandwidth part. For example, resource region #1 3840 may be configured to transmit the dynamic indicator and resource region #2 3850 may be configured to transmit the semi-static indicator. As a result, in all operations of embodiment 3-4, the bandwidth parts may be displaced for each resource region and applied equally.

Embodiment 3-4-2

In embodiment 3-4-2 of the disclosure, embodiment 3-2 of the disclosure may be applied to the bandwidth part configured through dynamic signaling for the data start point through the method of sharing resources between the data channel and the control channel according to embodiment 3-4 of the disclosure.

For example, embodiment 3-2 may be applied to some of the PDSCHs 3801 transmitted in bandwidth part #2 3803, configured to transmit the dynamic indicator in FIGS. 39A and 39B. That is, some of the PDSCHs 3801 transmitted in bandwidth part #2 3803 may be partitioned IQ into data parts, and a plurality of data start point indicators corresponding to the data parts may be transmitted. Through embodiments of the disclosure, it is possible to increase the efficiency of reuse of resources for resource region #1 3860 existing in bandwidth part #2 3803.

Embodiment 3-4-3

In embodiment 3-4-3 of the disclosure, semi-static/dynamic signaling for the data start point may be turned on/off in various ways in the method of sharing resources between the data channel and the control channel according to embodiment 3-4 of the disclosure. The on/off operation may be applied to the entire system bandwidth 3810 or a specific bandwidth part 3802, 3803, 3804, or 3805. Alternatively, the on/off operation may be applied to the dynamically configured bandwidth parts 3802 and 3803 or to the statically configured bandwidth parts 3804 and 3805. The on/off operation may be dynamically configured through DCI or may be semi-statically configured through higher-layer signaling (for example, RRC signaling or MAC CE signaling).

Embodiment 3-5

Figure 40:
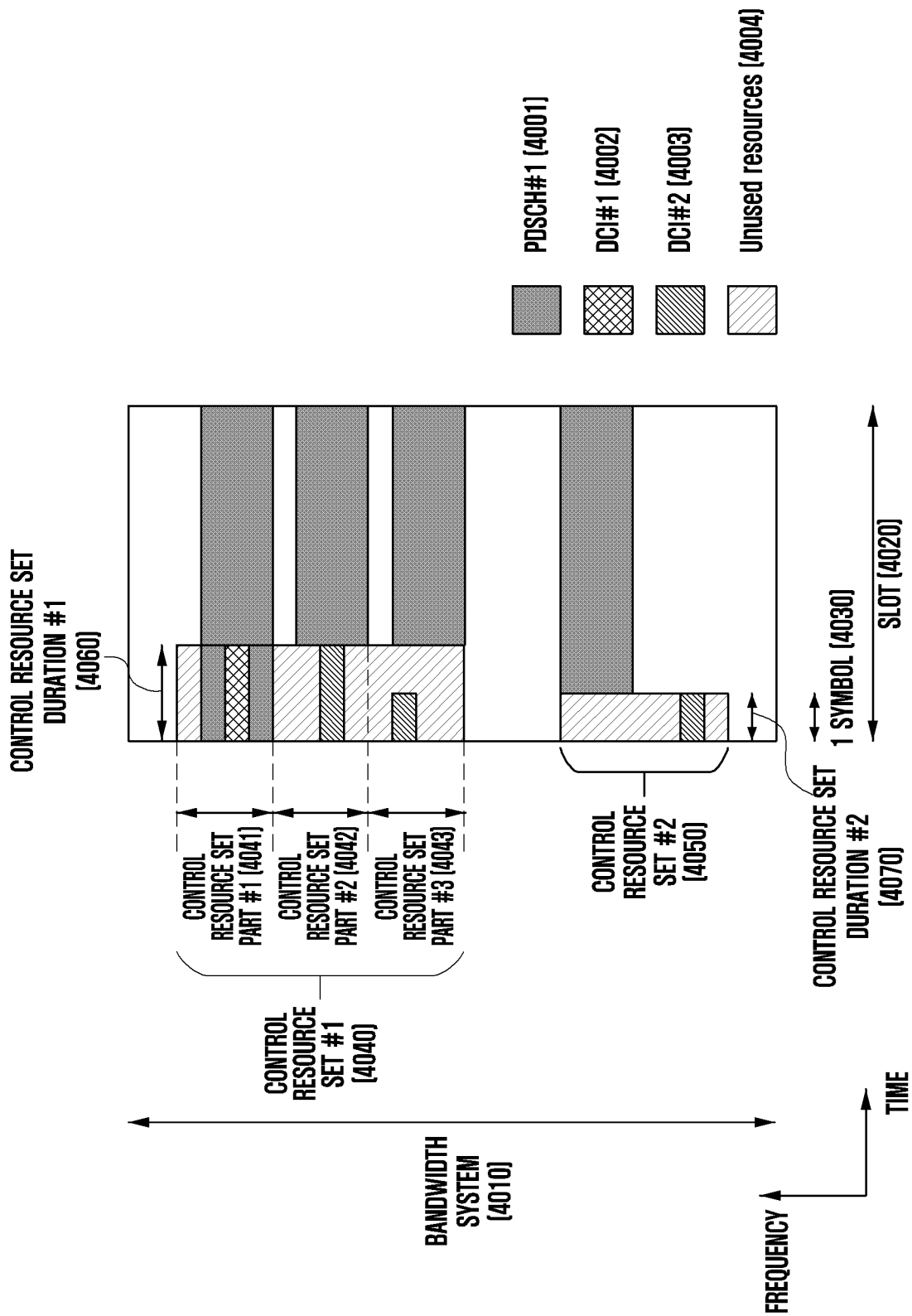
FIG. 40 illustrates a fifth embodiment of the disclosure.

FIG. 40 illustrates an example of a method of sharing resources between the data channel and the control channel according to embodiment 3-5 of the disclosure. In embodiment 3-5 of the disclosure, a plurality of UEs exists in the system, a plurality of resource regions are configured, and a data channel of a specific UE is transmitted. FIG. 40 illustrates one of the available examples that can be generally expressed.

More specifically, FIG. 40 illustrates an example in which two control regions, that is, control region #1 4010 and control region #2 4050, are configured within time and frequency resources including a system bandwidth 4040 on the frequency axis and one slot 4020 on the time axis.

In FIG. 40, a control region length of control region #1 4040 is configured as control region length #1 4060 and a control region length of control region #2 4050 is configured as control region length #2 4070.

In the description of the disclosure made with reference to FIG. 40, it is assumed that control region #1 4040 is configured to UE #1 and that control region #1 4040 and control region #2 4050 are configured to another UE, for example, UE #2. Further, it is assumed that DCI #1 4002, corresponding to a control signal for UE #1, is transmitted in control region #1 4030 and that DCI #2 4003, corresponding to a control signal for UE #2, is transmitted in control region #1 3340 and control region #2 3350 in FIG. 40.

In control region #1 4040 and control region #2 4050, resources 4002 that are not used for transmission of DCI #1 4003 and DCI #2 4004 may exist. In addition, it is assumed that PDSCH #1 4001 corresponding to a data channel for UE #1 is transmitted in FIG. 40. FIG. 40 is only an example for convenience of description of the disclosure, and it is noted that FIG. 33 does not limit the disclosure to a specific situation. The disclosure may be equally applied to various transmission environments through slight modification thereof without departing from the scope of the disclosure.

In embodiment 3-5 of the disclosure, more flexible resource sharing between the data channel and the control channel in a specific resource region existing in the system may be supported with relatively low signaling overhead. In embodiment 3-5 of the disclosure, a specific resource region may be partitioned into a plurality of resource region parts (control resource set parts), and whether DCI of another UE is transmitted in each resource region part may be indicated.

In a resource region part in which DCI of another UE is not transmitted, the data channel may be scheduled from a first OFDM symbol. In a resource region part in which DCI of another UE is transmitted, a data start point may not be the first OFDM symbol, and, for example, a (resource region length+1)$^{th}$ symbol of the corresponding resource region may be the data start point. As a result, the data channel may have one or a plurality of data start points depending on the scheduled frequency location.

This will be described in more detail with reference to the drawings. FIG. 40 illustrates an example in which PDSCH #1 4001 of UE #1 is scheduled and transmitted in a frequency region in which resource region #1 4040 is configured. UE #1 may be made aware in advance of configuration information of resource region #1 4040 and thus may be aware of a frequency location of resource region #1 4040 and information on resource region length #1 4060. Further, DCI #1 4002 of UE #1 may be transmitted through specific resources of resource region #1 4040 and UE #1 may obtain transmission resources of DCI #1 through blind decoding.

According to embodiment 3-5 of the disclosure, resource region #1 4040 may be partitioned into a plurality of resource region parts, for example, resource region part #1 4041, resource region part #2 4042, and resource region part #3 4043. Whether DCI of another UE is transmitted in each resource region part 4041, 4042, or 4043 may be provided to the UE through, for example, 1 bit (or a plurality of bits).

Since only DCI #1 4002 of UE #1 is transmitted in resource region part #1 4041 in the example of FIG. 40, the BS may inform UE #1 that there is no transmission of DCI of another UE. Further, since DCI #2 4003 of UE #2 is transmitted in resource region part #2 4042 and resource region part #3 4043, the BS may inform UE #1 that DCI of another UE is transmitted. UE #1 may determine the data start point on the basis of an indicator indicating whether DCI for another UE transmitted in each resource region part is transmitted. For example, in the example of FIG. 40, the UE is aware of information indicating that there is no transmission of DCI of another UE, so that it may be assumed that a portion of PDSCH #1 4001 transmitted at the frequency location of resource region part #1 4041 is the data start point from a first OFDM symbol. At this time, UE #1 is aware of transmission resources of DCI #1 4001 and thus may know that the portion of PDSCH #1 4001 in resource region part #1 4041 is rate-matched and perform decoding on the basis of the information.

Meanwhile, since the UE receives the information indicating that DCI of another UE is transmitted in resource region part #2 4042 and resource region part #3 4043, different data start points may be applied to the portion of PDSCH #1 4001 transmitted at the frequency location of resource region part #2 4042 and resource region part #3 4043. For example, UE #1 knows in advance information on resource region length #1 4060, so that it may be assumed that the data start point of the portion of PDSCH #1 4001 transmitted in resource region part #2 4042 and resource region part #3 4043 is a (resource region length #1 4060+1)$^{th}$ OFDM symbol.

In embodiment 3-5 of the disclosure, a value appointed as a system parameter may be used for configuration information of the resource region parts (for example, the number of resource region parts). Alternatively, the configuration information may be implicitly determined by other system parameters, for example, a system bandwidth, the configured number of resource regions, and configuration information of the resource region (frequency bandwidth of the resource region and resource region length). Alternatively, the configuration information may be provided to the UE through an MIB or an SIB as cell-common system information. Alternatively, the configuration information may be semi-statically configured to the UE through higher-layer signaling, for example, RRC signaling and MAC CE signaling. Information on whether DCI of another UE is transmitted in each resource region part 4041, 4042, or 4043 may be transmitted to the UE through DCI.

In embodiment 3-5 of the disclosure, signaling indicating whether DCI of another UE transmitted in each resource region part is transmitted may be replaced with signaling indicating an actual data start point. In this case, the resource region may be more efficiently reused but signaling overhead may increase. Further, the data start point according to whether the DCI is transmitted may be partitioned into, for example, a first data start point and a second data start 2.5 point, and a value for each data start point may be semi-statically configured, or a fixed value may be used therefor.

In embodiment 3-5 of the disclosure, a specific resource region to which embodiment 3-5 is applied may be additionally configured. For example, the indicator indicating whether the DCI of another UE is transmitted may be transmitted not only to the resource region preconfigured to a specific UE but also to other resource regions.

For example, in FIG. 40, resource region #2 4050 may also be configured to apply embodiment 3-5, and to this end, configuration information of resource region #2 4050 may be provided in advance to UE #1.

In embodiment 3-5 of the disclosure, the data start point may be determined in the bandwidth part in which there is a non-configured resource region for the UE within the system through various embodiments of the disclosure, for example, a combination of embodiment 3-2, embodiment 3-3, and embodiment 3-4.

Figure 41A:
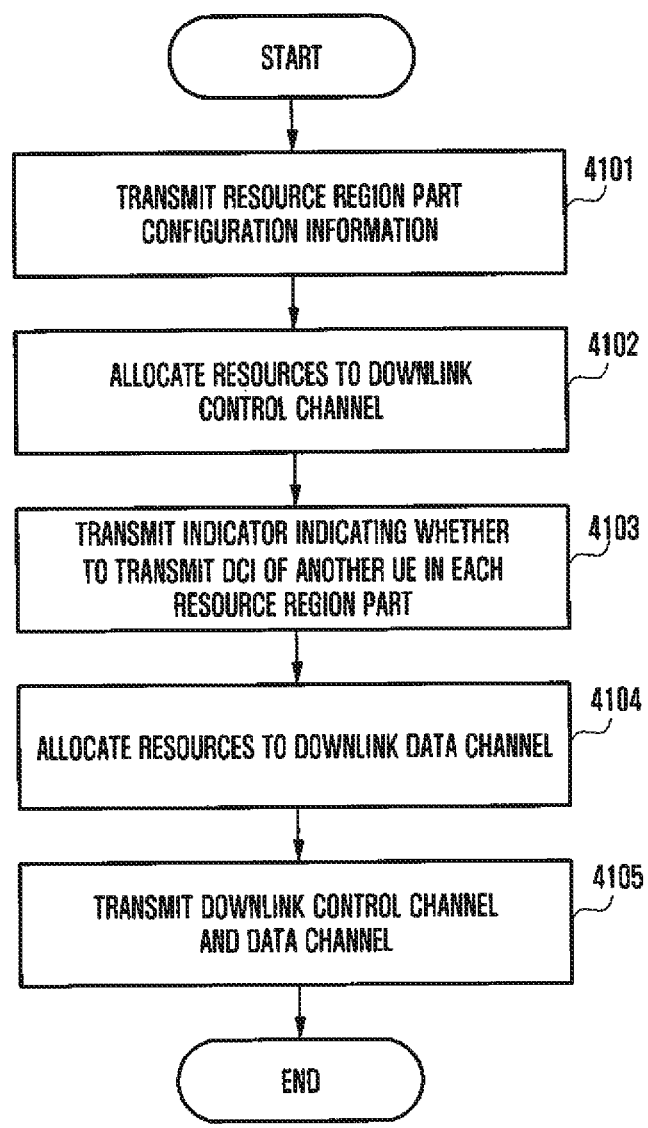
FIGS. 41A and 41B illustrate BS and UE operations according to the fifth embodiment of the disclosure.
Figure 41B:
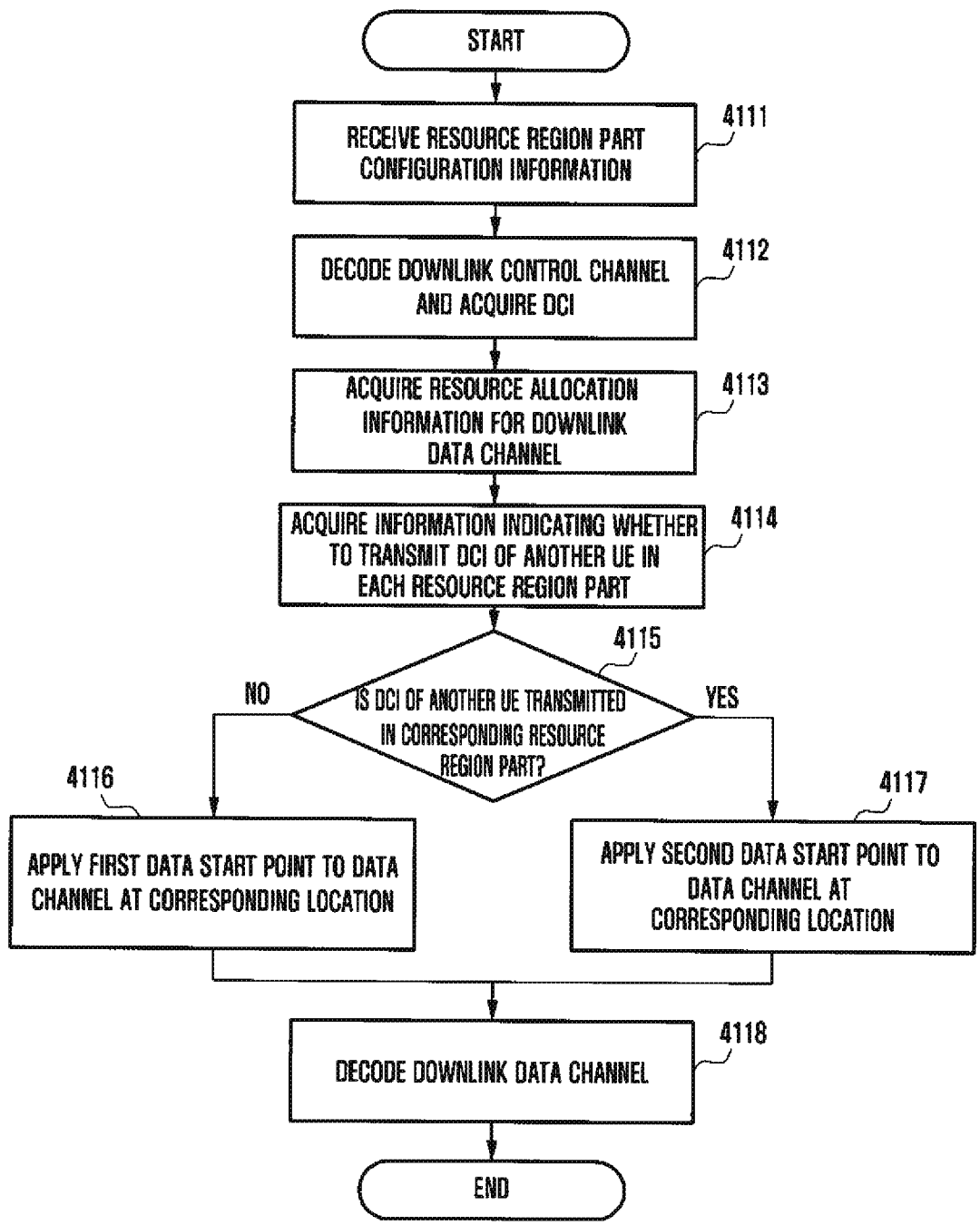

FIGS. 41A and 41B illustrate BS and UE operations according to embodiment 3-5 of the disclosure.

First, the BS procedure will be described.

The BS may transmit configuration information on resource region parts of a specific resource region to the UE in step 4101.

The BS may perform resource allocation on the downlink control channel in step 4102. The BS may transmit an indicator indicating whether DCI of another UE is transmitted in each resource region part in step 4103.

The BS may perform resource allocation on the downlink data channel in step 4103. At this time, the BS may perform resource allocation on the data channel on the basis of the method of sharing resources between the data channel and the control channel according to embodiment 3-5 of the disclosure. That is, the BS may perform scheduling by applying different data start points according to the resource region part in which the data channel is transmitted and whether DCI of another UE is transmitted in the corresponding resource region part. For example, the BS may apply a first data start point to a resource region part in which there is no transmission of DCI of another UE and a second data start point to a resource region part in which there is transmission of DCI of another UE.

The BS may transmit the downlink control channel and data channel in step 4105.

Next, the UE procedure will be described.

The UE may receive configuration information on resource region parts of a specific resource region in step 4111. The UE may obtain DCI after decoding the downlink control channel in step 4112. The UE may obtain resource allocation information of the downlink data channel in step 4113.

The UE may obtain information on whether DCI of another UE is transmitted in each resource region part in step 4114.

The UE may determine whether DCI of another UE is transmitted in a resource region part corresponding to a frequency location at which the data channel is scheduled in step 4115.

If DCI of another UE is not transmitted in the corresponding resource region part, the first data start part may be applied to the data channel or the data channel part at the corresponding location. If DCI of another UE is transmitted in the corresponding resource region part, the second data start part may be applied to the data channel or the data channel part at the corresponding location.

The UE may decode the downlink data channel on the basis of finally obtained scheduling information in step 4118.

Embodiment 3-6

Embodiment 3-6 of the disclosure provides an implicit signaling method of efficiently sharing resources between the data channel and the control channel. The UE may implicitly determine a data start point in various ways. For example, information such as transmission type configuration information of the resource region (localized-type transmission or distributed-type transmission), resource-mapping type configuration information of the resource region (frequency-first mapping or time-first mapping), an aggregation level supported in the resource region (for example, whether a higher aggregation level is supported), and search space configuration information of the resource region (common search space or UE-specific search space) may be used to implicitly provide the data start point.

For example, if any resource region is configured in the distributed mapping type, resource sharing between the data channel and the control channel in the corresponding resource region may be applied with a very low probability. Accordingly, between the BS and the UE, it is efficient to promise not to share resources in the resource region configured in the distributed mapping type in the system. Accordingly, if the data channel of the UE is scheduled to the same frequency location as the resource region configured in the distributed mapping type, the UE may implicitly know that the data start point at the corresponding frequency location is a (resource region length+1)$^{th}$ symbol.

The data start point described above may be analyzed to be the same as the indicator indicating whether the data channel is rate-matched in the method of sharing resources between the data channel and the control channel. For example, it is assumed that a control region (control resource set (CORESET), resource region) is configured as OFDM symbols from a first OFDM symbol to an n$^{th}$ OFDM symbol through the control channel and is allocated to a specific frequency band. Indicating an n+1$^{th}$ symbol as the data start point for the data channel transmitted through the corresponding frequency band means that no data channel is transmitted in the corresponding control region, which means that the PDSCH is rate-matched for the corresponding control region and transmitted.

Alternatively, indicating the first OFDM symbol as the data start point for the data channel transmitted in the frequency band configured as the control region means that the data channel is transmitted in the corresponding control region, which means that the PDSCH is transmitted without rate-matching for the corresponding control region.

That is, information on whether rate matching for the PDSCH in the corresponding control region is performed may be indicated by 1 bit, which may be analyzed to be the same as the indicator indicating the data start point of the first OFDM symbol or the n+1$^{th}$ OFDM symbol.

The method of sharing resources between the data channel and the control channel and various signaling methods of efficiently supporting the same have been described in connection with various embodiments of the disclosure. One or a plurality of embodiments of the disclosure may be used independently or a combination thereof may be used in one system.

For example, through a combination of embodiment 3-3 of the disclosure and embodiment 3-5 of the disclosure, embodiment 3-5 may be applied to the configured control region and embodiment 3-2 may be applied to bandwidth parts in which a non-configured control region exists. Embodiments of the disclosure are presented only for specific examples to easily describe the technology of the disclosure and help understanding of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination.

Embodiment 3-7

Embodiment 3-7 of the disclosure provides a method of efficiently sharing resources between the data channel and the control channel.

The BS may inform the UE of time and frequency resources for one or a plurality of control regions (control resource set (CORESET), resource region) in which the corresponding UE receives the downlink control channel through higher-layer signaling, for example, RRC signaling.

For example, in FIG. 40, the BS may inform UE #1 of configuration information of control region #1 4040 (for example, time and frequency resources) and UE #1 may receive its own downlink control information from control region #1 4040.

The control region of the UE is called a "first control region" for convenience of description of the disclosure.

If the BS transmits a PDSCH of any UE and time/frequency resources to which the PDSCH is allocated include a portion or an entirety of the "first control region", the PDSCH may be rate-matched and transmitted without being transmitted in the time/frequency resources corresponding to the "first control region".

If the BS transmits a PDSCH of any UE and time/frequency resources to which the PDSCH is allocated include a portion or the entirety of the "first control region", the PDSCH may also be transmitted in the time/frequency resources corresponding to the "first control region" without rate matching. If the time/frequency resources to which the PDSCH is allocated include a portion or the entirety of the time/frequency resources through which DCI of the corresponding UE is transmitted, the BS may rate-match and transmit the PDSCH for the time/frequency resources through which the corresponding DCI is transmitted.

The BS may transmit an indicator indicating whether rate matching for the "first control region" is performed to the UE. For example, if one or a plurality of "first control regions" are known to the UE, an indicator indicating whether to transmit the PDSCH allocated to a portion or the entirety of the corresponding "first control region" after rate matching or without rate matching may be transmitted (however, transmit the PDSCH after rate matching for time/frequency resources through DCI of the corresponding UE is transmitted). For example, if N (N≥1) "first control regions" are known, the BS may indicate the same to the UE through an N-bit indicator.

The indicator may be transmitted through higher-layer signaling (for example, RRC signaling or MAC CE signaling), common DCI, group-common DCI, or UE-specific DCI.

The UE may receive resource allocation information of its own PDSCH from downlink control information, and if time/frequency resources to which its own PDSCH is allocated include a portion or the entirety of the "first control region", different PDSCH-decoding operations may be performed according to the indicator.

If the UE receives an indicator indicating that transmission is performed after rate matching for a specific "first control region", the UE may assume that the PDSCH is rate-matched and transmitted without being transmitted in the time/frequency resources corresponding to the "first control region" for the received PDSCH. Accordingly, the UE may decode the PDSCH of the remaining regions except for the "first control region".

If the UE receives an indicator indicating that transmission is performed without rate matching for a specific "first control region", the UE may assume that the PDSCH is also transmitted in the time/frequency resources corresponding to the "first control region" for the received PDSCH and accordingly decode the PDSCH. However, if the time/frequency resources to which the PDSCH is allocated include a portion or the entirety of the time/frequency resources through which the DCI of the corresponding UE is transmitted, the UE assumes that the PDSCH is rate-matched and transmitted for the time/frequency resources through which the corresponding DCI is transmitted and accordingly decode the PDSCH in the remaining resource regions except for the region in which the corresponding DCI is transmitted.

The BS may additionally inform the UE of time and frequency resources for one or a plurality of control regions configured to another UE existing within the system bandwidth or the bandwidth of the corresponding UE through higher-layer signaling, for example, RRC signaling, common DCI, or group-common DCI.

For example, if control region #1 4040 is configured as a control region for UE #1 and control region #2 4050 is configured as a control region for UE #2 in FIG. 40, the BS may additionally inform the UE of time and frequency resources of control region #2 4050.

For convenience of description of the disclosure, the time and frequency resources of the control region configured for another UE may be referred to as a "second control region".

If the BS transmits a PDSCH of any UE and time/frequency resources to which the PDSCH is allocated include a portion or the entirety of the "second control region", the PDSCH may be rate-matched and transmitted without being transmitted in the time/frequency resources corresponding to the "second control region".

If the BS transmits a PDSCH of any UE and time/frequency resources to which the PDSCH is allocated include a portion or the entirety of the "second control region", the PDSCH may also be transmitted in the time/frequency resources corresponding to the "second control region" without rate matching.

The BS may transmit an indicator indicating whether rate matching for the "second control region" is performed. For example, if one or a plurality of "second control regions" are known to the UE, an indicator indicating whether to transmit the PDSCH allocated to a portion or the entirety of the "second control region" after rate matching or without rate matching may be transmitted. For example, if M (M≥1) "second control regions" are known, the BS may indicate an M-bit indicator to the UE.

The indicator may be transmitted through higher-layer signaling (for example, RRC signaling or MAC CE signaling), common DCI, group-common DCI, or UE-specific DCI.

The UE may receive resource allocation information of its own PDSCH from downlink control information, and if time/frequency resources to which its own PDSCH is allocated include a portion or the entirety of the "second control region", different PDSCH-decoding operations may be performed according to the indicator.

If the UE receives an indicator indicating that transmission is performed after rate matching for a specific "second control region", the UE may assume that the PDSCH is rate-matched and transmitted without being transmitted in the time/frequency resources corresponding to the "second control region" for the received PDSCH. Accordingly, the UE may decode the PDSCH of the remaining regions except for the "second control region".

If the UE receives an indicator indicating that transmission is performed without rate matching for a specific "second control region", the UE may assume that the PDSCH is also transmitted in the time/frequency resources corresponding to the "second control region" for the received PDSCH and accordingly decode the PDSCH.

Understanding of the "first control region" and the "second control region" described above may be UE-specific. In the example of FIG. 40, the "first control region" of UE #1 may be control region #1 4040 and the "first control region" of UE #2 may be control region #2 4050. Further, the "second control region" of UE #1 may be control region #2 4050 and the "second control region" of UE #1 may be control region #1 4040.

The aforementioned "second control region" may be the same as reserved resources to the corresponding UE. The UE may assume that transmission using the reserved resources is not possible. However, whether to activate/deactivate the reserved resources may be indicated through the aforementioned indicator.

Embodiment 3-7-1

If there is one or a plurality of control regions within the system band or the UE band, information on whether time/frequency resources configured as the corresponding control region may be used for PDSCH transmission (or whether rate matching of the PDSCH in the corresponding resource region is equally performed) may be provided to the UE. The BS may inform one or a plurality of UEs of the information through DCI or group-common DCI. For example, if L (L≥1) control regions are known, the BS may indicate the same to the UE through an L-bit indicator.

For example, as in the example of FIG. 40, if two control regions, that is, control region #1 4040 and control region #2 4050, exist within the system bandwidth and UE #1 and UE #2 receive the same common DCI or group-common DCI, the BS may inform UE #1 and UE #2 of whether time/frequency resources to which each control region is allocated can be used for PDSCH transmission through higher-layer signaling (for example, RRC signaling or MAC CE signaling), common DCI, or group-common DCI.

The UE may receive the indicator through higher-layer signaling, common DCI, or group-common DCI and may obtain information on whether the PDSCH is rate-matched for time/frequency resources configured as each control region existing within the system band or the UE band. When receiving its own PDSCH, the UE may receive and decode the PDSCH in consideration of rate matching for the control region on the basis of the information.

Embodiment 3-7-2

If there is one or a plurality of control regions within the system band or the UE band, information on whether time/frequency resources configured as the corresponding control region may be used for PDSCH transmission (or whether rate matching of the PDSCH in the corresponding resource region is performed) may be provided to the UE. The BS may inform one or a plurality of UEs of the information through higher-layer signaling (for example, RRC signaling or MAC CE signaling), common DCI, or group-common DCI. For example, if L (L≥1) control regions are known, the BS may indicate the same to the UE through an L-bit indicator.

For example, as in the example of FIG. 40, if two control regions, that is, control region #1 4040 and control region #2 4050, exist within the system bandwidth and UE #1 and UE #2 receive the same common DCI or group-common DCI, the BS may inform UE #1 and UE #2 of whether time/frequency resources to which each control region is allocated can be used for PDSCH transmission through higher-layer signaling (for example, RRC signaling or MAC CE signaling), common DCI, or group-common DCI.

The indicator may be referred to as a first indicator.

Further, the BS may additionally inform the specific UE of whether the time/frequency resources configured as the "first control region" of the corresponding UE can be used for PDSCH transmission (or whether rate matching of the PDSCH in the corresponding resource region is equally performed). The BS may transmit the information to each UE through UE-specific DCI.

For example, in the example of FIG. 40, if the "first control region" of UE #1 is control region #1 4040 and the "first control region" of UE #2 is control region #2 4050, the BS may transmit an indicator indicating whether time/frequency resources of control region #1 4040 can be used for PDSCH transmission (or whether rate matching of the PDSCH in the corresponding resource region is equally performed) to UE #1 through UE-specific DCI and transmit an indicator indicating whether time/frequency resources of control region #2 4050 can be used for PDSCH transmission (or whether rate matching of the PDSCH in the corresponding resource region is equally performed) to UE #2 through UE-specific DCI.

The indicator may be referred to as a second indicator.

The BS may transmit the first indicator to the UE, transmit the second indicator to the UE, or transmit both the first indicator and the second indicator to the UE.

The UE may receive the first indicator from the BS, receive the second indicator from the BS, or receive both the first indicator and the second indicator from the BS.

The UE may receive the first indicator from the BS through higher-layer signaling, common DCI, or group-common DCI and may obtain information on whether the PDSCH is rate-matched for time/frequency resources configured as each control region existing within the system band or the UE band. Upon receiving its own PDSCH, the UE may receive and decode the PDSCH in consideration of rate matching for the control region on the basis of the information.

The UE may receive the second indicator from the BS through UE-specific DCI and obtain information on whether the PDSCH is rate-matched for time/frequency resources configured as the first control region. Upon receiving its own PDSCH, the UE may receive and decode the PDSCH in consideration of rate matching of the PDSCH for the control region configured as the first control region on the basis of the information.

The UE may receive both the first indicator and the second indicator from the BS.

The UE may obtain information on whether the PDSCH is rate-matched for each control region existing within the system band or the UE band. The UE may obtain information on whether PDSCH is rate-matched for the [first control region] from the second indicator.

At this time, the UE may determine whether the PDSCH is rate-matched for the control region corresponding to the first control region of the corresponding UE among the control regions existing within the system according to the second indicator. That is, if the UE receives both the first indicator and the second indicator, the UE may determine whether to rate-match the PDSCH for the first control region according to the second indicator.

This will be described in detail with reference to FIG. 40. In FIG. 40, UE #1 may receive information indicating that time/frequency resource regions configured as control region #1 4040 and control region #2 4050 cannot be used for PDSCH transmission (that is, rate-matching is performed for PDSCH transmission in the corresponding resource region) through the first indicator.

Further, UE #1 may receive information indicating that time/frequency resource region configured as control region #1 4040, which is the first control region of UE #1, can be used for PDSCH transmission (that is, rate-matching is not performed for PDSCH transmission in the corresponding resource region) through the second indicator.

In this case, indicators indicating PDSCH rate matching of control region #1 4040 are different, and at this time, the UE may receive and decode the PDSCH according to information on the second indicator without PDSCH rate matching for control region #1 4040.

Embodiment 3-7-3

The BS may transmit the second indicator for the first resource region to the UE.

The BS may inform the UE of the time/frequency resource region for the second resource region through higher-layer signaling, for example, RRC signaling. If PDSCH transmission resources overlap the resource region configured as the second resource region in PDSCH transmission to the corresponding UE, the BS may transmit the PDSCH after rate matching of the PDSCH for the corresponding region.

The UE may receive the second indicator from the BS and thus may know whether the PDSCH is rate-matched for the first resource region and receive and decode the PDSCH according thereto. The UE may receive the time/frequency region for the second resource region from the BS through higher-layer signaling (for example, RRC signaling), and may assume that the PDSCH is always rate-matched in the second resource region and receive and decode the PDSCH according thereto.

Embodiment 3-8

Embodiment 3-8 of the disclosure provides a method of mapping data to the data channel if the various methods of sharing resources between the data channel and the control channel are applied. As described above, one data channel may have a plurality of data start points according to the allocated frequency location through the method of sharing resources between the data channel and the control channel. At this time, the method of mapping the data to the data channel may consider the following alternatives.

[Method #1]
Data may be sequentially mapped from a first OFDM symbol in a time sequence regardless of data start points of respective parts of the data channel. At this time, the data mapping may be performed within each OFDM symbol in a frequency-first type.

[Method #2]
Data may be sequentially mapped from the lowest or highest frequency location in consideration of data start points of respective parts of the data channel and frequency allocation information. At this time, the data mapping may be performed within each frequency region in a frequency-first manner or a time-first manner.

Embodiment 3-9

Embodiment 3-9 of the disclosure describes a method of performing rate matching of the data channel when the various methods of sharing resources between the data channel and the control channel are applied.

When performing resource allocation on the PDSCH of any UE, the BS may perform transmission while reusing and allocating time/frequency resources configured as the control region (CORESET) of the corresponding UE. At this time, the entirety or a portion of the time/frequency region to which the PDSCH is allocated may overlap time/frequency resources to which DCI of the corresponding UE is mapped. As described above, if PDSCH transmission resources overlap DCI transmission resources, the BS and the UE may perform the following operation.

[Operation #1]
When performing resource allocation on the PDSCH, if the resources for transmitting the PDSCH overlap the resources for transmitting DCI and if the corresponding DCI is DCI including scheduling information of the corresponding PDSCH, the BS may allocate and transmit resources by rate-matching the PDSCH for the overlapping transmission resources.

The UE may obtain the DCI by performing blind decoding on the PDCCH and thus obtain scheduling information of the corresponding PDSCH. At this time, if the received PDSCH transmission resources overlap the DCI transmission resources and if the corresponding DCI is DCI including scheduling information of the corresponding PDSCH, the UE may receive the PDSCH based on the assumption of rate-matching of the PDSCH for the overlapping transmission resources and subsequently perform the decoding operation.

[Operation #2]
When performing resource allocation on the PDSCH, if the resources for transmitting the PDSCH overlap the resources for transmitting DCI and if the corresponding DCI is DCI including scheduling information of the corresponding PDSCH, the BS may allocate and transmit resources by puncturing the PDSCH for the overlapping transmission resources.

The UE may obtain the DCI by performing blind decoding on the PDCCH and thus obtain scheduling information of the corresponding PDSCH. At this time, if the received PDSCH transmission resources overlap the DCI transmission resources and if the corresponding DCI is not DCI including scheduling information of the corresponding PDSCH, the UE may receive the PDSCH based on the assumption of puncturing of the PDSCH for the overlapping transmission resources and subsequently perform the decoding operation.

Figure 42:
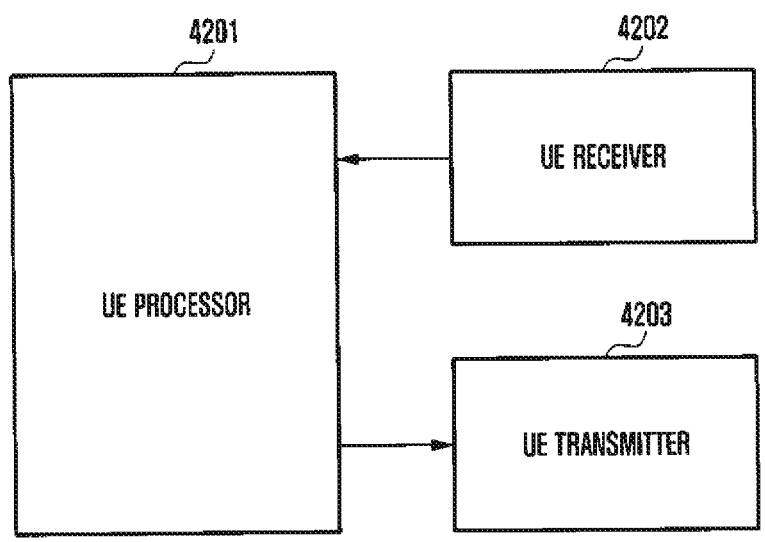
FIG. 42 is a block diagram illustrating the interval structure a UE according to an embodiment of the disclosure.
Figure 43:
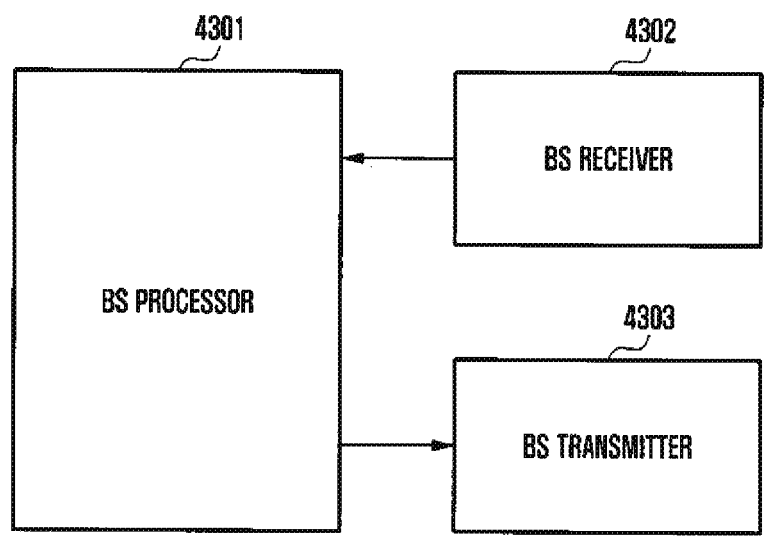
FIG. 43 is a block diagram illustrating the interval structure of a BS according to an embodiment of the disclosure.

A transmitter, a receiver, and a controller of each of the UE and the BS are illustrated in FIGS. 42 and 43 to implement the embodiments of the disclosure. The method of sharing resources between the data channel and the control channel in the 5G communication system corresponding to the embodiments, the method of designating the data start point, and the structure of the BS and the UE for performing various kinds of signaling therefor have been described, and in order to perform the methods, each of transmitters, receivers, and processors of the BS and the UE should operate according to the embodiments.

FIG. 42 is a block diagram illustrating the internal structure of a UE according to an embodiment of the disclosure.

As illustrated in FIG. 42, the UE according to the disclosure may include a UE processor 4201, a receiver 4202, and a transmitter 4203.

The UE processor 4201 may control a series of processes under which the UE may operate according to the embodiments of the disclosure.

For example, the UE processor 4201 may control the decoding operation for the downlink control channel and data channel of the UE differently depending on information such as the method of sharing resources between the data channel and the control channel, the method of configuring the data start point, the method of configuring the resource region, the method of configuring the bandwidth part, and the method of configuring the resource region part according to the embodiments of the disclosure.

The UE receiver 4202 and the UE transmitter 4203 are commonly called a transceiver in the embodiments of the disclosure. The transceiver may transmit and receive a signal to and from the BS. The signal may include control information and data. To this end, the transceiver may include an RF transmitter that up-converts and amplifies the frequency of a transmitted signal and an RF receiver that low-noise amplifies a received signal and down-converts the frequency. Also, the transceiver may receive a signal through a radio channel, output the signal to the UE processor 4201, and transmit the signal output from the UE processor 4201 through the radio channel.

FIG. 43 is a block diagram illustrating the internal structure of a BS according to an embodiment of the disclosure.

As illustrated in FIG. 43, the BS according to the disclosure may include a BS processor 4301, a receiver 4302, and a transmitter 4303.

The BS processor 4301 may control a series of processes such that the BS operates according to the embodiments of the disclosure. For example, the BS processor 4301 may perform control differently depending on the method of sharing resources between the data channel and the resource channel, the method of configuring the data start point, the method of configuring the resource region, the method of configuring the bandwidth part, and the method of configuring the resource region part according to the embodiments of the disclosure. Further, the BS processor 4301 may perform control to transmit various additional indicators as necessary.

The BS receiver 4302 and the BS transmitter 4303 may be commonly called a transceiver in the embodiments of the disclosure. The transceiver may transmit and receive a signal to and from the terminal. The signal may include control information and data. To this end, the transceiver may include an RF transmitter that up-converts and amplifies the frequency of a transmitted signal and an RF receiver that low-noise amplifies a received signal and down-converts the frequency. Also, the transceiver may receive a signal through a radio channel, output the signal to the BS processor 4301, and transmit the signal output from the BS processor 4301 through the radio channel.

Meanwhile, the sequence of description illustrated in the drawings for the method according to the disclosure does not necessarily correspond to the execution sequence, and the sequential relationship may be changed, or execution may be performed in parallel.

Additionally, the drawings illustrating the method of the disclosure may omit some elements or include only some elements without departing from the scope of the disclosure.

Further, the method of the disclosure may be performed through a combination of some or all of the content contained in each embodiment without departing from the scope of the disclosure.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination.

The invention claimed is:

1. A method performed by a terminal in a communication system, the method comprising:
   identifying a subcarrier spacing of a synchronization signal block (SSB) corresponding to a frequency, wherein the SSB includes a primary synchronization signal (PSS), a secondary synchronization signal (SSS), and a physical broadcast channel (PBCH);
   identifying a frame structure type, wherein the frame structure type is defined based on a parameter associated with the subcarrier spacing of the SSB and a parameter associated with the frequency;
   identifying a symbol location of the SSBs in a time domain, based on the frame structure type;
   detecting the SSB based on the symbol location of the SSB, wherein the SSB is one among SSB candidates for the frame structure type; and
   acquiring synchronization by the detected SSB,
   wherein a first symbol location of the symbol location of the SSB is identified in one of symbol indexes 4, 8, 16, and 20, in case that the subcarrier spacing of the SSB is 30 kHz.

2. The method of claim 1, wherein
   the first symbol location of the symbol location of the SSB is identified in one of symbol indexes 4, 8, 16, and 20, in case that the subcarrier spacing of the SSB is 120 kHz.

3. The method of claim 1, wherein the subcarrier spacing of the SSB includes one of 15 kHz, 30 kHz, 120 kHz, and 240 kHz.

4. The method of claim 1, wherein the SSB includes 4 symbols,
   wherein the PSS is mapped to 1 symbol, the SSS is mapped to 1 symbol, and the PBCH is mapped to 2 symbols,
   wherein the PSS, the SSS, and the PBCH are time division multiplexed, and
   wherein a number of SSB candidates depends on the frame structure type.

5. A method performed by a base station in a communication system, the method comprising:
   obtaining a synchronization signal block (SSB) associated with a subcarrier spacing of the SSB, wherein the SSB includes a primary synchronization signal (PSS), a secondary synchronization signal (SSS), and a physical broadcast channel (PBCH), and the SSB is one among SSB candidates for a frame structure type; and
   transmitting, to a terminal, the SSB based on the subcarrier spacing of the SSB on a symbol location of the SSB in a time domain,
   wherein the symbol location of the SSB in the time domain is defined based on the frame structure type,
   wherein the frame structure type is defined based on a parameter associated with the subcarrier spacing of the SSB and a parameter associated with a frequency, and
   wherein a first symbol location of the symbol location of the SSB is identified in one of symbol indexes 4, 8, 16, and 20, in case that the subcarrier spacing of the SSB is 30 kHz.

6. The method of claim 5, wherein
   the first symbol location of the SSB is identified in one of symbol indexes 4, 8, 16, and 20, in case that the subcarrier spacing of the SSB is 120 kHz.

7. The method of claim 5, wherein the subcarrier spacing of the SSB includes one of 15 kHz, 30 kHz, 120 kHz, and 240 kHz.

8. The method of claim 5, wherein the SSB includes 4 symbols,
   wherein the PSS is mapped to 1 symbol, the SSS is mapped to 1 symbol, and the PBCH is mapped to 2 symbols,
   wherein the PSS, the SSS, and the PBCH are time division multiplexed, and
   wherein a number of SSB candidates depends on the frame structure type.

9. A terminal in a communication system, the terminal comprising:
   a transceiver; and
   a controller coupled with the transceiver and configured to:
      identify a subcarrier spacing of a synchronization signal block (SSB) corresponding to a frequency, wherein the SSB includes a primary synchronization signal (PSS), a secondary synchronization signal (SSS), and a physical broadcast channel (PBCH),
      identify a frame structure type, wherein the frame structure type is defined based on a parameter associated with the subcarrier spacing of the SSB and a parameter associated with the frequency, identify a symbol location of the SSB in a time domain, based on the frame structure type, detect the SSB based on the symbol location of the SSB, wherein the SSB is one among SSB candidates for the frame structure type, and acquire synchronization by the detected SSB, wherein a first symbol location of the symbol location of the SSB is identified in one of symbol indexes 4, 8, 16, and 20, in case that the subcarrier spacing of the SSB is 30 kHz.

10. The terminal of claim 9, wherein the first symbol location of the SSB is identified in one of symbol indexes 4, 8, 16, and 20, in case that the subcarrier spacing of the SSB is 120 kHz.

11. The terminal of claim 9, wherein the subcarrier spacing of the SSB includes one of 15 kHz, 30 kHz, 120 kHz, and 240 kHz.

12. The terminal of claim 9, wherein the SSB includes 4 symbols, wherein the PSS is mapped to 1 symbol, the SSS is mapped to 1 symbol, and the PBCH is mapped to 2 symbols, wherein the PSS, the SSS, and the PBCH are time division multiplexed, and wherein a number of SSB candidates depends on the frame structure type.

13. A base station in a communication system, the base station comprising:

a transceiver; and a controller coupled with the transceiver and configured to:

obtain a synchronization signal block (SSB) associated with a subcarrier spacing of the SSB, wherein the SSB includes a primary synchronization signal (PSS), a secondary synchronization signal (SSS), and a physical broadcast channel (PBCH), and the SSB is one among SSB candidates for a frame structure type, and transmit, to a terminal, the SSB based on the subcarrier spacing of the SSB on a symbol location of the SSB in a time domain, wherein the symbol location of the SSB in the time domain is defined based on the frame structure type, wherein the frame structure type is defined based on a parameter associated with the subcarrier spacing of the SSB and a parameter associated with a frequency, and wherein a first symbol location of the symbol location of the SSB s identified in one of symbol indexes 4, 8, 16, and 20, in case that the subcarrier spacing of the SSB is 30 kHz.

14. The base station of claim 13, wherein the first symbol location of the SSB is identified in one of symbol indexes 4, 8, 16, and 20, in case that the subcarrier spacing of the SSB is 120 kHz.

15. The base station of claim 13, wherein the subcarrier spacing of the SSB includes one of 15 kHz, 30 kHz, 120 kHz, and 240 kHz, wherein the SSB includes 4 symbols, wherein the PSS is mapped to 1 symbol, the SSS is mapped to 1 symbol, and the PBCH is mapped to 2 symbols, wherein the PSS, the SSS, and the PBCH are time division multiplexed, and wherein a number of SSB candidates depends on the frame structure type.

\* \* \* \* \*